United States Patent
Dhawan et al.

(10) Patent No.: US 11,982,055 B2
(45) Date of Patent: May 14, 2024

(54) CREPING ADHESIVES AND PROCESSES FOR MAKING AND USING SAME

(71) Applicant: ECOLAB USA INC., St. Paul, MN (US)

(72) Inventors: Ashish Dhawan, Aurora, IL (US); David J. Castro, DeKalb, IL (US); Gary S. Furman, St. Charles, IL (US); Christopher Kaley, Hoffman Estates, IL (US)

(73) Assignee: ECOLABS USA INC., St. Paul, MN (US)

( * ) Notice: Subject to any disclaimer, the term of this patent is extended or adjusted under 35 U.S.C. 154(b) by 389 days.

(21) Appl. No.: 17/091,413

(22) Filed: Nov. 6, 2020

(65) Prior Publication Data

US 2021/0140110 A1 May 13, 2021

Related U.S. Application Data

(60) Provisional application No. 62/932,247, filed on Nov. 7, 2019.

(51) Int. Cl.
| | |
|---|---|
| *C09J 129/04* | (2006.01) |
| *B31F 1/12* | (2006.01) |
| *C08G 73/02* | (2006.01) |
| *C08L 79/02* | (2006.01) |
| *D21H 21/14* | (2006.01) |

(52) U.S. Cl.
CPC ............ *D21H 21/146* (2013.01); *B31F 1/12* (2013.01); *C08G 73/0286* (2013.01); *C08L 79/02* (2013.01); *C09J 129/04* (2013.01); *C08L 2312/00* (2013.01)

(58) Field of Classification Search
CPC ... C08G 73/028; C08G 73/0286; C09J 129/04
See application file for complete search history.

(56) References Cited

U.S. PATENT DOCUMENTS

| | | |
|---|---|---|
| 6,214,932 B1 | 4/2001 | Maslanka |
| 7,404,875 B2 | 7/2008 | Clungeon et al. |
| 8,084,525 B2 | 12/2011 | Grigoriev et al. |
| 8,101,045 B2 | 1/2012 | Furman et al. |
| 9,382,664 B2 | 7/2016 | White et al. |
| 9,539,344 B2 | 1/2017 | Zawadzki et al. |
| 2002/0173580 A1 | 11/2002 | Allen |
| 2006/0207736 A1 | 9/2006 | Boettcher et al. |
| 2006/0208858 A1* | 9/2006 | Griffith ................ G06F 1/1632 340/7.29 |
| 2008/0105394 A1 | 5/2008 | Kokko |
| 2008/0257507 A1 | 10/2008 | Campbell |
| 2010/0147476 A1 | 6/2010 | Gu et al. |
| 2012/0168103 A1* | 7/2012 | White .................. D21H 27/002 162/207 |
| 2012/0247697 A1 | 10/2012 | Lu et al. |
| 2015/0122433 A1 | 5/2015 | Ringold et al. |
| 2018/0094387 A1 | 4/2018 | Lang et al. |
| 2018/0179427 A1* | 6/2018 | Ringold ............... C08G 73/028 |

FOREIGN PATENT DOCUMENTS

| | | |
|---|---|---|
| JP | 2010168701 | 8/2010 |
| WO | 2012094443 | 7/2012 |
| WO | 2016210066 | 12/2016 |

OTHER PUBLICATIONS

"Wet-Strength Resins and Their Applications" Ch. 2, entitled "Alkaline-Curing Polymeric Amine-Epichlorohydrin resins" H. Epsy, L. Chan, Editor, TAPPI Press (Year: 1994).*
International Search Report and Written Opinion for international application No. PCT/US2020/059389, dated Feb. 12, 2021.
Ramasubramanian et al., "Shear strength of an adhesively bonded paper-metal interface", Journal of Pulp and Paper Science, v 24, n 1, p. 31-36, Jan. 1998; ISSN: 08266220; Publisher: CPPA.
Uner, "Adhesion mechanism between polymer and metal interface", ProQuest Dissertations and Theses Global, 2002 ISBN-13: 9780496553457; Paper No. 3107797; Publisher: ProQuest LLC.

* cited by examiner

*Primary Examiner* — Mark S Kaucher
(74) *Attorney, Agent, or Firm* — Edmonds & Cmaidalka, P.C.

(57) ABSTRACT

Creping adhesives and processes for making and using same. In some embodiments, the creping adhesive can include a solvent, a modified polyvinyl alcohol, and a crosslinked resin. The crosslinked resin can include polyamidoamine backbones crosslinked by primary crosslinking moieties and propanediyl moieties, where the primary crosslinking moieties can be derived from a functionally symmetric crosslinker. In other embodiments, the crosslinked resin can include polyamidoamine backbones crosslinked by primary crosslinking moieties and secondary crosslinking moieties, where the primary crosslinking moieties can be derived from a first functionally symmetric crosslinker and the secondary crosslinking moieties can be derived from a second functionally symmetric crosslinker. In other embodiments, the crosslinked resin can include polyamidoamine backbones crosslinked by primary crosslinking moieties, where the primary crosslinking moieties can be derived from a functionally symmetric crosslinker. The modified polyvinyl alcohol can include a carboxylated, a sulfonated, a sulfated, and/or a sulfonated-carboxylated polyvinyl alcohol.

20 Claims, No Drawings

CREPING ADHESIVES AND PROCESSES FOR MAKING AND USING SAME

CROSS REFERENCE TO RELATED APPLICATION

This application claims priority to U.S. Provisional Patent Application No. 62/932,247, filed on Nov. 7, 2019, which is incorporated by reference herein.

BACKGROUND

Field

Embodiments described generally relate to creping adhesives and process for making and using same. More particularly, such embodiments relate to creping adhesives that include functionalized crosslinked resins and methods for making and using same.

Description of the Related Art

The manufacture of paper is generally carried out by producing an aqueous slurry of cellulosic fibers and a variety of chemicals and subsequently removing most of the water to form a thin paper web. The structural integrity of the paper arises in large part from the mechanical entanglement of the cellulosic fibers in the web and hydrogen bonds that form between the cellulosic fibers. With paper intended for use as tissue and towel products such as facial tissue, bathroom tissue, paper towels, and napkins, the level of structural integrity arising from the paper-making process conflicts somewhat with the degree of perceived softness that is necessary for consumer acceptance of such products. The most common method of increasing the perceived softness of tissue and towel products is to "crepe" the paper. The creping action can impart a fine, rippled texture to the sheet, increase the bulk of the sheet, and improve the softness and absorbency of the sheet. Creping can be accomplished by affixing the moist cellulosic paper web to a rotating heated drum (commonly known as a Yankee dryer) by applying the paper web onto the surface of the drum, which has been sprayed with a creping adhesive. The surface of the drum is sprayed with the creping adhesive while the paper web is applied and dried by hot air impinging on the exposed side of the paper web and conductive heat is transferred from the drum. As the paper web dries, hydrogen bonds form between the fibers creating a flat and dense paper web morphology. The dried paper web is then scraped backwardly upon itself and off of the surface of the drum by means of a flexible blade, called a "doctor" blade or a "creping" blade. This creping process causes a substantial number of inter-fiber bonds to break, altering the physical-chemical characteristics of the paper web and increasing the perceived softness of the resulting creped paper product.

The art of obtaining good crepe quality relies on maintaining the proper level of adhesion between the paper web and the surface of the drum. Inadequate adhesion can result in poor or non-existing creping or require lower speed operation due to slow drying of the creping adhesive, while excessive adhesion can lead to poor sheet quality or cause the sheet to break. Paper webs that are insufficiently adhered to the surface of the drum can impact the control of the paper web as it travels between the creping blade and the winder upon which a roll of the paper is being formed, causing problems in forming a uniform roll of paper. For example, a loose sheet between the creping blade and the roll can cause wrinkles, foldovers, and/or weaving of the edges of the paper sheet in the rolled-up paper, adversely affecting subsequent operations of paper manufacture. Release aids can alter the properties of the adhesive and further provide lubrication to the doctor blade, and influence the release of the paper web from the surface of the drum, all of which can affect the properties of the creped product. Considerable effort has been spent trying to adjust the balance between the adhesion and the release of the web, while maintaining other conventional parameters that influence the creping process, such as moisture level of the paper web and creping blade angle. A significant drawback with the existing creping adhesives is that the formulations of creping adhesives generally need to be changed or adjusted when the wet end chemistry is changed (pH, reactive chemicals, debonders, etc.), the temperature profile is modified, or incoming and/or the residual moisture in the paper web is modified.

There is a need, therefore, for improved creping adhesives that can provide more control over the adhesion/release balance of the paper web to and from the surface of the dryer and processes for making and using same.

SUMMARY

Creping adhesives and processes for making and using same are provided. In some embodiments, the creping adhesive can include a solvent, a modified polyvinyl alcohol, and a crosslinked resin. The modified polyvinyl alcohol can include a carboxylated polyvinyl alcohol, a sulfonated polyvinyl alcohol, a sulfated polyvinyl alcohol, a sulfonated-carboxylated polyvinyl alcohol, or a mixture thereof. The crosslinked resin can include polyamidoamine backbones crosslinked by primary crosslinking moieties and propanediyl moieties. The primary crosslinking moieties can be derived from a functionally symmetric crosslinker.

In other embodiments, the creping adhesive can include a solvent, a modified polyvinyl alcohol, and a crosslinked resin. The modified polyvinyl alcohol can include a carboxylated polyvinyl alcohol, a sulfonated polyvinyl alcohol, a sulfated polyvinyl alcohol, a sulfonated-carboxylated polyvinyl alcohol, or a mixture thereof. The crosslinked resin can include polyamidoamine backbones crosslinked by primary crosslinking moieties and secondary crosslinking moieties. The primary crosslinking moieties can be derived from a first functionally symmetric crosslinker. The secondary crosslinking moieties can be derived from a second functionally symmetric crosslinker.

In other embodiments, the creping adhesive can include a solvent, a polyvinyl alcohol, a modified polyvinyl alcohol, or a mixture thereof, and a crosslinked resin. The crosslinked resin can include polyamidoamine backbones crosslinked by primary crosslinking moieties. The primary crosslinking moieties can be derived from a functionally symmetric crosslinker. The modified polyvinyl alcohol can include a carboxylated polyvinyl alcohol, a sulfonated polyvinyl alcohol, a sulfated polyvinyl alcohol, a sulfonated-carboxylated polyvinyl alcohol, or a mixture thereof.

In some embodiments, the process for making a creping adhesive can include reacting a polyamidoamine and a first crosslinker in the presence of a solvent to produce a prepolymer that can include polyamidoamine backbones crosslinked by primary crosslinking moieties. The first crosslinker can include a first functionally symmetric crosslinker. The process can also include reacting the prepolymer and a second crosslinker in the presence of the solvent and a modified polyvinyl alcohol to produce a crosslinked resin. The crosslinked resin can include polyamidoamine backbones crosslinked by the primary crosslinking moieties and secondary crosslinking moieties. The second crosslinker can include an epihalohydrin, a second functionally symmetric crosslinker, or a mixture thereof. The modified polyvinyl alcohol can include a carboxylated polyvinyl alcohol, a sulfonated polyvinyl alcohol, a sulfated polyvinyl alcohol, a sulfonated-carboxylated polyvinyl alcohol, or a mixture thereof.

In other embodiments, the process for making a creping adhesive can include reacting a polyamidoamine and a first crosslinker in the presence of a solvent and a modified polyvinyl alcohol to produce a prepolymer that can include polyamidoamine backbones crosslinked by primary crosslinking moieties. The first crosslinker can include a first functionally symmetric crosslinker. The process can also include reacting the prepolymer and a second crosslinker in the presence of the solvent and the modified polyvinyl alcohol to produce a crosslinked resin. The crosslinked resin can include polyamidoamine backbones crosslinked by the primary crosslinking moieties and secondary crosslinking moieties. The second crosslinker can include an epihalohydrin, a second functionally symmetric crosslinker, or a mixture thereof. The modified polyvinyl alcohol can include a carboxylated polyvinyl alcohol, a sulfonated polyvinyl alcohol, a sulfated polyvinyl alcohol, a sulfonated-carboxylated polyvinyl alcohol, or a mixture thereof.

In other embodiments, the process for making a creping adhesive can include reacting a polyamidoamine, a first crosslinker, and a second crosslinker in the presence of a solvent and a modified polyvinyl alcohol to produce a crosslinked resin that can include polyamidoamine backbones crosslinked by primary crosslinking moieties and secondary crosslinking moieties. The first crosslinker can include a first functionally symmetric crosslinker. The second crosslinker can include an epihalohydrin, a second functionally symmetric crosslinker, or a mixture thereof. The modified polyvinyl alcohol can include a carboxylated polyvinyl alcohol, a sulfonated polyvinyl alcohol, a sulfated polyvinyl alcohol, a sulfonated-carboxylated polyvinyl alcohol, or a mixture thereof.

In other embodiments, the process for making a creping adhesive can include reacting a polyamidoamine and a functionally symmetric crosslinker in the presence of a solvent to produce a prepolymer that can include polyamidoamine backbones crosslinked by primary crosslinking moieties derived from the functionally symmetric crosslinker. The process can also include reacting the prepolymer and an epihalohydrin in the presence of the solvent to produce a crosslinked polyamidoamine that can include polyamidoamine backbones crosslinked by the primary crosslinking moieties and propanediyl moieties. The process can also include blending the crosslinked resin with a modified polyvinyl alcohol to produce the creping adhesive. The modified polyvinyl alcohol can include a carboxylated polyvinyl alcohol, a sulfonated polyvinyl alcohol, a sulfated polyvinyl alcohol, a sulfonated-carboxylated polyvinyl alcohol, or a mixture thereof.

In other embodiments, the process for making a creping adhesive can include reacting a polyamidoamine with a functionally symmetric crosslinker in the presence of a solvent and a polyvinyl alcohol, a modified polyvinyl alcohol, or a mixture thereof to produce a crosslinked resin that can include polyamidoamine backbones crosslinked by primary crosslinking moieties derived from the functionally symmetric crosslinker. The modified polyvinyl alcohol can include a carboxylated polyvinyl alcohol, a sulfonated polyvinyl alcohol, a sulfated polyvinyl alcohol, a sulfonated-carboxylated polyvinyl alcohol, or a mixture thereof.

In other embodiments, the process for making a creping adhesive can include blending a resin mixture with a modified polyvinyl alcohol to produce the creping adhesive. The resin mixture can include a solvent and a crosslinked resin. The crosslinked resin can include polyamidoamine backbones crosslinked by primary crosslinking moieties and propanediyl moieties. The primary crosslinking moieties can be derived from a functionally symmetric crosslinker. The modified polyvinyl alcohol can include a carboxylated polyvinyl alcohol, a sulfonated polyvinyl alcohol, a sulfated polyvinyl alcohol, a sulfonated-carboxylated polyvinyl alcohol, or any mixture thereof.

In some embodiments, a process for creping a paper web can include applying to a rotating creping cylinder a creping adhesive, pressing the paper web against the creping cylinder to adhere the paper web to the creping cylinder, and dislodging the paper web from the creping cylinder with a doctor blade. The creping adhesive can include a solvent, a modified polyvinyl alcohol, and a crosslinked resin. In some embodiments, the crosslinked resin can include polyamidoamine backbones crosslinked by primary crosslinking moieties and propanediyl moieties, where the primary crosslinking moieties can be derived from a functionally symmetric crosslinker. In other embodiments, the crosslinked resin can include polyamidoamine backbones crosslinked by primary crosslinking moieties and secondary crosslinking moieties, where the primary crosslinking moieties can be derived from a first functionally symmetric crosslinker and the secondary crosslinking moieties can be derived from a second functionally symmetric crosslinker. The modified polyvinyl alcohol can include a carboxylated polyvinyl alcohol, a sulfonated polyvinyl alcohol, a sulfated polyvinyl alcohol, a sulfonated-carboxylated polyvinyl alcohol, or a mixture thereof.

In other embodiments, a process for creping a paper web can include applying to a surface of a rotating creping cylinder a creping adhesive, pressing the paper web against the creping cylinder to adhere the paper web to the creping cylinder, and dislodging the paper web from the creping cylinder with a doctor blade. The creping adhesive can include a solvent, a crosslinked resin, and a polyvinyl alcohol, a modified polyvinyl alcohol, or a mixture thereof. The crosslinked resin can include polyamidoamine backbones crosslinked by primary crosslinking moieties, where the primary crosslinking moieties can be derived from a functionally symmetric crosslinker. The modified polyvinyl alcohol can include a carboxylated polyvinyl alcohol, a sulfonated polyvinyl alcohol, a sulfated polyvinyl alcohol, a sulfonated-carboxylated polyvinyl alcohol, or a mixture thereof.

DETAILED DESCRIPTION

In some embodiments, the creping adhesive can include, but is not limited to, a solvent, a modified polyvinyl alcohol, and a crosslinked resin. The crosslinked resin can be or can include polyamidoamine backbones crosslinked by primary crosslinking moieties and propanediyl moieties. The primary crosslinking moieties can be derived from one or more functionally symmetric crosslinkers. The propanediyl moieties can be derived from one or more epihalohydrins. As used herein, the phrase "functionally symmetric crosslinker" refers to a compound having two reactive moieties or reactive groups that are the same and are each capable of reacting with a secondary amine of a polyamidoamine backbone to effect crosslinking of two polyamidoamine backbones.

It has been surprisingly and unexpectedly discovered that reacting one or more epihalohydrins and one or more polyamidoamines crosslinked by primary crosslinking moieties in the presence of a solvent and a modified polyvinyl alcohol can produce a creping adhesive having a significantly improved single phase stability, a significantly decreased film solubility, a significantly increased adhesion, and/or an increased film thickness, as compared to reacting the same reactants in the presence of the same solvent and a polyvinyl alcohol, i.e., a non-modified polyvinyl alcohol, or in the presence of only the solvent. It has also been surprisingly and unexpectedly discovered that blending a mixture that includes the solvent and the crosslinked resin that includes polyamidoamine backbones crosslinked by primary crosslinking moieties and propanediyl moieties with a modified polyvinyl alcohol can also produce a creping adhesive having a significantly improved single phase stability, a significantly decreased film solubility, and/or a significantly increased adhesion, as compared to the mixture of the solvent and the crosslinked resin alone and also as compared to blending the mixture of the solvent and the crosslinked polyamidoamine with a polyvinyl alcohol, i.e., a non-modified polyvinyl alcohol.

In general, the incorporation of polyvinyl alcohol into creping adhesives leads to lower adhesion and greater film solubility. The incorporation of the modified polyvinyl alcohols and the processes for making the creping adhesives, as disclosed herein, however, leads to changes in the opposite direction, i.e., higher adhesion and less film solubility. As such, the creping adhesives disclosed herein can provide a wider window of operation that provides levels of adhesion and film solubility that have not been reached before.

The creping adhesive can include about 1 wt %, about 5 wt %, about 10 wt %, about 20 wt %, about 30 wt %, about 40 wt % or about 50 wt % to about 60 wt %, about 70 wt %, about 80 wt %, about 90 wt %, or about 99 wt % of the crosslinked resin, based on a combined weight of the modified polyvinyl alcohol and the crosslinked resin. In some embodiments, the creping adhesive can include about 1 wt %, about 15 wt %, about 25 wt %, or about 45 wt % to about 55 wt %, about 75 wt %, about 85 wt %, or about 98 wt % of the solvent, about 1 wt %, about 5 wt %, about 10 wt %, about 15 wt %, about 25 wt %, or about 35 wt % to about 40 wt %, about 50 wt %, about 60 wt %, or about 70 wt % of the modified polyvinyl alcohol, and about 1 wt %, about 5 wt %, about 10 wt %, about 15 wt %, about 25 wt %, or about 35 wt % to about 40 wt %, about 50 wt %, about 60 wt %, or about 70 wt % of the crosslinked resin, based on a combined weight of the solvent, the modified polyvinyl alcohol, and the crosslinked resin.

The solvent can be or can include, but is not limited to, water, an alkylene glycol, a polyalkylene glycol, or any mixture thereof. In some embodiments, the solvent can be water, e.g., tap water, distilled water, and/or deionized water. Suitable alkylene glycols can be or can include, but are not limited to, ethylene glycol, propylene glycol, or a mixture thereof. Suitable polyalkylene glycols can be or can include, but are not limited to, polyethylene glycol, polypropylene glycol, or a mixture thereof.

The modified polyvinyl alcohol can be or can include, but is not limited to, a carboxylated polyvinyl alcohol, a sulfonated polyvinyl alcohol, a sulfated polyvinyl alcohol, a sulfonated-carboxylated polyvinyl alcohol, or any mixture thereof. In some embodiments, the carboxylated polyvinyl alcohol can have the following chemical formula (I):

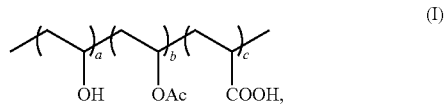

where a is a number from 1 to 99, b is a number from 0 to 30, and c is a number from 1 to 20. In other embodiments, the carboxylated polyvinyl alcohol can have the following chemical formula (II):

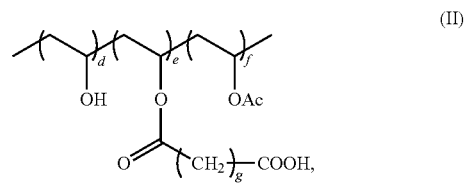

where d is a number from 1 to 98, e is a number from 1 to 20, f is a number from 0 to 30, and 1 is a number from 0-10. The sulfonated polyvinyl alcohol can have the following chemical formula (III):

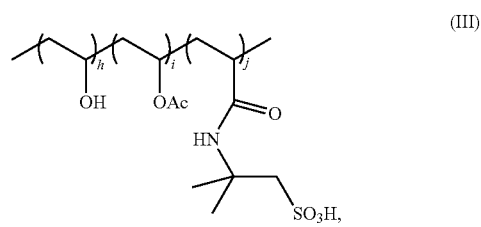

where h is a number from 1 to 98, i is a number from 0 to 30, and j is a number from 1 to 20. The sulfated polyvinyl alcohol can have the following chemical formula (IV):

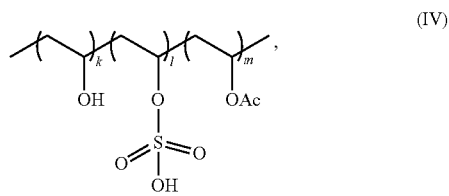

where k is a number from 1 to 98, 1 is a number from 1 to 20, and m is a number from 0 to 30. In some embodiments, the sulfonated-carboxylated polyvinyl alcohol can have the following chemical formula (V):

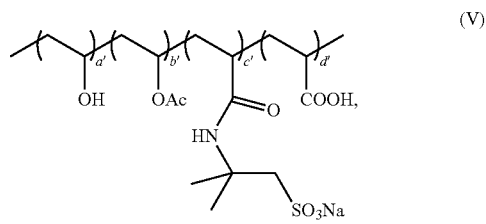

where a' is a number from 1 to 97, b' is a number from 1 to 30, c' is a number from 1 to 20, and d' is a number from 1 to 10. In other embodiments, the sulfonated-carboxylated polyvinyl alcohol can have the following chemical formula (VI):

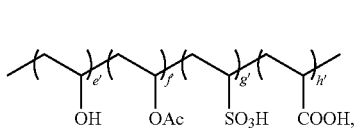

where e' is a number from 1 to 97, f' is a number from 1 to 30, g' is a number from 1 to 20, and h' is a number from 1 to 20.

The epihalohydrin can be or can include, but is not limited to, epichlorohydrin, epibromohydrin, epiiodohydrin, or any mixture thereof. In some embodiments, the epihalohydrin can be epichlorohydrin.

In some embodiments, the functionally symmetric crosslinker can be or can include, but is not limited to, compounds having one or more of the following chemical formulas (VII), (VIII), (IX), (X), (XI), or (XII):

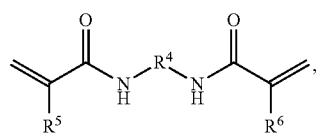

where $R^4$ can be $(CH_2)_t$, t can be 1, 2, or 3, and $R^5$ and $R^6$ can both be a hydrogen atom or a methyl group;

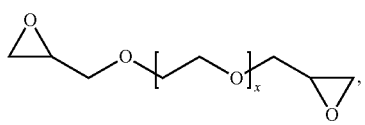

where x can be a number from 1 to about 100;

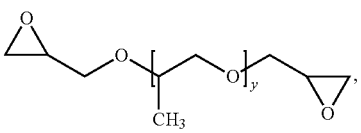

where y can be a number from 1 to about 100;

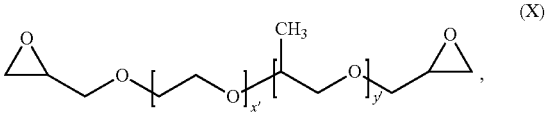

where x'+y' can be a number from 1 to about 100;

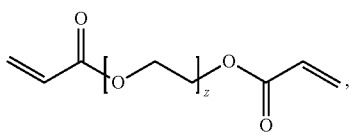

wherein z can be a number from 1 to about 100; or

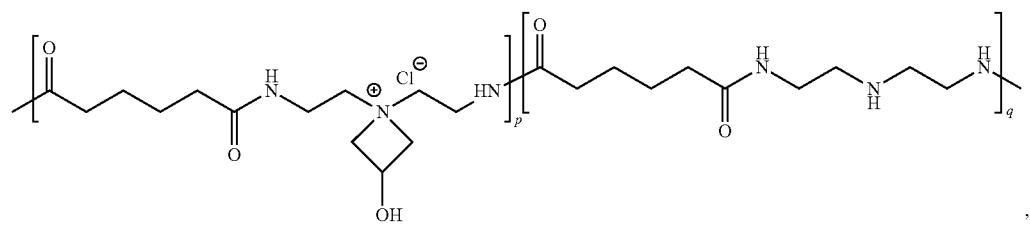

wherein a q/p ratio can be a number from about 10 to about 1000. In other embodiments, the functionally symmetric crosslinker can be a copolymer of an acrylate monomer, a methacrylate monomer, an alkene monomer, or a diene monomer, with an azetidinium-functionalized monomer selected from

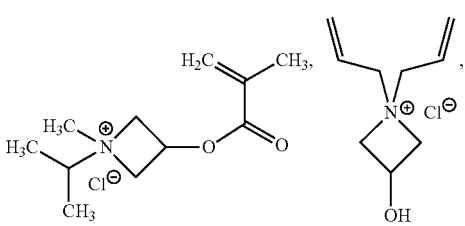

and a mixture thereof, where a fraction of the azetidinium-functionalized monomer to the acrylate monomer, the methacrylate monomer, the alkene monomer, or the diene monomer in the copolymer can be from about 0.1% to about 12%.

In other embodiments, the functionally symmetric crosslinker can be a di-acrylate, a bis(acrylamide), a di-epoxide, a polyazetidinium compound, an alkylene glycol diglycidyl ether, a poly(alkylene glycol) diglycidyl ether, a diisocyanate, a 1,3-dialkyldiazetidine-2,4-dione, a dianhydride, a diacyl halide, a dienone, a dialkyl halide, or a mixture thereof. In other embodiments, the functionally symmetric crosslinker can be N,N'-methylene-bis-acrylamide (MBA), N,N'-methylene-bis-methacrylamide (MBMA), ethylene glycol diglycidyl ether, propylene glycol diglycidyl ether, poly(ethylene glycol) diglycidyl ether, poly(propylene glycol) diglycidyl ether, poly (ethylene glycol) diacrylate, poly (propylene glycol) diacrylate, or a mixture thereof.

The diisocyanate can be unblocked or blocked. The unblocked diisocyanate can be or can include, but is not limited to, 4,4'-methylene diphenyl diisocyanate (methylene diphenyl diisocyanate, MDI); toluene-2,4-diisocyanate (toluene diisocyanate, TDI); 1,6-hexane diisocyanate (hexamethylene diisocyanate, HDI); 5-isocyanato-1-(isocyanatomethyl)-1,3,3-trimethyl-cyclohexane (isophorone diisocyanate, IPDI), or any mixture thereof. The blocked diisocyanate can be or can include, but is not limited to, bis-caprolactam blocked 4,4'-methylene diphenyl diisocyanate; 4,4'-methylene diphenyl diisocyanate bis(2-buanone oxime) adduct, bis-(3,5-dimethylpyrazole) blocked 4,4'-methylene diphenyl diisocyanate, or any mixture thereof.

The 1,3-dialkyldiazetidine-2,4-dione can be or can include, but is not limited to, 1,3-diazetidine-2,4-dione; 1,3-dimethyl-1,3-diazetidine-2,4-dione; 1,3-diethyl-1,3-diazetidine-2,4-dione; 1,3-diphenyl-1,3-diazetidine-2,4-dione; or any mixture thereof. The dianhydride can be or can include, but is not limited to, pyromellitic dianhydride; ethylene glycol bis (trimellitic anhydride); 4,4'-bisphenol A dianhydride, or any mixture thereof. The diacyl halide can be or can include, but is not limited to, oxalyl chloride, oxalyl bromide, succinyl chloride, benzene-1,2-dicarbonyl dichloride, benzene-1,2-dicarbonyl bromide, phthaloyl chloride, or any mixture thereof. The dienone can be or can include, but is not limited to, 1,7-octadiene-3,6-dione; bis (2-propen-1-one)-(1,4-benzene), or any mixture thereof. The dialkyl halide can be or can include, but is not limited to, 1,2-dichloroethane; 1,2-dibromoethane; 1,2-diiodoethane; 1,2-dichloropropane; 1,2-dibromopropane; 1,3-dichloropropane; 1,3-dibromopropane; 1,3-diiodopropane; 1,4-bis (chloromethyl)benzene; 1,4-bis(bromomethyl)benzene, or any mixture thereof.

In some embodiments, in addition to the modified polyvinyl alcohol, the creping adhesive can include polyvinyl alcohol, i.e., a non-modified polyvinyl alcohol. The polyvinyl alcohol can have the following chemical formula (XIII):

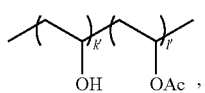

(XIII)

and
where k' is a number from 1 to 99 and l' is a number from 0 to 30. Accordingly, as used herein, the term "polyvinyl alcohol" does not include or otherwise encompass a modified polyvinyl alcohol because the polyvinyl alcohol only has hydroxyl groups and possibly acetate groups. Likewise, as used herein, the term "modified polyvinyl alcohol" does not include or otherwise encompass a "polyvinyl alcohol" because the modified polyvinyl alcohol, in addition to having hydroxyl groups and possibly acetate groups, also has carboxyl groups or sulfonated groups.

In some embodiments, the polyamidoamine backbones can be derived from a polyamidoamine having chemical formula (XIV):

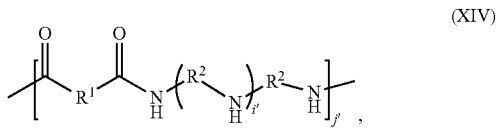

(XIV)

where $R^1$ can be $(CH_2)_u$, u can be 1, 2, 3, 4, or 5, each $R^2$ can independently be $(CH_2)_v$, v can be 2, 3, or 4, i' can be 1, 2, or 3, and j' can be a number from 1 to about 10,000. In some embodiments, the polyamidoamine can have a weight average molecular weight of about 3 kDa, about 5 kDa, or about 8 kDa to about 12 kDa, about 16 kDa, or about 20 kDa.

Suitable polyamidoamines can be prepared by reacting one or more polyamines, e.g., a polyalkylene polyamine, and one or more dicarboxylic acids (diacids) and/or a corresponding dicarboxylic acid halide or diester thereof. For example, the polyamidoamine can be made by reacting one or more polyalkylene polyamines and one or more polycarboxylic acids.

In some embodiments, the polyalkylene polyamine can be or can include, but is not limited to, ethylenediamine, diethylenetriamine (DETA), triethylenetetramine (TETA), aminoethyl piperazine, tetraethylenepentamine, pentaethylenehexamine, N-(2-aminoethyl)piperazine, N,N'-bis(2-aminoethyl)-ethylenediamine, diaminoethyl triaminoethylamine, piperazinethyl triethylenetetramine, or any mixture thereof. In some embodiments, the polycarboxylic acid can be succinic acid, glutaric acid, 2-methylsuccinic acid, adipic acid, pimelic acid, suberic acid, azelaic acid, sebacic acid, undecanedioic acid, dodecandioic acid, 2-methylglutaric acid, 3,3-dimethylglutaric acid, tricarboxypentanes, e.g., 4-carboxypimelic, alicyclic saturated acids, e.g., 1,2-cyclohexanedicarboxylic, 1-3-cyclohexanedicarboxylic, 1,4-cyclohexanedicarboxylic, and 1-3-cyclopentanedicarboxylic, unsaturated aliphatic acids, e.g., maleic acid, fumaric acid, itaconic acid, citraconic acid, mesaconic acid, aconitic acid, and hexane-3-diotic acid; unsaturated alicyclic acids, e.g., 1,4-cyclohexenedicarboxylic; aromatic acids, e.g., phthalic acid, isophthalic acid, terephthalic acid, 2,3-naphthalenedicarboxylic acid, and benzene-1,4-diacetic acid; and heteroaliphatic acids, e.g., diglycolic acid, thiodiglycolic acid, dithiodiglycolic acid, iminodiacetic acid, and methyliminodiacetic acid; salts thereof; esters thereof; hydrates thereof; isomers thereof; or any mixture thereof. In some embodiments, the diester can include dimethyl glutarate, dimethyl adipate, dimethyl succinate, or any mixture thereof.

In some embodiments, the polyamidoamine can be produced by heating a mixture of a dicarboxylic acid and the polyamine to a temperature of about 110° C. to about 250° C. For example, the mixture of the dicarboxylic acid and the polyamine can be heated to a temperature of about 110° C., about 125° C., about 140° C. to about 160° C., about 175° C., about 190° C., or about 200° C. at atmospheric pressure. In some embodiments the reaction between the polyamine and the dicarboxylic acid can be carried out under a reduced pressure and the reaction temperature can be reduced to about 75° C. to 150° C. The time of reaction can depend, at least in part, on the temperature and/or pressure and can generally be from about 0.5 hours to about 4 hours. The reaction can be continued to substantial completion. The reaction between the first polyamine and the first dicarboxylic acid can produce water as a byproduct, which can be removed by distillation. At the end of the reaction, the resulting product can be dissolved or dispersed in water to provide any desired concentration such as an aqueous polyamidoamine resin having about 50 wt % total resin solids.

In carrying out the reaction between the polyamine and the dicarboxylic acid, the amount of the dicarboxylic acid can be sufficient to react substantially completely with the primary amine groups of the polyamine but insufficient to substantially react with the secondary amine groups of the polyamine. In some embodiments, the molar ratio of the polyamine to the dicarboxylic acid can be from a low of about 0.8:1, about 0.85:1, about 0.9:1, about 0.95:1, or about 1:1 to a high of about 1:1, about 1.05:1, about 1.1:1, about 1.2:1, about 1.3:1, or about 1.4:1.

In other embodiments, an ester of a dicarboxylic acid can be used instead of dicarboxylic acid for reaction with the polyamine and the reaction can be conducted at a lower temperature, such as about 100° C. to about 175° C. at atmospheric pressure. If the reaction between the polyamine and the diester is carried out under a reduced pressure the reaction temperature can be reduced to about 75° C. to about 150° C. In this case, the byproduct can be an alcohol, the type of alcohol depending upon the identity of the diester. For example, if a dimethyl ester is used as a reactant, the alcohol byproduct can be methanol. The molar ratio between the polyamine and the diester can be the same as the ratio between the polyamine and the dicarboxylic acid. Suitable polyamidoamines can include those disclosed in U.S. Pat. Nos. 9,045,862; and 9,611,590.

In some embodiments, the creping adhesive can be produced or synthesized according to a first synthesis process. The first synthesis process can include reacting the polyamidoamine and the functionally symmetric crosslinker (the first crosslinker) in the presence of the solvent to produce a prepolymer that can include polyamidoamine backbones crosslinked by primary crosslinking moieties. The prepolymer and the epihalohydrin (the second crosslinker) can be reacted in the presence of the solvent and the modified polyvinyl alcohol to produce the crosslinked resin that can include polyamidoamine backbones crosslinked by primary crosslinking moieties and propanediyl moieties.

In other embodiments, the creping adhesive can be produced or synthesized according to a second synthesis process. The second synthesis process can include reacting the polyamidoamine and the functionally symmetric cross linker (the first crosslinker) in the presence of the solvent and the modified polyvinyl alcohol to produce the prepolymer that can include the polyamidoamine backbones crosslinked by primary crosslinking moieties. The prepolymer and the epihalohydrin (the second crosslinker) can be reacted in the presence of the solvent and the modified polyvinyl alcohol to produce the crosslinked resin that can include polyamidoamine backbones crosslinked by primary crosslinking moieties and propanediyl moieties.

The polyamidoamine and the functionally symmetric crosslinker can be reacted in the presence of the solvent or in the presence of the solvent and the modified polyvinyl alcohol at a temperature of about 30° C., about 35° C., or about 40° C. to about 80° C., about 90° C., or about 100° C. to produce the prepolymer. The polyamidoamine and the functionally symmetric crosslinker can be reacted in the presence of the solvent or in the presence of the solvent and the modified polyvinyl alcohol for about 30 minutes, about 1 hour, about 2 hours, or about 4 hours to about 6 hours, about 8 hours, about 10 hours, or about 12 hours to produce the prepolymer. In some embodiments, during reaction the reaction mixture can be agitated, e.g., stirred.

The prepolymer and the epihalohydrin can be reacted in the presence of the solvent and the modified polyvinyl alcohol at a temperature of about 40° C., about 45° C., about 50° C., or about 55° C. to about 80° C., about 85° C., or about 90° C. to produce the crosslinked resin. The prepolymer and the epihalohydrin can be reacted in the presence of the solvent and the modified polyvinyl alcohol for about 30 minutes, about 1 hour, about 2 hours, or about 4 hours to about 6 hours, about 8 hours, or about 10 hours to produce the crosslinked resin. In some embodiments, during reaction the reaction mixture can be agitated, e.g., stirred.

In other embodiments, the creping adhesive can be produced or synthesized according to a third synthesis process. The third synthesis process can include reacting the polyamidoamine, the functionally symmetric crosslinker (the first crosslinker), and the epihalohydrin (the second crosslinker) in the presence of the solvent and the modified polyvinyl alcohol to produce the crosslinked resin that can include the polyamidoamine backbones crosslinked by the primary crosslinking moieties and the propanediyl moieties.

The polyamidoamine, the functionally symmetric crosslinker, and the epihalohydrin can be reacted in the presence of the solvent and the modified polyvinyl alcohol at a temperature of about 30° C., about 35° C., or about 40° C. to about 80° C., about 90° C., or about 100° C. to produce the crosslinked resin. The polyamidoamine, the functionally symmetric crosslinker, and the epihalohydrin can be reacted in the presence of the solvent and the modified polyvinyl alcohol for about 30 minutes, about 1 hour, about 2 hours, or about 4 hours to about 6 hours, about 8 hours, about 10 hours, or about 12 hours. In some embodiments, during reaction the reaction mixture can be agitated, e.g., stirred.

The crosslinked resin produced according to the first, second, and third synthesis processes can have a weight average molecular weight (Mw) of about 25 kDa, about 50 kDa, about 100 kDa, about 250 kDa, or about 500 kDa to about 750 kDa, about 1,000 kDa, about 1,250 kDa, or about 1,500 kDa. The weight average molecular weight can be determined using size exclusion chromatography coupled with a multiangle light scattering detector (SEC-MALS). A series of SEC columns, e.g., TSKgel PWXL-CP (TOSOH BIOSCIENCE), can be used to separate polymers of different hydrodynamic radius. The SEC-MALS method uses an aqueous mobile phase containing salt and buffer. Two detectors are used, including a MALS detector (HELEOS-II, WYATT TECHNOLOGY) and a differential refractometer detector (Optilab T-rEX, WYATT TECHNOLOGY). The SEC-MALS technique for measuring the weight average molecular weight of a polymer is well understood by those skilled in the art.

The creping adhesive produced according to the first, second, and third synthesis processes can have or can be adjusted to have a pH of about 6, about 6.5, or about 7 to about 8, about 9, about 10, or about 10.5. In some embodiments, the pH of the creping adhesive can be adjusted to about 7 to about 9. Any suitable acid, e.g., sulfuric acid, or any suitable base, e.g., sodium hydroxide, can be added to the creping adhesive to adjust the pH to a desired pH value. In some embodiments, one or more multifunctional acids can be used to adjust the pH of the creping adhesive. Suitable multifunctional acids can be or can include, but are not limited to, oxalic acid, malonic acid, succinic acid, glutaric acid, adipic acid, pimelic acid, suberic acid, azelaic acid, sebacic acid, phthalic acid, isophthalic acid, terephthalic acid, citric acid, isocitric acid, aconitic acid, carballylic acid, glycolic acid, lactic acid, malic acid, tartaric acid, gluconic acid, maleic acid, fumaric acid, ascorbic acid, aspartic acid, glutamic acid, 4-hydroxy-benzoic acid, 2,4-dihydroxy benzoic acid, sulfamic acid, methanesulfonic acid, 4-toluene sulfonic acid, xylene sulfonic acid, phenol sulfonic acid, or any mixture thereof. In some embodiments, the acid can be or can include, but is not limited to, one or more mineral acids, e.g., sulfuric acid, hydrochloric acid, nitric acid, phosphoric acid, boric acid, hydrofluoric acid, or any mixture thereof.

The creping adhesive produced according to the first, second, and third synthesis processes can have or can be adjusted to have a viscosity of about 20 cP, about 50 cP, about 100 cP, or about 250 cP to about 500 cP, about 650 cP, about 800 cP, about 900 cP, about 1,000 cP, or about 1,200 cP at a temperature of about 25° C. The viscosity of the creping adhesive can be measured with a Brookfield viscometer, e.g., Brookfield DV-E Viscometer, #61/62 spindle at 60 rpm. In some embodiments, additional solvent, additional modified polyvinyl alcohol, and/or polyvinyl alcohol can be added to adjust the viscosity of the creping adhesive.

The creping adhesive produced according to the first, second, and third synthesis processes can have an adhesion of about 25 gram-force per inch about 50 gram-force per inch, about 100 gram-force per inch or about 250 gram-force per inch to about 500 gram-force per inch, about 600 gram-force per inch, about 700 gram-force per inch, or about 800 gram-force per inch.

The adhesion of the creping adhesive can be measured according to the following processes. This test measures the force required to peel a cotton strip from a heated metal plate. First a film of the adhesive composition is applied to the metal panel by means of a #40 coating rod. The adhesive is applied to the panel at about 15% actives. The metal plate is heated to and at this point a wet cotton strip is pressed into the film by means of a 1.9 kg cylindrical roller. After the strip is applied, the metal plate is placed in an oven heated to a temperature of about 105° C. for about 15 minutes to dry the strip. The metal plate is then clamped in a tensile testing apparatus. One end of the cotton cloth is clamped in the pneumatic grip of the tester and the cloth is peeled from the panel at an angle of 180° and at a constant speed. During the peeling the temperature of the metal plate is maintained at a temperature of about 100° C.

The creping adhesive produced according to the first, second, and third synthesis processes can have a film solubility of about 10%, about 20%, about 30%, about 40%, or about 50% to about 60%, about 70%, about 80%, about 90%, about 95%, or about 99%.

The film solubility of the creping adhesive can be measured according to the following procedure. A creping adhesive is applied uniformly on the paper substrate, dried in an oven at 105° C. for one hour, and then weighed. The paper substrate and dried film is placed in a jar containing water at 50° C. and subjected to constant stirring for an hour. The paper substrate is dried one more time at 105° C. for two hours and weighed. After correcting for the mass of the paper substrate without the formulation, the mass of the film that goes in solution may be determined as a percentage of the mass of the original dry film. The range of the film solubility goes from 0 to 100%, with the higher the percentage corresponding to a greater amount of the creping adhesive that dissolved in the water.

The creping adhesive produced according to the first, second, and third synthesis processes can be single phase stable. The creping adhesive is determined to be single phase stable when the creping adhesive does not form a visible interface after 24 hours when allowed to rest at room temperature. In some embodiments, the creping adhesive can be single phase stable for at least 1 day, at least 2 days, at least 3 days, at least 5 days, at least 10 days, at least 30 days, at least 45 days, at least 60 days, at least 75 days, or at least 90 days.

An exemplary reaction scheme for making the creping adhesive according to the first and second synthesis processes described above can be carried out according to the following reaction scheme (I), which reacts a prepolymer that includes polyamidoamine backbones crosslinked by primary crosslinking moieties with epichlorohydrin in the presence of a modified polyvinyl alcohol ($R^7$ can be $(CH_2)_{m'}$, m' can be 1, 2, 3, 4, or 5, and $R^8$ can be derived from a functionally symmetric crosslinker):

Scheme 1

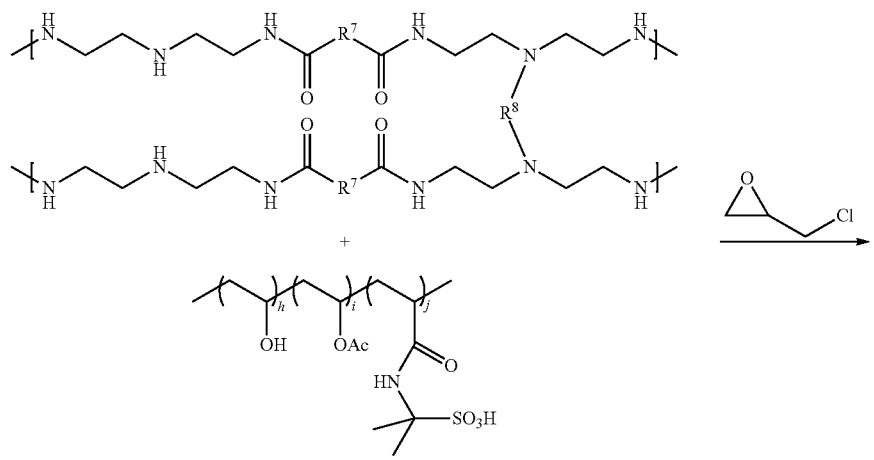

-continued

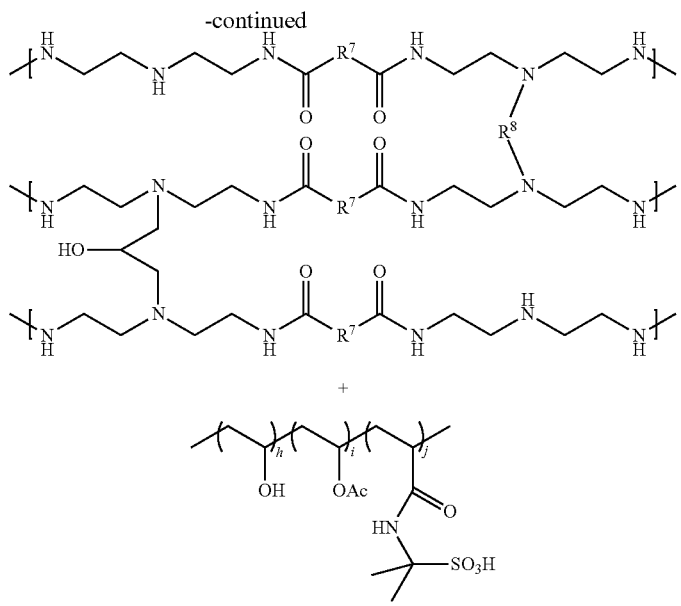

In some embodiments, the creping adhesive can be produced or synthesized according to a fourth synthesis process. The fourth synthesis process can include reacting the polyamidoamine and the functionally symmetric crosslinker in the presence of the solvent to produce the prepolymer that can include polyamidoamine backbones crosslinked by primary crosslinking moieties derived from the functionally symmetric crosslinker. The prepolymer and the epihalohydrin can be reacted in the presence of the solvent to produce a crosslinked polyamidoamine that can include polyamidoamine backbones crosslinked by the primary crosslinking moieties and the propanediyl moieties. The crosslinked resin and the modified polyvinyl alcohol can be blended with one another to produce the creping adhesive.

The polyamidoamine and the functionally symmetric crosslinker can be reacted at a temperature of about 30° C., about 35° C., or about 40° C. to about 80° C., about 90° C., or about 100° C. to produce the prepolymer. The polyamidoamine and the functionally symmetric crosslinker can be reacted for about for about 30 minutes, about 1 hour, about 2 hours, or about 4 hours to about 6 hours, about 8 hours, about 10 hours, or about 12 hours to produce the prepolymer. In some embodiments, during reaction the reaction mixture can be agitated, e.g., stirred.

The prepolymer and the epihalohydrin can be reacted in the presence of the solvent at a temperature of about 40° C., about 45° C., about 50° C., or about 55° C. to about 80° C., about 85° C., or about 90° C. to produce the crosslinked resin. The prepolymer and the epihalohydrin can be reacted in the presence of the solvent for about 30 minutes, about 1 hour, about 2 hours, or about 4 hours to about 6 hours, about 8 hours, or about 10 hours to produce the crosslinked resin. In some embodiments, during reaction the reaction mixture can be agitated, e.g., stirred.

In other embodiments, the creping adhesive can be produced or synthesized according to a fifth synthesis process. The fifth synthesis process can include blending a resin mixture and a modified polyvinyl alcohol to produce the creping adhesive. The resin mixture can include the solvent and the crosslinked resin. The crosslinked resin can include polyamidoamine backbones crosslinked by the primary crosslinking moieties and the propanediyl moieties. The primary crosslinking moieties can be derived from the functionally symmetric crosslinker. The modified polyvinyl alcohol can be or can include a carboxylated polyvinyl alcohol, a sulfonated polyvinyl alcohol, a sulfated polyvinyl alcohol, a sulfonated-carboxylated polyvinyl alcohol, or a mixture thereof.

The resin mixture and the modified polyvinyl alcohol can be blended with one another at a temperature of about 20° C., about 30° C., or about 40° C. to about 50° C., about 60° C., or about 70° C. The crosslinked resin and the modified polyvinyl alcohol can be blended with one another for about 15 minutes, about 30 minutes, or about 1 hour to about 1.5 hours, about 2 hours, or about 3 hours.

The crosslinked resin produced according to the fourth and fifth synthesis processes can have a weight average molecular weight (Mw) of about 25 kDa, about 50 kDa, about 100 kDa, about 250 kDa, or about 500 kDa to about 750 kDa, about 1,000 kDa, about 1,250 kDa, or about 1,500 kDa.

The creping adhesive produced according to the fourth and fifth synthesis processes can have or can be adjusted to have a pH of about 6, about 6.5, or about 7 to about 8, about 9, about 10, or about 10.5. Any suitable acid, e.g., sulfuric acid, or any suitable base, e.g., sodium hydroxide, can be added to the creping adhesive to adjust the pH to a desired pH value.

The creping adhesive produced according to the fourth and fifth synthesis processes can have or can be adjusted to have a viscosity of about 20 cP, about 50 cP, about 100 cP, or about 250 cP to about 500 cP, about 650 cP, about 800 cP, about 900 cP, about 1,000 cP, or about 1,200 cP at a temperature of about 25° C. In some embodiments, additional solvent, additional modified polyvinyl alcohol, and/or polyvinyl alcohol can be added to adjust the viscosity of the creping adhesive.

The creping adhesive produced according to the fourth and fifth synthesis processes can have an adhesion of about 25 gram-force per inch about 50 gram-force per inch, about 100 gram-force per inch or about 250 gram-force per inch to about 500 gram-force per inch, about 600 gram-force per inch, about 700 gram-force per inch, or about 800 gram-force per inch.

The creping adhesive produced according to the fourth and fifth synthesis processes can have a film solubility of about 10%, about 20%, about 30%, about 40%, or about 50% to about 60%, about 70%, about 80%, about 90%, about 95%, or about 99%.

The creping adhesive produced according to the fourth and fifth synthesis processes can be single phase stable.

In some embodiments, the creping adhesive can include the solvent, the modified polyvinyl alcohol, and a crosslinked resin, where the crosslinked resin can include polyamidoamine backbones crosslinked by primary crosslinking moieties and secondary crosslinking moieties. The primary crosslinking moieties can be derived from a first functionally symmetric crosslinker and the secondary crosslinking moieties can be derived from a second functionally symmetric crosslinker. The first functionally symmetric crosslinker and the second functionally symmetric crosslinker can be different from one another. For embodiment, the first functionally symmetric crosslinker and the second functionally symmetric crosslinker can have different chemical structures. The solvent and the modified polyvinyl alcohol can be or can include one or more of the solvents and one or more of the modified polyvinyl alcohols described above. The first functionally symmetric crosslinker and the second functionally symmetric crosslinker can be or can include any one or more of the functionally symmetric crosslinkers described above.

It has been surprisingly and unexpectedly discovered that reacting one or more one or more polyamidoamines that include primary crosslinking moieties derived from a first functionally symmetric crosslinker with a second functionally symmetric crosslinker in the presence of a solvent and a modified polyvinyl alcohol can produce a creping adhesive having a significantly improved single phase stability, a significantly decreased film solubility, and/or a significantly increased adhesion, as compared to reacting the same reactants in the presence of the same solvent and a polyvinyl alcohol, i.e., a non-modified polyvinyl alcohol, or in the presence of only the solvent.

As noted above, in general, the incorporation of polyvinyl alcohol into creping adhesives leads to lower adhesion and greater film solubility. The incorporation of the modified polyvinyl alcohols and the processes for making the creping adhesives, as disclosed herein, however, leads to changes in the opposite direction, i.e., higher adhesion and less film solubility. As such, the creping adhesives disclosed herein can provide a wider window of operation that provides levels of adhesion and film solubility that have not been reached before.

The creping adhesive can include about 1 wt %, about 5 wt %, about 10 wt %, about 20 wt %, about 30 wt %, about 40 wt % or about 50 wt % to about 60 wt %, about 70 wt %, about 80 wt %, about 90 wt %, or about 99 wt % of the crosslinked resin, based on a combined weight of the modified polyvinyl alcohol and the crosslinked resin. In some embodiments, the creping adhesive can include about 1 wt %, about 15 wt %, about 25 wt %, or about 45 wt % to about 55 wt %, about 75 wt %, about 85 wt %, or about 98 wt % of the solvent, about 1 wt %, about 5 wt %, about 10 wt %, about 15 wt %, about 25 wt %, or about 35 wt % to about 40 wt %, about 50 wt %, about 60 wt %, or about 70 wt % of the modified polyvinyl alcohol, and about 1 wt %, about 5 wt %, about 10 wt %, about 15 wt %, about 25 wt %, or about 35 wt % to about 40 wt %, about 50 wt %, about 60 wt %, or about 70 wt % of the crosslinked resin, based on a combined weight of the solvent, the modified polyvinyl alcohol, and the crosslinked resin.

In some embodiments, the creping adhesive can be produced or synthesized according to a sixth synthesis process. The sixth synthesis process can include reacting the polyamidoamine and a first crosslinker in the presence of the solvent to produce a prepolymer that can include polyamidoamine backbones crosslinked by primary crosslinking moieties. The first crosslinker can be or can include a first functionally symmetric crosslinker. The prepolymer and a second crosslinker can be reacted in the presence of the solvent and the modified polyvinyl alcohol to produce a crosslinked resin that can include polyamidoamine backbones crosslinked by primary crosslinking moieties and secondary crosslinking moieties. The second crosslinker can include a second functionally symmetric crosslinker. The first functionally symmetric crosslinker and the second functionally symmetric crosslinker can be or can include any one or more of the functionally symmetric crosslinkers described above. The first functionally symmetric crosslinker and the second functionally symmetric crosslinker can be different from one another. For example, the first functionally symmetric crosslinker and the second functionally symmetric crosslinker can have different chemical structures.

In other embodiments, the creping adhesive can be produced or synthesized according to a seventh synthesis process. The seventh synthesis process can include reacting the polyamidoamine and the first functionally symmetric crosslinker in the presence of the solvent and the modified polyvinyl alcohol to produce the prepolymer that can include the polyamidoamine backbones crosslinked by primary crosslinking moieties. The prepolymer and the second crosslinker can be reacted in the presence of the solvent and the modified polyvinyl alcohol to produce the crosslinked resin that can include polyamidoamine backbones crosslinked by primary crosslinking moieties and secondary crosslinking moieties. The first functionally symmetric crosslinker and the second functionally symmetric crosslinker can be different from one another. For example, the first functionally symmetric crosslinker and the second functionally symmetric crosslinker can have different chemical structures.

The polyamidoamine and the first functionally symmetric crosslinker can be reacted in the presence of the solvent or the solvent and the modified polyvinyl alcohol at a temperature of about 30° C., about 35° C., or about 40° C. to about 80° C., about 90° C., or about 100° C. to produce the prepolymer. The polyamidoamine and the first functionally symmetric crosslinker can be reacted in the presence of the solvent or the solvent and the modified polyvinyl alcohol for about 30 minutes, about 1 hour, about 2 hours, or about 4 hours to about 6 hours, about 8 hours, about 10 hours, or about 12 hours to produce the prepolymer. In some embodiments, during reaction the reaction mixture can be agitated, e.g., stirred.

The prepolymer and the second crosslinker can be reacted in the presence of the solvent and the modified polyvinyl alcohol at a temperature of about 40° C., about 45° C., about 50° C., or about 55° C. to about 80° C., about 85° C., or about 90° C. to produce the crosslinked resin. The prepolymer and the second crosslinker can be reacted in the presence of the solvent and the modified polyvinyl alcohol for about 30 minutes, about 1 hour, about 2 hours, or about 4 hours to about 6 hours, about 8 hours, or about 10 hours to produce the crosslinked resin. In some embodiments, during reaction the reaction mixture can be agitated, e.g., stirred.

In other embodiments, the creping adhesive can be produced or synthesized according to an eighth synthesis process. The eighth synthesis process can include reacting the polyamidoamine, the first functionally symmetric crosslinker, and the second functionally symmetric crosslinker in the presence of the solvent and the modified polyvinyl alcohol to produce the crosslinked resin that can include the polyamidoamine backbones crosslinked by the primary crosslinking moieties and the secondary crosslinking moieties. The first functionally symmetric crosslinker and the second functionally symmetric crosslinker can be different from one another. For example, the first functionally symmetric crosslinker and the second functionally symmetric crosslinker can have different chemical structures.

The polyamidoamine, the first functionally symmetric crosslinker, and the second functionally symmetric crosslinker can be reacted in the presence of the solvent and the modified polyvinyl alcohol at a temperature of about 30° C., about 35° C., or about 40° C. to about 80° C., about 90° C., or about 100° C. to produce the crosslinked resin. The polyamidoamine, the first functionally symmetric crosslinker, and the second functionally symmetric crosslinker can be reacted in the presence of the solvent and the modified polyvinyl alcohol for about 30 minutes, about 1 hour, about 2 hours, or about 4 hours to about 6 hours, about 8 hours, about 10 hours, or about 12 hours. In some embodiments, during reaction the reaction mixture can be agitated, e.g., stirred.

The crosslinked resin produced according to the sixth, seventh, and eighth synthesis processes can have a weight average molecular weight (Mw) of about 25 kDa, about 50 kDa, about 100 kDa, about 250 kDa, or about 500 kDa to about 750 kDa, about 1,000 kDa, about 1,250 kDa, or about 1,500 kDa.

The creping adhesive produced according to the sixth, seventh, and eighth synthesis processes can have or can be adjusted to have a pH of about 6, about 6.5, or about 7 to about 8, about 9, about 10, or about 10.5. Any suitable acid, e.g., sulfuric acid, or any suitable base, e.g., sodium hydroxide, can be added to the creping adhesive to adjust the pH to a desired pH value.

The creping adhesive produced according to the sixth, seventh, and eighth synthesis processes can have or can be adjusted to have a viscosity of about 20 cP, about 50 cP, about 100 cP, or about 250 cP to about 500 cP, about 650 cP, about 800 cP, about 900 cP, about 1,000 cP, or about 1,200 cP at a temperature of about 25° C. In some embodiments, additional solvent, additional modified polyvinyl alcohol, and/or polyvinyl alcohol can be added to adjust the viscosity of the creping adhesive.

The creping adhesive produced according to the sixth, seventh, and eighth synthesis processes can have an adhesion of about 25 gram-force per inch about 50 gram-force per inch, about 100 gram-force per inch or about 250 gram-force per inch to about 500 gram-force per inch, about 600 gram-force per inch, about 700 gram-force per inch, or about 800 gram-force per inch.

The creping adhesive produced according to the sixth, seventh, and eighth synthesis processes can have a film solubility of about 10%, about 20%, about 30%, about 40%, or about 50% to about 60%, about 70%, about 80%, about 90%, about 95%, or about 99%.

The creping adhesive produced according to the sixth, seventh, and eighth synthesis processes can be single phase stable.

An exemplary reaction scheme for making the creping adhesive according to the sixth and seventh synthesis processes described above can be carried out according to the following reaction scheme (II), which reacts a polyamidoamine crosslinked with a primary crosslinking moiety derived from a first functionally symmetric crosslinker (N,N'-methylene-bis-acrylamide) and a second functionally symmetric crosslinker, i.e., an alkylene glycol diglycidyl ether, where r can be a number from 1 to about 100, in the presence of the modified polyvinyl alcohol (where $R^9$ can be $(CH_2)_{m''}$, m" can be 1, 2, 3, 4, or 5):

Scheme II

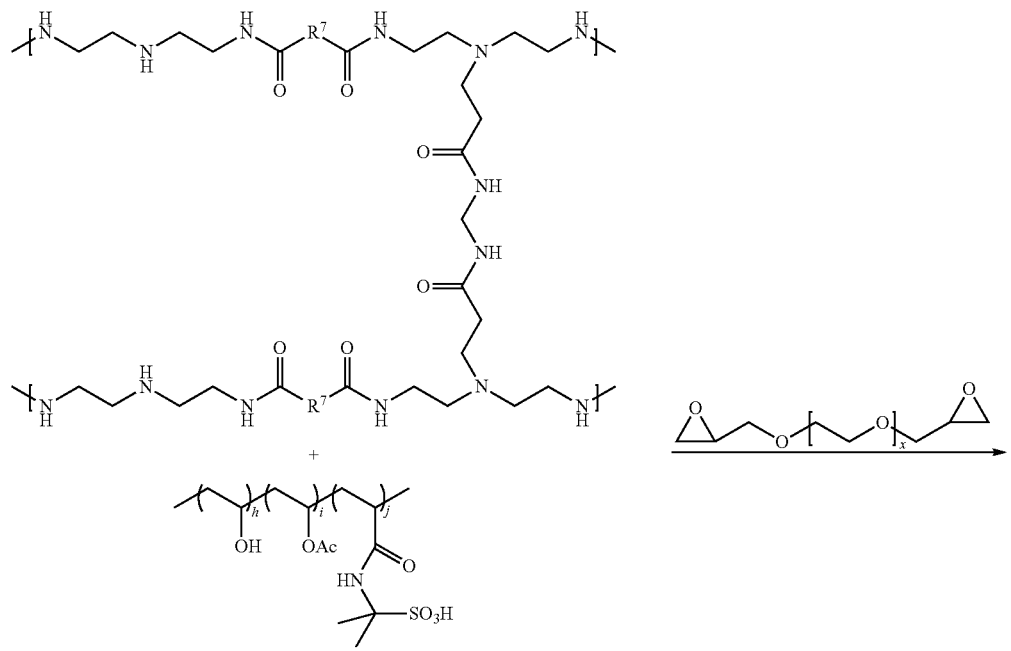

-continued

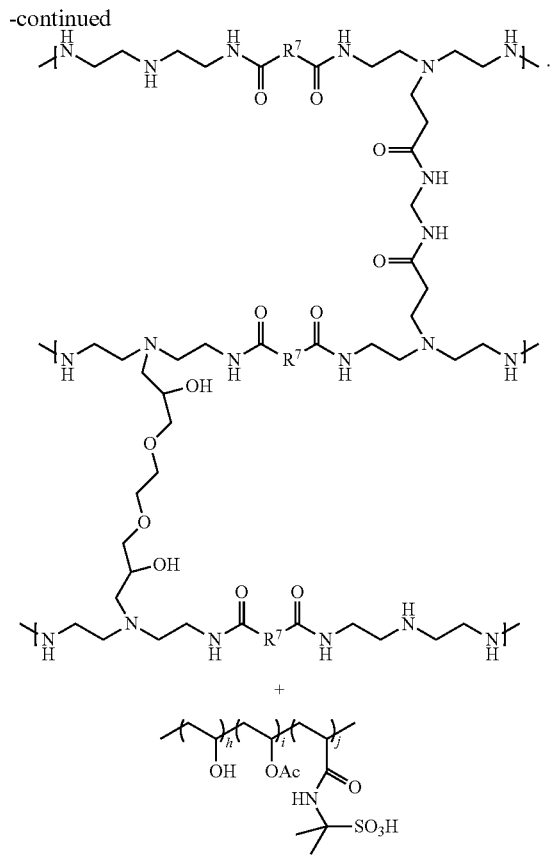

In some embodiments, the creping adhesive can include the solvent, the polyvinyl alcohol, the modified polyvinyl alcohol, or a mixture thereof, and a crosslinked resin that can include polyamidoamine backbones crosslinked by primary crosslinking moieties. The primary crosslinking moieties can be derived from a functionally symmetric crosslinker. In some embodiments, the crosslinked resin can be free of any additional crosslinks derived from an epihalohydrin. The solvent and the modified polyvinyl alcohol can be or can include one or more of the modified polyvinyl alcohols described above. The functionally symmetric crosslinker can be or can include any one or more of the functionally symmetric crosslinkers described above.

It has been surprisingly and unexpectedly discovered that reacting one or more polyamidoamines with one or more functionally symmetric crosslinkers in the presence of a solvent and a polyvinyl alcohol, a modified polyvinyl alcohol, or a mixture thereof can produce a creping adhesive having a significantly improved single phase stability, a significantly decreased film solubility, and/or a significantly increased adhesion, as compared to reacting the same reactants in the presence of the same solvent, but in the absence of any polyvinyl alcohol and any modified polyvinyl alcohol.

As noted above, in general the incorporation of polyvinyl alcohol into creping adhesives leads to lower adhesion and greater film solubility. The incorporation of the modified polyvinyl alcohols and the processes for making the creping adhesives, as disclosed herein, however, leads to changes in the opposite direction, i.e., higher adhesion and less film solubility. As such, the creping adhesives disclosed herein can provide a wider window of operation that provides levels of adhesion and film solubility that have not been reached before.

The creping adhesive can include about 1 wt %, about 5 wt %, about 10 wt %, about 20 wt %, about 30 wt %, about 40 wt % or about 50 wt % to about 60 wt %, about 70 wt %, about 80 wt %, about 90 wt %, or about 99 wt % of the crosslinked resin, based on a combined weight of any polyvinyl alcohol, any modified polyvinyl alcohol, and the crosslinked resin. In some embodiments, the creping adhesive can include about 1 wt %, about 15 wt %, about 25 wt %, or about 45 wt % to about 55 wt %, about 75 wt %, about 85 wt %, or about 98 wt % of the solvent, up to about 5 wt %, about 10 wt %, about 15 wt %, about 20 wt %, about 25 wt %, about 30 wt %, about 40 wt %, about 50 wt %, about 60 wt %, or about 70 wt % of the polyvinyl alcohol, up to about 5 wt %, about 10 wt %, about 15 wt %, about 20 wt %, about 25 wt %, about 30 wt %, about 40 wt %, about 50 wt %, about 60 wt %, or about 70 wt % of the modified polyvinyl alcohol, and about 1 wt %, about 5 wt %, about 10 wt %, about 15 wt %, about 25 wt %, or about 35 wt % to about 40 wt %, about 50 wt %, about 60 wt %, or about 70 wt % of the crosslinked resin, based on a combined weight of the solvent, any polyvinyl alcohol, any modified polyvinyl alcohol, and the crosslinked resin. In some embodiments, the creping adhesive can include about 1 wt %, about 10 wt %, about 15 wt %, or about 20 wt % to about 25 wt %, about 40 wt %, about 55 wt %, or about 70 wt % of a total amount of any polyvinyl alcohol and any modified polyvinyl alcohol, based on the combined weight of the solvent, any polyvinyl alcohol, any modified polyvinyl alcohol, and the crosslinked resin.

In some embodiments, the creping adhesive can be produced or synthesized according to a ninth synthesis process. The ninth synthesis process can include reacting the polyamidoamine with a functionally symmetric crosslinker in the presence of the solvent and the polyvinyl alcohol, the modified polyvinyl alcohol, or a mixture thereof to produce the crosslinked resin that can include polyamidoamine backbones crosslinked by primary crosslinking moieties derived from the functionally symmetric crosslinker. In some embodiments, the polyvinyl alcohol can be present. In other embodiments, the modified polyvinyl alcohol can be present. In still other embodiments, the polyvinyl alcohol and the modified polyvinyl alcohol can be present.

The polyvinyl alcohol, if used to produce the creping adhesive via the ninth synthesis process can have the following chemical formula (XIII):

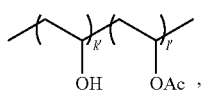
(XIII)

and where k' is a number from 1 to 99 and l' is a number from 0 to 30. It should be understood that the creping adhesive produced according to any of the synthesis processes described herein or any other synthesis process can also include polyvinyl alcohol in addition to the modified polyvinyl alcohol.

The crosslinked resin produced according to the ninth synthesis process can have a weight average molecular weight (Mw) of about 25 kDa, about 50 kDa, about 100 kDa, about 250 kDa, or about 500 kDa to about 750 kDa, about 1,000 kDa, about 1,250 kDa, or about 1,500 kDa.

The creping adhesive produced according to ninth synthesis process can have or can be adjusted to have a pH of about 6, about 6.5, or about 7 to about 8, about 9, about 10, or about 10.5. Any suitable acid, e.g., sulfuric acid, or any suitable base, e.g., sodium hydroxide, can be added to the creping adhesive to adjust the pH to a desired pH value.

The creping adhesive produced according to the ninth synthesis process can have or can be adjusted to have a viscosity of about 20 cP, about 50 cP, about 100 cP, or about 250 cP to about 500 cP, about 650 cP, about 800 cP, about 900 cP, about 1,000 cP, or about 1,200 cP at a temperature of about 25° C. In some embodiments, additional solvent, additional modified polyvinyl alcohol, and/or polyvinyl alcohol can be added to adjust the viscosity of the creping adhesive.

The creping adhesive produced according to the ninth synthesis process can have an adhesion of about 25 gram-force per inch about 50 gram-force per inch, about 100 gram-force per inch or about 250 gram-force per inch to about 500 gram-force per inch, about 600 gram-force per inch, about 700 gram-force per inch, or about 800 gram-force per inch.

The creping adhesive produced according to the ninth synthesis process can have a film solubility of about 10%, about 20%, about 30%, about 40%, or about 50% to about 60%, about 70%, about 80%, about 90%, about 95%, or about 99%.

The creping adhesive produced according to the ninth synthesis process can be single phase stable.

An exemplary reaction scheme for making the creping adhesive according to the ninth synthesis process described above can be carried out according to the following reaction scheme (III), which reacts a polyamidoamine and a functionally symmetric crosslinker, i.e., an alkylene glycol diglycidyl ether, where r can be a number from 1 to about 100, in the presence of a modified polyvinyl alcohol ($R^{10}$ can be $(CH_2)_{m'''}$ and m''' can be 1, 2, 3, 4, or 5):

Scheme III

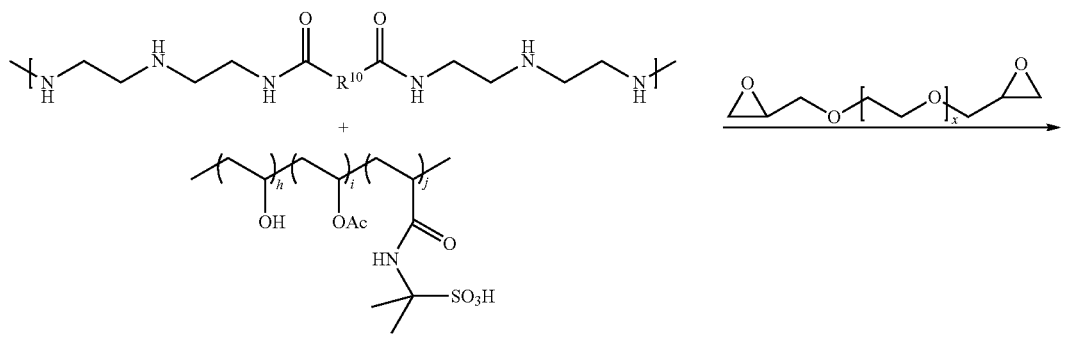

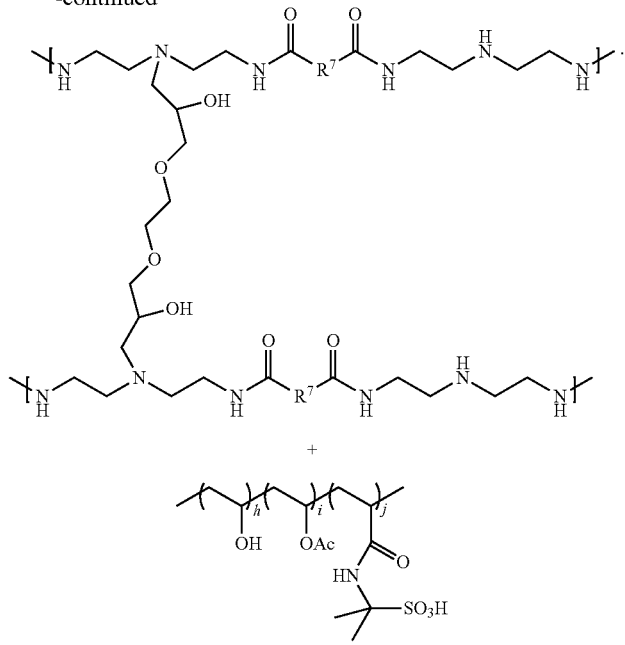

Another exemplary reaction scheme for making the creping adhesive according to the ninth synthesis process can be carried out according to the following reaction scheme (IV), which reacts the polyamidoamine and functionally symmetric crosslinker, i.e., an alkylene glycol diglycidyl ether, where r can be a number from 1 to about 100, in the presence of a polyvinyl alcohol ($R^{11}$ can be $(CH_2)_{m''''}$ and $m''''$ can be 1, 2, 3, 4, or 5,):

Scheme IV

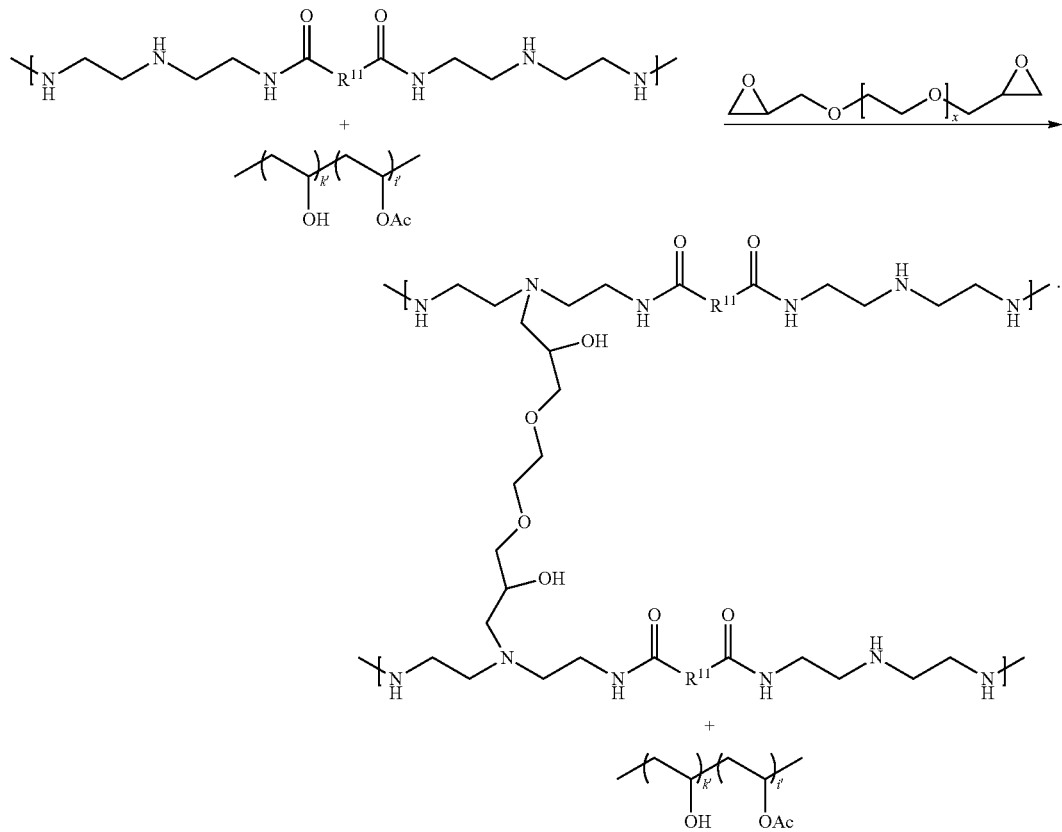

In some embodiments, the creping adhesive can also include one or more additives and/or be used in conjunction with one or more additives in a paper making process to produce a creped paper product. The additive(s) can be or can include, but is not limited to, one or more plasticizers, one or more re-wetting agents, one or more release aids, one or more tackifiers, one or more surfactants, one or more dispersants, one or more salts that can adjust water hardness, one or more acids or one or more bases that can adjust the pH of the creping adhesive, or any mixture thereof. In other embodiments, the one or more additives can be used in conjunction with the creping adhesive, but can be applied to a surface of a creping cylinder separately rather than being mixed with the creping adhesive.

Suitable plasticizers can be or can include, but are not limited to, water soluble polyols, glycols, glycerol, sorbitol, polyglycerin, polyethylene glycols, sugars, oligosaccharides, hydrocarbon oils, or any mixture thereof.

Suitable re-wetting agents can be or can include, but are not limited to, one or more protonated amines, one or more protonated polyamines, one or more quaternary ammonium salts, one or more poly-quaternary ammonium salts, glycerin, one or more salts of a polycarboxylic acid neutralized with triethanolamine, one or more phosphates, choline chloride, or any mixture thereof. Suitable protonated amines and protonated polyamines can include, but are not limited to, amines and polyamines protonated with one or more inorganic and/or one or more organic acids, such as lactic acid, citric acid, lactobionic acid, or any mixture thereof. Suitable quaternary ammonium salts can include, but are not limited to, diallyldimethylammonium chloride (DADMAC). Suitable poly-quaternary ammonium salts can include, but are not limited to, poly-diallyldimethylammonium chloride (poly-DADMAC). The phosphate can be phosphoric acid or phosphate salts.

Suitable release aids can be based on a quaternary imidazoline (e.g., methyl and ethyl sulfate salts of quaternary imidazoline derived from fatty acids), one or more mineral oils, one or more vegetable oils, one or more silicon oils, one or more surfactants, one or more soaps, one or more polyols, glycols, glycerol, sorbitol, polyglycerine, polyethylene glycol, sugars, oligosaccharides, hydrocarbon oils, or any mixture thereof. Other suitable release aids can include those disclosed in U.S. Pat. Nos. 5,660,687; 5,833,806; and 9,611,590.

The amount of each additive that can optionally be in the creping adhesive or used separately can independently be about 0.1 wt %, about 0.5 wt %, about 1 wt %, about 3 wt %, about 5 wt %, or about 7 wt % to about 15 wt %, about 20 wt %, about 25 wt %, or about 30 wt %, based on a combined weight of the solvent, any polyvinyl alcohol, any modified polyvinyl alcohol, and the crosslinked resin. For example, the creping adhesive can include from about 1 wt % to about 30 wt %, about 5 wt % to about 15 wt %, about 2 wt % to about 8 wt %, about 6 wt % to about 20 wt %, about 10 wt % to about 24 wt %, about 16 wt % to about 28 wt %, or about 18 wt % to about 30 wt % of the re-wetting agent, based on the combined weight of the solvent, any polyvinyl alcohol, any modified polyvinyl alcohol, and the crosslinked resin.

The creping adhesive can be used in a paper making process to produce a creped paper product. Illustrative creped paper products can include, but are not limited to, facial tissue, bathroom tissue, paper towels, and napkins.

The paper making process can include taking a slurry of papermaking fibers at a consistency of about 0.1 wt % to about 1 wt % and dewatering the slurry to form a paper web with a final consistency of about 95 wt %. In some embodiments, the slurry can be dewatered via a series of different processes that can include, but are not limited to, inertial dewatering (early forming section of the machine), press dewatering (press section of the machine), and/or thermally evaporating the water (dryer section of the machine). In some paper making machines, through-air drying cylinders can be located after the forming section and before the dryer section. The papermaking fibers can be formed into a paper web. For example, the papermaking fibers can be deposited onto a foraminate surface to form the paper web.

The creping adhesive can be applied to a drying surface, e.g., a surface of a rotating creping cylinder. The paper web can be pressed against the drying surface and adhered thereto via the creping adhesive. The paper web can be dislodged from the rotating creping cylinder, e.g., with a doctor blade, to produce a creped paper product. The creping adhesive can be or can include any one or more of the creping adhesives produced according to the synthesis processes described above, i.e., the first synthesis process through the ninth synthesis process, and/or according to any other synthesis process. The doctor blade can scrape the paper web backwardly upon itself and off of the drying surface. This creping process can cause a substantial number of inter-fiber bonds to break that can alter the physical-chemical characteristics of the paper web and increase the perceived softness of the resulting paper product.

In some embodiments the creping adhesive and one or more additives can be applied to the drying surface as a mixture or separately. If two or more components are separately applied to the drying surface, the two or more components can be applied in any order or sequence with respect to one another or at the same time with respect to one another. For example, a mixture of the creping adhesive and a re-wetting agent can be applied to the drying surface and a release aid can be applied to the drying surface, before, after, or simultaneously with respect to the mixture of the creping adhesive and the re-wetting agent, as opposed for forming a mixture of all three components prior to application to the drying surface.

In some embodiments, the drying surface can be the surface of a Yankee dryer. The Yankee dryer is a large diameter cylinder. The Yankee dryer can be a cylinder having an internal diameter of about 2.5 m to about 6 m. The drum can be heated with high pressure steam or other heated medium to provide a hot or heated drying surface. For example, the surface of the creping cylinder can be heated to a temperature of about 20° C., about 30° C., about 40° C., about 60° C., about 80° C., or about 100° C. to about 120° C., about 140° C., about 160° C., about 180° C., about 200° C., or about 220° C. The fiber web can be heated on the drying surface for a time of about 0.5 seconds to about 1 minute. As such, the paper web can be heated to a temperature of about 20° C., about 30° C., about 40° C. to about 60° C., about 80° C., or about 100° C. to about 120° C., about 140° C., about 160° C., about 180° C., or about 200° C. when adhered to the surface of the creping cylinder.

In some embodiments, the papermaking fibers can be derived from bleached furnish, softwood, hardwood, paper pulp, mechanical pulp, or any mixture thereof. In some embodiments, the fibers can include non-wood fibers, such as cotton fibers or cotton derivatives, abaca, kenaf, sabai grass, flax, esparto grass, straw, jute, hemp, bagasse, milkweed floss fibers, and pineapple leaf fibers; and wood fibers such as those obtained from deciduous and coniferous trees, including softwood fibers, such as northern and southern softwood kraft fibers; hardwood fibers, such as *eucalyptus*, maple, birch, aspen, or any mixture thereof. In some embodiments, the fibers can be or can include fibers recovered from previously manufactured fiber products. In other words, the fibers can be or can include recycled fibers. The fibers can be liberated from the source material by any of a number of well-known mechanical and/or chemical processes such as sulfate, sulfite, polysulfide, and/or soda pulping. The pulp can be bleached if desired by chemical means including the use of chlorine, chlorine dioxide, oxygen, ozone, hydrogen peroxide, alkaline metal peroxide, alkaline earth metal peroxides, as well as other compounds. In some embodiments, the plurality of fibers can be a mixture of softwood and hardwood fibers.

In some embodiments, prior to dewatering the slurry of papermaking fibers, the slurry can be conditioned for a period of time, which can facilitate contact between the fibers and other components, e.g., a strengthening resin. Conditioning can include, but is not limited to, agitating the resinated furnish for a time of about 30 seconds, about 1 minute, about 2 minutes, about 3 minutes or about 4 minutes to about 5 minutes, about 10 minutes, about 15 minutes, about 20 minutes, about 30 minutes, about 1 hour, or about 24 hours. In some embodiments, conditioning the mixture can also include heating (or cooling) the mixture to a temperature of about 1° C., about 20° C., or about 35° C. to about 60° C., about 80° C., or about 95° C.

Conditioning can also include adjusting a pH of the slurry. The pH of the slurry can be about 4, about 5, or about 6 to about 8, about 9, about 10, or 11, e.g., about 5 to about 9. Any one or combination of acid and/or base compounds can be added to the slurry to adjust the pH thereof. Suitable acid compounds can be or can include, but are not limited to, one or more mineral acids, e.g., hydrochloric acid, one or more organic acids, e.g., acetic acid, one or more acid salts, e.g., ammonium sulfate, or any mixture thereof. Suitable base compounds can be or can include, but are not limited to, hydroxides, e.g., sodium hydroxide, carbonates, e.g., sodium carbonate, ammonia, amines, e.g., trimethylamine, or any mixture thereof.

The creping adhesive can be applied to the surface of the rotating creping cylinder at a rate, relative to the rate of dryer surface rotation, which can provide an adequate amount of adhesive to hold the paper web during drying yet release the dried web upon completion of drying via contact with the doctor blade. The application rate of the creping adhesive on the surface of the rotating creping cylinder can be about 0.5 mg/m$^2$, about 1 mg/m$^2$, about 3 mg/m$^2$, about 5 mg/m$^2$, about 7 mg/m$^2$, about 9 mg/m$^2$, or about 10 mg/m$^2$, to about 12 mg/m$^2$, about 15 mg/m$^2$, about 20 mg/m$^2$, about 25 mg/m$^2$, 30 mg/m$^2$, about 40 mg/m$^2$, about 50 mg/m$^2$, about 70 mg/m$^2$, about 100 mg/m$^2$, about 150 mg/m$^2$, about 200 mg/m$^2$, about 250 mg/m$^2$, about 300 mg/m$^2$, 400 mg/m$^2$, about 500 mg/m$^2$, or greater.

The creping adhesive applied to the surface of the creping cylinder can form a layer, film, or coating on the surface having a thickness of about 0.1 μm, about 1 about 50 or about 100 μm to about 125 μm about 150 μm, about 175 μm, or about 200 μm.

The creping adhesive can be applied onto the surface of the creping cylinder, e.g., the surface of a Yankee dryer, to provide a coating that can develop a crepe ratio of at least −2%, at least −1%, at least 0%, at least 1%, at least 2%, at least 3%, at least 4%, at least 5%, at least 6%, or at least 7%. For example, the creping adhesive can be applied onto the drying surface, e.g., a surface of a Yankee dryer, to provide a coating that can develop a crepe ratio of about −2%, about −1%, about 0%, about 1%, about 3%, about 5%, about 7%, about 9%, or about 10% to about 12%, about 14%, about 16%, about 18%, about 20%, or about 22%. In other embodiments, the creping adhesive can be applied onto the drying surface, e.g., a surface of a Yankee dryer, to provide a coating that can develop a crepe ratio of about −2% to about 22%, about −2% to about 10%, about 10% to about 22%, about 1% to about 15%, about 12% to about 20%, or about 0% to about 10%. As used herein, the term "crepe ratio" is equal to [(Yankee velocity−reel velocity)/Yankee velocity]×100.

The creped paper product can have a basis weight between about 10 g/m$^2$, about 20 g/m$^2$, or about 25 g/m$^2$ to about 30 g/m$^2$, about 40 g/m$^2$, or about 50 g/m$^2$. The density of the creped paper product can be about 0.03 g/m$^3$, about 0.05 g/cm$^3$, or about 0.1 g/cm$^3$ to about 0.2 g/cm$^3$, about 0.4 g/cm$^3$, or about 0.6 g/cm$^3$.

Suitable processes for applying the creping adhesive and creping paper webs can include the processes disclosed in U.S. Pat. Nos. 3,640,841; 4,304,625; 4,440,898; 4,788,243; 4,994,146; 5,025,046; 5,187,219; 5,326,434; 5,246,544; 5,370,773; 5,487,813; 5,490,903; 5,633,309; 5,660,687; 5,846,380; 4,300,981; 4,063,995; 4,501,640; 4,528,316; 4,886,579; 5,179,150; 5,234,547; 5,374,334; 5,382,323; 5,468,796; 5,902,862; 5,942,085; 5,944,954; 3,879,257; 4,684,439; 3,926,716; 4,883,564; and 5,437,766.

EXAMPLES

In order to provide a better understanding of the foregoing discussion, the following non-limiting examples are offered. Although the examples can be directed to specific embodiments, they are not to be viewed as limiting the invention in any specific respect. All parts, proportions, and percentages are by weight unless otherwise indicated.

Example 1: A first crosslinked resin that included polyamidoamine backbones crosslinked by primary crosslinking moieties and propanediyl moieties, where the primary crosslinking moieties were derived from a functionally symmetric crosslinker and the propanediyl moieties were derived from an epihalohydrin was produced according to the following process. A prepolymer (about 41.3 wt % solids, about 14.03 g) produced by reacting a polyamidoamine (diethylenetriamine-dimethyl glutarate) and about 1 wt % of a first crosslinker (N,N'-methylenebisacrylamide (MBA)), based on the weight of the prepolymer, was added to a 3-neck, 250-mL reactor equipped with an a resistance temperature detector (RTD) probe, oil bath, overhead motor, and magnetic stir bar. The reactor was charged with deionized water (about 34.23 g) and a sulfonated polyvinyl alcohol (Sekisui S2012, about 15 wt % solids, about 50 g) and the mixture was stirred at about 500 revolutions per minute (rpm). The mixture was heated to a temperature of about 70° C. Epichlorohydrin (about 0.47 g) was added to the reactor over a period of about 90 minutes. The mixture was maintained at a temperature of about 70° C. for an additional 5 hours to produce the creping adhesive. After 5 hours, the creping adhesive was cooled to a temperature of less than 35° C. The pH of the creping adhesive was adjusted to about 6.1 by adding concentrated sulfuric acid (about 1.36 g). A final creping adhesive (Ex. 1) that included about 15.11 wt % of solids was obtained.

Example 2: A second crosslinked resin that included polyamidoamine backbones crosslinked by primary crosslinking moieties and propanediyl moieties, where the primary crosslinking moieties were derived from a functionally symmetric crosslinker and the propanediyl moieties were derived from an epihalohydrin was produced according to the following process. A prepolymer (about 41.3 wt % solids, about 13.49 g) produced by reacting a polyamidoamine (diethylenetriamine-dimethyl glutarate) and about 1 wt % of a first crosslinker (N,N'-methylenebisacrylamide (MBA)), based on the weight of the prepolymer, was added to a 3-neck, 250-mL reactor equipped with an RTD probe, oil bath, overhead motor, and magnetic stir bar. The reactor was charged with deionized water (about 34.55 g) and a sulfonated polyvinyl alcohol (Sekisui S2012, about 15 wt % solids, about 50 g) and the mixture was stirred at about 500 revolutions per minute (rpm). The mixture was heated to a temperature of about 70° C. Epichlorohydrin (about 0.64 g) was added to the reactor over a period of about 90 minutes. The mixture was maintained at a temperature of about 70° C. for an additional 5 hours to produce the creping adhesive. After 5 hours, the creping adhesive was cooled to a temperature of less than 35° C. and had a solids content of about 15.02 wt %. The pH of the creping adhesive was adjusted to about 6.6 by adding concentrated sulfuric acid (about 1.31 g). A final creping adhesive (Ex. 2) resulted in a stable single phase.

TABLE 1

| Example | Prepolymer | PAE/PVOH Mass Ratio | Crosslinker | Crosslinker, % | Test pH | Film Solubility, % |
|---------|------------|---------------------|-------------|----------------|---------|--------------------|
| Ex. 1 | PAA crosslinked with MBA | 1:1 | Epichlorohydrin | 0.47 | 6.1 | 50.8 |
| Ex. 2 | PAA crosslinked with MBA | 1:1 | Epichlorohydrin | 0.64 | 6.6 | 36.3 |

As can be seen in Table 1, the film solubility decreased as the epichlorohydrin content increased.

Example 3: A first crosslinked resin that included polyamidoamine backbones crosslinked by primary crosslinking moieties and secondary crosslinking moieties, where the primary crosslinking moieties were derived from a first functionally symmetric crosslinker and the secondary crosslinking moieties were derived from a second functionally symmetric crosslinker was produced according to the following process. A prepolymer (about 39.6 wt % solids, about 12.10 g) produced by reacting a polyamidoamine (diethylenetriamine-dimethyl glutarate) and about 1 wt % of a first crosslinker (N,N'-methylenebisacrylamide (MBA)), based on the weight of the prepolymer, was added to a 3-neck, 250-mL reactor equipped with an RTD probe, oil bath, overhead motor, and magnetic stir bar. The reactor was charged with deionized water (about 44.02 g) and a sulfonated polyvinyl alcohol (Sekisui S2012, about 10.4 wt % solids, about 57.78 g) and the mixture was stirred at about 500 revolutions per minute (rpm). The mixture was heated to a temperature of about 70° C. Ethylene glycol diglycidyl ether (about 0.62 g) was added to the reactor over a period of about 90 minutes. The mixture was maintained at a temperature of about 70° C. for an additional 6 hours to produce the creping adhesive. After 6 hours, the creping adhesive was cooled to a temperature of less than 35° C. The creping adhesive (Ex. 3) had a pH of about 9.36 and contained about 9.97 wt % of solids.

Example 4: A second crosslinked resin that included polyamidoamine backbones crosslinked by primary crosslinking moieties and secondary crosslinking moieties, where the primary crosslinking moieties were derived from a first functionally symmetric crosslinker and the secondary crosslinking moieties were derived from a second functionally symmetric crosslinker was produced according to the following process. A prepolymer (about 39.6 wt % solids, about 23.55 g) produced by reacting a polyamidoamine (diethylenetriamine-dimethyl glutarate) and about 1 wt % of a first crosslinker (N,N'-methylenebisacrylamide (MBA)), based on the weight of the prepolymer, was added to a 3-neck, 250-mL reactor equipped with an RTD probe, oil bath, overhead motor, and magnetic stir bar. The reactor was charged with deionized water (about 80.16 g) and a sulfonated polyvinyl alcohol (Sekisui S2012, about 11 wt % solids, about 104.99 g) and the mixture was stirred at about 500 revolutions per minute (rpm). The mixture was heated to a temperature of about 70° C. Ethylene glycol diglycidyl ether (about 2.21 g) was added to the reactor over a period of about 90 minutes. The mixture was maintained at a temperature of about 70° C. for an additional 6 hours to produce the creping adhesive. After 6 hours, the creping adhesive was cooled to a temperature of less than 35° C. The creping adhesive (Ex. 4) had a pH of about 9.09 and contained about 10.95 wt % of solids.

Example 5: A third crosslinked resin that included polyamidoamine backbones crosslinked by primary crosslinking moieties and secondary crosslinking moieties, where the primary crosslinking moieties were derived from a first functionally symmetric crosslinker and the secondary crosslinking moieties were derived from a second functionally symmetric crosslinker was produced according to the following process. A prepolymer (about 39.6 wt % solids, about 21.98 g) produced by reacting a polyamidoamine (diethylenetriamine-dimethyl glutarate) and about 1 wt % of a first crosslinker (N,N'-methylenebisacrylamide (MBA)), based on the weight of the prepolymer, was added to a 3-neck, 250-mL reactor equipped with an RTD probe, oil bath, overhead motor, and magnetic stir bar. The reactor was charged with deionized water (about 79.93 g) and a sulfonated polyvinyl alcohol (Sekisui S2012, about 10.4 wt % solids, about 104.99 g) and the mixture was stirred at about 500 revolutions per minute (rpm). The mixture was heated to a temperature of about 70° C. Ethylene glycol diglycidyl ether (about 2.63 g) was added to the reactor over a period of about 90 minutes. The mixture was maintained at a temperature of about 70° C. for an additional 6 hours to produce the creping adhesive. After 6 hours, the creping adhesive was cooled to a temperature of less than 35° C. The creping adhesive (Ex. 5) had a pH of about 9.16 and contained about 10.62 wt % of solids.

Example 6: A fourth crosslinked resin that included polyamidoamine backbones crosslinked by primary crosslinking moieties and secondary crosslinking moieties, where the primary crosslinking moieties were derived from a first functionally symmetric crosslinker and the secondary crosslinking moieties were derived from a second functionally symmetric crosslinker was produced according to the following process. A prepolymer (about 39.6 wt % solids, about 22.00 g) produced by reacting a polyamidoamine (diethylenetriamine-dimethyl glutarate) and about 1 wt % of a first crosslinker (N,N'-methylenebisacrylamide (MBA)), based on the weight of the prepolymer, was added to a 3-neck, 250-mL reactor equipped with an RTD probe, oil bath, overhead motor, and magnetic stir bar. The reactor was charged with deionized water (about 79.95 g) and a sulfonated polyvinyl alcohol (Sekisui S2012, about 11 wt % solids, about 105.02 g) and the mixture was stirred at about 500 revolutions per minute (rpm). The mixture was heated to a temperature of about 70° C. Ethylene glycol diglycidyl ether (about 3.01 g) was added to the reactor over a period of about 90 minutes. The mixture was maintained at a temperature of about 70° C. for an additional 6 hours to produce the creping adhesive. After 6 hours, the creping adhesive was cooled to a temperature of less than 35° C. and had a solids content of about 11.08 wt %. The creping adhesive (Ex. 6) had a pH of about 9.03 and was adjusted to about 6.7 by adding concentrated sulfuric acid resulting in a stable single-phase product.

TABLE 2

| Example | PAE/PVOH Mass Ratio | Crosslinker | Crosslinker, % | Viscosity before crosslinked (cP) | Viscosity after crosslinked (cP) | Test pH | Film Solubility, % |
|---|---|---|---|---|---|---|---|
| Ex. 3 | 1:1 | EGDGE | 0.54 | 31 | 40 | 7.0 | 62.7 |
| Ex. 4 | 1:1 | EGDGE | 1.05 | 45 | 96 | 6.4 | 43.6 |
| Ex. 5 | 1:1 | EGDGE | 1.26 | 32 | 79 | 6.5 | 40.9 |
| Ex. 6 | 1:1 | EGDGE | 1.43 | 45 | 292 | 6.9 | 28.5 |

As can be seen in Table 2, the film solubility decreased as the ethylene glycol diglycidyl ether content increased.

Example 7: A crosslinked resin that included polyamidoamine backbones crosslinked by primary crosslinking moieties, where the primary crosslinking moieties were derived from a functionally symmetric crosslinker was produced according to the following process. A polyamidoamine (un-crosslinked diethylenetriamine-dimethyl glutarate, about 45 wt % solids, about 19.97 g) was added to a 3-neck, 250-mL reactor equipped with an RTD probe, oil bath, overhead motor, and magnetic stir bar. The reactor was charged with deionized water (about 79.93 g) and a sulfonated polyvinyl alcohol (Sekisui S2012, about 11% solids, about 48.04 g) and the mixture was stirred at 500 rpm. The mixture was heated to a temperature of about 70° C. Ethylene glycol diglycidyl ether (about 2.13 g) was added to the reactor over a period of about 90 min. The mixture was maintained at a temperature of about 70° C. for an additional 6 hours to produce the creping adhesive. After 6 hours, the creping adhesive was cooled to a temperature of less than 35° C. The creping adhesive (Ex. 7) had a pH of about 9.3 and contained about 10.93 wt % of solids.

Example 8: A crosslinked resin that included polyamidoamine backbones crosslinked by primary crosslinking moieties, where the primary crosslinking moieties were derived from a functionally symmetric crosslinker was produced according to the following process. A polyamidoamine (un-crosslinked diethylenetriamine-dimethyl glutarate, about 45 wt % solids, about 19.95 g) was added to a 3-neck, 250-mL reactor equipped with an RTD probe, oil bath, overhead motor, and magnetic stir bar. The reactor was charged with deionized water (about 79.98 g) and a sulfonated polyvinyl alcohol (Sekisui S2012, about 11% solids, about 49.60 g) and the mixture was stirred at 500 rpm. The mixture was heated to a temperature of about 70° C. Ethylene glycol diglycidyl ether (about 1.51 g) was added to the reactor over a period of about 90 min. The mixture was maintained at a temperature of about 70° C. for an additional 6 hours to produce the creping adhesive. After 6 hours, the creping adhesive was cooled to a temperature of less than 35° C. and had a solids content of about 10.56 wt %. The creping adhesive (Ex. 8) had a pH of about 9.1 and was adjusted to about 6.6 by adding concentrated sulfuric acid resulting a stable single phase product.

TABLE 3

| Example | PAE/PVOH Mass Ratio | Crosslinker | Crosslinker % | Viscosity before crosslinked (cP) | Viscosity after crosslinked (cP) | Test pH | Film Solubility % |
|---|---|---|---|---|---|---|---|
| Ex. 7 | 1.9 | EGDGE | 1.00 | 34 | 67 | 7.0 | 74.6 |
| Ex. 8 | 2.1 | EGDGE | 1.42 | 27 | 434 | 6.4 | 47.9 |

As can be seen in Table 3, the film solubility decreased as the ethylene glycol diglycidyl ether content increased.

Embodiments of the present disclosure further relate to any one or more of the following paragraphs:

1. A creping adhesive, comprising: a solvent; a modified polyvinyl alcohol comprising a carboxylated polyvinyl alcohol, a sulfonated polyvinyl alcohol, a sulfated polyvinyl alcohol, a sulfonated-carboxylated polyvinyl alcohol, or a mixture thereof; and a crosslinked resin comprising polyamidoamine backbones crosslinked by primary crosslinking moieties and propanediyl moieties, wherein the primary crosslinking moieties are derived from a functionally symmetric crosslinker.

2. The creping adhesive of paragraph 1, wherein the creping adhesive comprises about 1 wt % to about 99 wt % of the crosslinked resin based on a combined weight of the modified polyvinyl alcohol and the crosslinked resin.

3. The creping adhesive of paragraph 1 or 2, wherein the creping adhesive comprises about 1 wt % to about 98 wt % of the solvent, about 1 wt % to about 70 wt % of the modified polyvinyl alcohol, and about 1 wt % to about 70 wt % of the crosslinked resin, based on a combined weight of the solvent, the modified polyvinyl alcohol, and the crosslinked resin.

4. The creping adhesive of any of paragraphs 1 to 3, wherein the modified polyvinyl alcohol comprises the carboxylated polyvinyl alcohol, and wherein the carboxylated polyvinyl alcohol has the following chemical formula (I):

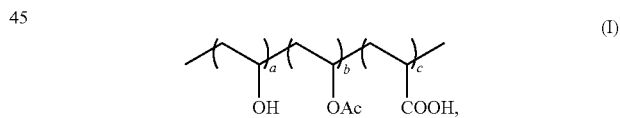

(I)

OH  OAc  COOH, and wherein a is a number from 1 to 99, b is a number from 0 to 30, and c is a number from 1 to 20.

5. The creping adhesive of any of paragraphs 1 to 4, wherein the modified polyvinyl alcohol comprises the carboxylated polyvinyl alcohol, and wherein the carboxylated polyvinyl alcohol has the following chemical formula (II):

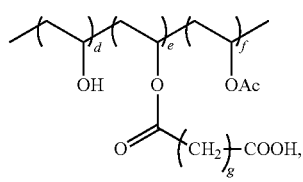
(II)

and wherein d is a number from 1 to 98, e is a number from 1 to 20, f is a number from 0 to 30, and 1 is a number from 0-10.

6. The creping adhesive of any of paragraphs 1 to 5, wherein the modified polyvinyl alcohol comprises the sulfonated polyvinyl alcohol, and wherein the sulfonated polyvinyl alcohol has the following chemical formula (III):

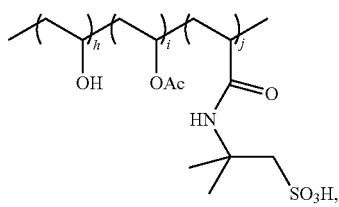
(III)

and wherein h is a number from 1 to 98, i is a number from 0 to 30, and j is a number from 1 to 20.

7. The creping adhesive of any of paragraphs 1 to 6, wherein the modified polyvinyl alcohol comprises the sulfated polyvinyl alcohol, and wherein the sulfated polyvinyl alcohol has the following chemical formula (IV):

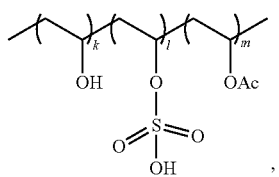
(IV)

and wherein k is a number from 1 to 98, 1 is a number from 1 to 20, and m is a number from 0 to 30.

8. The creping adhesive of any of paragraphs 1 to 7, wherein the modified polyvinyl alcohol comprises the sulfonated-carboxylated polyvinyl alcohol, and wherein the sulfonated-carboxylated polyvinyl alcohol has the following chemical formula (V):

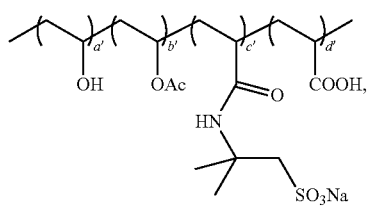
(V)

and wherein a' is a number from 1 to 97, b' is a number from 1 to 30, c' is a number from 1 to 20, and d' is a number from 1 to 10.

9. The creping adhesive of any of paragraphs 1 to 8, wherein the modified polyvinyl alcohol comprises the sulfonated-carboxylated polyvinyl alcohol, and wherein the sulfonated-carboxylated polyvinyl alcohol has the following chemical formula (VI):

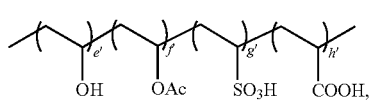
(VI)

and wherein e' is a number from 1 to 97, f' is a number from 1 to 30, g' is a number from 1 to 20, and h' is a number from 1 to 20.

10. The creping adhesive of any of paragraphs 1 to 9, wherein the solvent comprises water, an alkylene glycol, a polyalkylene glycol, or a mixture thereof.

11. The creping adhesive of any of paragraphs 1 to 10, wherein the solvent comprises water.

12. The creping adhesive of any of paragraphs 1 to 11, wherein the functionally symmetric crosslinker has the following chemical formula (VII), (VIII), (IX), (X), (XI), or (XII):

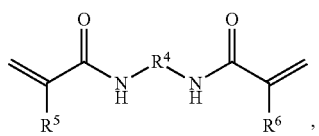
(VII)

wherein $R^4$ is $(CH_2)_t$, t is 1, 2, or 3, and $R^5$ and $R^6$ are both a hydrogen atom or a methyl group;

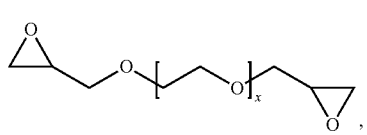
(VIII)

wherein x is a number from 1 to about 100;

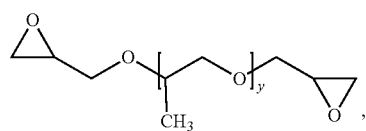
(IX)

wherein y is a number from 1 to about 100;

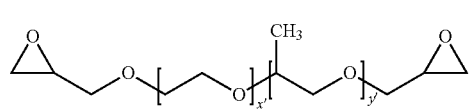
(X)

wherein x'+y' is a number from 1 to about 100;

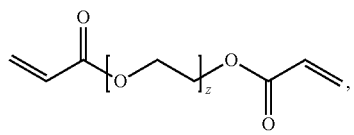

wherein z is a number from 1 to about 100; or

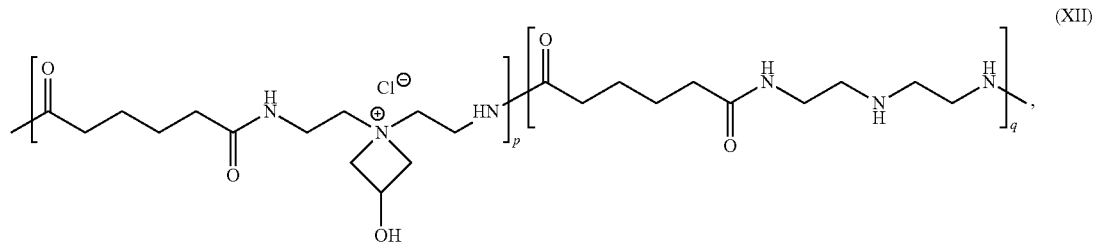

wherein a q/p ratio is a number from about 10 to about 1000.

13. The creping adhesive of any of paragraphs 1 to 12, wherein the functionally symmetric crosslinker comprises a copolymer of an acrylate monomer, a methacrylate monomer, an alkene monomer, or a diene monomer, with an azetidinium-functionalized monomer selected from

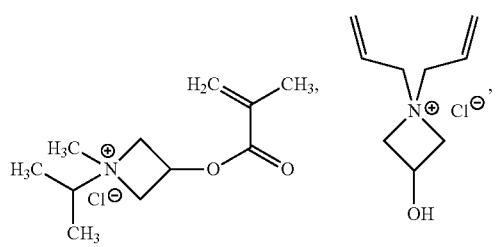

and a mixture thereof, wherein a fraction of the azetidinium-functionalized monomer to the acrylate monomer, the methacrylate monomer, the alkene monomer, or the diene monomer in the copolymer is from about 0.1% to about 12%.

14. The creping adhesive of any of paragraphs 1 to 13, wherein the functionally symmetric crosslinker comprises a di-acrylate, a bis(acrylamide), a di-epoxide, a polyazetidinium compound, an alkylene glycol diglycidyl ether, a poly(alkylene glycol) diglycidyl ether, a diisocyanate, a 1,3-dialkyldiazetidine-2,4-dione, a dianhydride, a diacyl halide, a dienone, a dialkyl halide, or a mixture thereof.

15. The creping adhesive of any of paragraphs 1 to 14, wherein the functionally symmetric crosslinker comprises N,N'-methylene-bis-acrylamide, N,N'-methylene-bis-methacrylamide, ethylene glycol diglycidyl ether, propylene glycol diglycidyl ether, poly(ethylene glycol) diglycidyl ether, poly(propylene glycol) diglycidyl ether, poly (ethylene glycol) diacrylate, poly(propylene glycol) diacrylate, or a mixture thereof.

16. The creping adhesive of any of paragraphs 1 to 15, wherein the propanediyl moieties are derived from an epihalohydrin.

17. The creping adhesive of paragraph 16, wherein the epihalohydrin comprises epichlorohydrin, epibromohydrin, epiiodohydrin, or a mixture thereof.

18. The creping adhesive of any of paragraphs 1 to 17, wherein the functionally symmetric crosslinker comprises N,N'-methylene-bis-acrylamide, and wherein the propanediyl moieties are derived from epichlorohydrin.

19. The creping adhesive of any of paragraphs 16 to 18, wherein the crosslinked resin is made by reacting the epihalohydrin with a polyamidoamine crosslinked by the primary crosslinking moieties in the presence of the solvent and the modified polyvinyl alcohol.

20. The creping adhesive of paragraph 19, wherein the creping adhesive has a viscosity of about 20 cP to about 1,000 cP at a temperature of about 25° C.

21. The creping adhesive of paragraph 19 or 20, wherein the creping adhesive has an adhesion of about 25 gram-force per inch to about 800 gram-force per inch.

22. The creping adhesive of any of paragraphs 19 to 21, wherein the creping adhesive has a film solubility of about 10% to about 99%.

23. The creping adhesive of any of paragraphs 19 to 22, wherein the creping adhesive has a film solubility of about 20% to about 80%.

24. The creping adhesive of any of paragraphs 19 to 23, wherein the crosslinked resin has a weight average molecular weight of about 25 kDa to about 1,500 kDa.

25. The creping adhesive of any of paragraphs 16 to 18, wherein the crosslinked resin is made by reacting the epihalohydrin with a polyamidoamine crosslinked by the primary crosslinking moieties in the presence of the solvent, and wherein a mixture of the solvent and the crosslinked resin is blended with the modified polyvinyl alcohol to produce the creping adhesive.

26. The creping adhesive of paragraph 25, wherein the creping adhesive has a viscosity of about 20 cP to about 1,000 cP at a temperature of about 25° C.

27. The creping adhesive of paragraph 25 or 26, wherein the creping adhesive has an adhesion of about 25 gram-force per inch to about 800 gram-force per inch.

28. The creping adhesive of any of paragraphs 25 to 27, wherein the creping adhesive has a film solubility of about 10% to about 99%.

29. The creping adhesive of any of paragraphs 25 to 28, wherein the creping adhesive has a film solubility of about 20% to about 80%.

30. The creping adhesive of any of paragraphs 25 to 29, wherein the crosslinked resin has a weight average molecular weight of about 25 kDa to about 1,500 kDa.

31. A creping adhesive, comprising: a solvent; a modified polyvinyl alcohol comprising a carboxylated polyvinyl alcohol, a sulfonated polyvinyl alcohol, a sulfated polyvinyl alcohol, a sulfonated-carboxylated polyvinyl alcohol, or a mixture thereof; and a crosslinked resin comprising polyamidoamine backbones crosslinked by primary crosslinking moieties and secondary crosslinking moieties, wherein the primary crosslinking moieties are derived from a first functionally symmetric crosslinker, and wherein the secondary crosslinking moieties are derived from a second functionally symmetric crosslinker.

32. The creping adhesive of paragraph 31, wherein the creping adhesive comprises about 1 wt % to about 99 wt % of the crosslinked resin based on a combined weight of the modified polyvinyl alcohol and the crosslinked resin.

33. The creping adhesive of paragraph 31 or 32, wherein the creping adhesive comprises about 1 wt % to about 98 wt % of the solvent, about 1 wt % to about 70 wt % of the modified polyvinyl alcohol, and about 1 wt % to about 70 wt % of the crosslinked resin, based on a combined weight of the solvent, the modified polyvinyl alcohol, and the crosslinked resin.

34. The creping adhesive of any of paragraphs 31 to 33, wherein the modified polyvinyl alcohol comprises the carboxylated polyvinyl alcohol, and wherein the carboxylated polyvinyl alcohol has the following chemical formula (I):

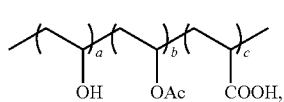
(I)

and wherein a is a number from 1 to 99, b is a number from 0 to 30, and c is a number from 1 to 20.

35. The creping adhesive of any of paragraphs 31 to 34, wherein the modified polyvinyl alcohol comprises the carboxylated polyvinyl alcohol, and wherein the carboxylated polyvinyl alcohol has the following chemical formula (II):

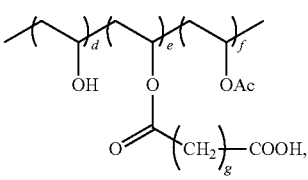
(II)

and wherein d is a number from 1 to 98, e is a number from 1 to 20, f is a number from 0 to 30, and g is a number from 0-10.

36. The creping adhesive of any of paragraphs 31 to 35, wherein the modified polyvinyl alcohol comprises the sulfonated polyvinyl alcohol, and wherein the sulfonated polyvinyl alcohol has the following chemical formula (III):

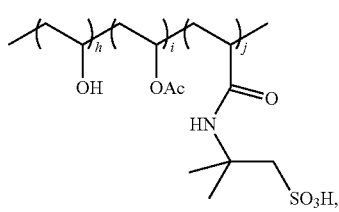
(III)

and wherein h is a number from 1 to 98, i is a number from 0 to 30, and j is a number from 1 to 20.

37. The creping adhesive of any of paragraphs 31 to 36, wherein the modified polyvinyl alcohol comprises the sulfated polyvinyl alcohol, and wherein the sulfated polyvinyl alcohol has the following chemical formula (IV):

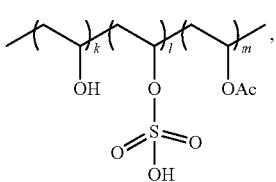
(IV)

and wherein k is a number from 1 to 98, l is a number from 1 to 20, and m is a number from 0 to 30.

38. The creping adhesive of any of paragraphs 31 to 37, wherein the modified polyvinyl alcohol comprises the sulfonated-carboxylated polyvinyl alcohol, and wherein the sulfonated-carboxylated polyvinyl alcohol has the following chemical formula (V):

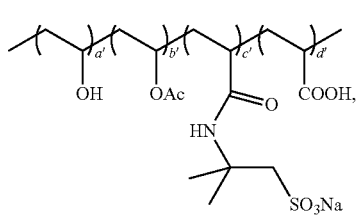
(V)

and wherein a' is a number from 1 to 97, b' is a number from 1 to 30, c' is a number from 1 to 20, and d' is a number from 1 to 10.

39. The creping adhesive of any of paragraphs 31 to 38, wherein the modified polyvinyl alcohol comprises the sulfonated-carboxylated polyvinyl alcohol, and wherein the sulfonated-carboxylated polyvinyl alcohol has the following chemical formula (VI):

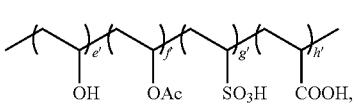
(VI)

and wherein e' is a number from 1 to 97, f' is a number from 1 to 30, g' is a number from 1 to 20, and h' is a number from 1 to 20.

40. The creping adhesive of any of paragraphs 31 to 39, wherein the solvent comprises water, an alkylene glycol, a polyalkylene glycol, or a mixture thereof.

41. The creping adhesive of any of paragraphs 31 to 40, wherein the solvent comprises water.

42. The creping adhesive of any of paragraphs 31 to 41, wherein the first functionally symmetric crosslinker and the second functionally symmetric crosslinker independently have the following chemical formula (VII), (VIII), (IX), (X), (XI), or (XII):

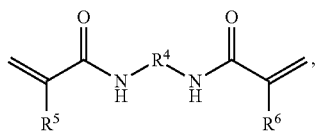

wherein R⁴ is (CH₂)$_t$, t is 1, 2, or 3, and R⁵ and R⁶ are both a hydrogen atom or a methyl group;

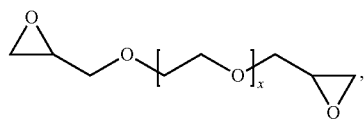

wherein x is a number from 1 to about 100;

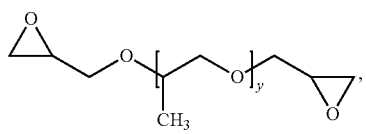

wherein y is a number from 1 to about 100;

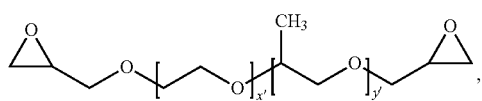

wherein x'+y' is a number from 1 to about 100;

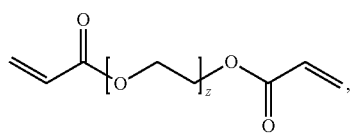

wherein z is a number from 1 to about 100; or

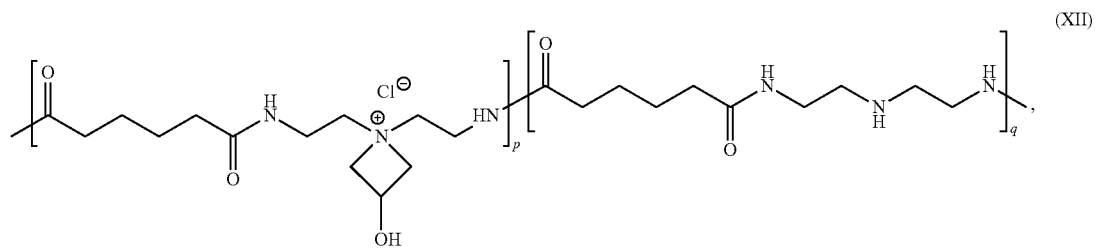

wherein a q/p ratio is a number from about 10 to about 1000.

43. The creping adhesive of any of paragraphs 31 to 42, wherein at least one of the first functionally symmetric crosslinker and the second functionally symmetric crosslinker comprises a copolymer of an acrylate monomer, a methacrylate monomer, an alkene monomer, or a diene monomer, with an azetidinium-functionalized monomer selected from

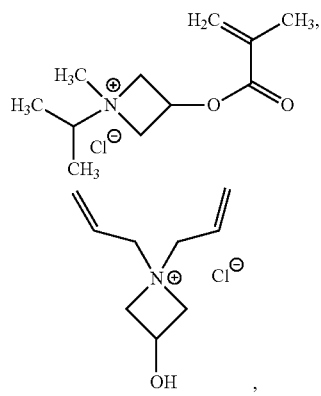

and a mixture thereof, wherein a fraction of the azetidinium-functionalized monomer to the acrylate monomer, the methacrylate monomer, the alkene monomer, or the diene monomer in the copolymer is from about 0.1% to about 12%.

44. The creping adhesive of any of paragraphs 31 to 43, wherein the first functionally symmetric crosslinker and the second functionally symmetric crosslinker independently comprise a di-acrylate, a bis(acrylamide), a di-epoxide, a polyazetidinium compound, an alkylene glycol diglycidyl ether, a poly(alkylene glycol) diglycidyl ether, a diisocyanate, a 1,3-dialkyldiazetidine-2,4-dione, a dianhydride, a diacyl halide, a dienone, a dialkyl halide, or a mixture thereof.

45. The creping adhesive of any of paragraphs 31 to 44, wherein first functionally symmetric crosslinker and the second functionally symmetric crosslinker independently comprise N,N'-methylene-bis-acrylamide, N,N'-methylene-bis-methacrylamide, ethylene glycol diglycidyl ether, propylene glycol diglycidyl ether, poly(ethylene glycol) diglycidyl ether, poly(propylene glycol) diglycidyl ether, poly(ethylene glycol) diacrylate, poly(propylene glycol) diacrylate, or a mixture thereof.

46. The creping adhesive of any of paragraphs 31 to 45, wherein the first functionally symmetric crosslinker comprises N,N'-methylene-bis-acrylamide, and wherein the second functionally symmetric crosslinker comprises ethylene glycol diglycidyl ether.

47. The creping adhesive of any of paragraphs 31 to 46, wherein the first functionally symmetric crosslinker and the second functionally symmetric crosslinker are different from one another.

48. The creping adhesive of any of paragraphs 31 to 47, wherein the first functionally symmetric crosslinker and the second functionally symmetric crosslinker are the same functionally symmetric crosslinker, wherein the primary crosslinking moieties are formed by reacting a polyamidoamine and a first portion of the functionally symmetric crosslinker in the presence of the solvent to produce a prepolymer, and wherein the secondary crosslinking moieties are formed by reacting the prepolymer and a second portion of the functionally symmetric crosslinker in the presence of the solvent and the modified polyvinyl alcohol.

49. The creping adhesive of any of paragraphs 31 to 48, wherein the creping adhesive has a viscosity of about 20 cP to about 1,000 cP at a temperature of about 25° C.

50. The creping adhesive of any of paragraphs 31 to 49, wherein the creping adhesive has an adhesion of about 25 gram-force per inch to about 800 gram-force per inch.

51. The creping adhesive of any of paragraphs 31 to 50, wherein the creping adhesive has a film solubility of about 10% to about 99%.

52. The creping adhesive of any of paragraphs 31 to 51, wherein the creping adhesive has a film solubility of about 20% to about 80%.

53. The creping adhesive of any of paragraphs 31 to 52, wherein the crosslinked resin has a weight average molecular weight of about 25 kDa to about 1,500 kDa.

54. A creping adhesive, comprising: a solvent; a polyvinyl alcohol, a modified polyvinyl alcohol, or a mixture thereof; and a crosslinked resin comprising polyamidoamine backbones crosslinked by primary crosslinking moieties, wherein the primary crosslinking moieties are derived from a functionally symmetric crosslinker.

55. The creping adhesive of paragraph 54, wherein the creping adhesive comprises about 1 wt % to about 99 wt % of the crosslinked resin based on a combined weight of the crosslinked resin, any polyvinyl alcohol and any modified polyvinyl alcohol.

56. The creping adhesive of paragraph 54 or 55, wherein the creping adhesive comprises about 1 wt % to about 98 wt % of the solvent, up to about 70 wt % of the polyvinyl alcohol, up to about 70 wt % of the modified polyvinyl alcohol, and about 1 wt % to about 70 wt % of the crosslinked resin, based on a combined weight of the solvent, any polyvinyl alcohol, any modified polyvinyl alcohol, and the crosslinked resin, and wherein the creping adhesive comprises about 1 wt % to about 70 wt % of a total amount of any polyvinyl alcohol and any modified polyvinyl alcohol, based on the combined weight of the solvent, any polyvinyl alcohol, any modified polyvinyl alcohol, and the crosslinked resin.

57. The creping adhesive of any of paragraphs 54 to 56, wherein the creping adhesive comprises the modified polyvinyl alcohol, and wherein the modified polyvinyl alcohol comprises a carboxylated polyvinyl alcohol, a sulfonated polyvinyl alcohol, a sulfated polyvinyl alcohol, a sulfonated-carboxylated polyvinyl alcohol, or a mixture thereof.

58. The creping adhesive of paragraph 57, wherein the creping adhesive comprises the carboxylated polyvinyl alcohol, and wherein the carboxylated polyvinyl alcohol has the following chemical formula (I):

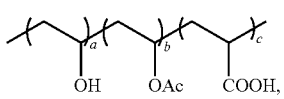

wherein a is a number from 1 to 99, b is a number from 0 to 30, and c is a number from 1 to 20.

59. The creping adhesive of paragraph 57 or 58, wherein the modified polyvinyl alcohol comprises the carboxylated polyvinyl alcohol, and wherein the carboxylated polyvinyl alcohol has the following chemical formula (II):

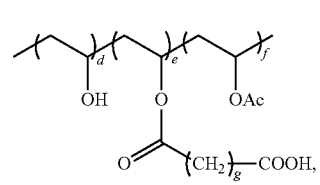

and wherein d is a number from 1 to 98, e is a number from 1 to 20, f is a number from 0 to 30, and 1 is a number from 0-10.

60. The creping adhesive of any of paragraphs 57 to 59, wherein the modified polyvinyl alcohol comprises the sulfonated polyvinyl alcohol, and wherein the sulfonated polyvinyl alcohol has the following chemical formula (III):

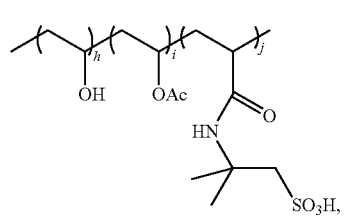

and wherein h is a number from 1 to 98, i is a number from 0 to 30, and j is a number from 1 to 20.

61. The creping adhesive of any of paragraphs 57 to 60, wherein the modified polyvinyl alcohol comprises the sulfated polyvinyl alcohol, and wherein the sulfated polyvinyl alcohol has the following chemical formula (IV):

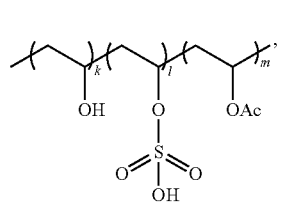

and wherein k is a number from 1 to 98, 1 is a number from 1 to 20, and m is a number from 0 to 30.

62. The creping adhesive of any of paragraphs 57 to 61, wherein the modified polyvinyl alcohol comprises the sulfonated-carboxylated polyvinyl alcohol, and wherein the sulfonated-carboxylated polyvinyl alcohol has the following chemical formula (V):

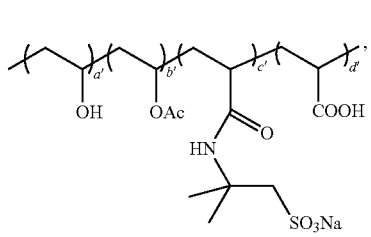

and wherein a' is a number from 1 to 97, b' is a number from 1 to 30, c' is a number from 1 to 20, and d' is a number from 1 to 10.

63. The creping adhesive of any of paragraphs 57 to 62, wherein the modified polyvinyl alcohol comprises the sulfonated-carboxylated polyvinyl alcohol, and wherein the sulfonated-carboxylated polyvinyl alcohol has the following chemical formula (VI):

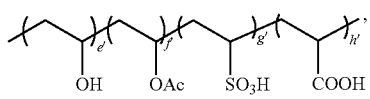

and wherein e' is a number from 1 to 97, f' is a number from 1 to 30, g' is a number from 1 to 20, and h' is a number from 1 to 20.

64. The creping adhesive of any of paragraphs 57 to 63, wherein the creping adhesive comprises the polyvinyl alcohol, and wherein the polyvinyl alcohol has the following chemical formula (XIII):

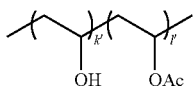

and wherein k' is a number from 1 to 99 and l' is a number from 0 to 30.

65. The creping adhesive of any of paragraphs 57 to 64, wherein the solvent comprises water, an alkylene glycol, a polyalkylene glycol, or a mixture thereof.

66. The creping adhesive of any of paragraphs 57 to 65, wherein the solvent comprises water.

67. The creping adhesive of any of paragraphs 57 to 66, wherein the functionally symmetric crosslinker has the following chemical formula (VII), (VIII), (IX), (X), (XI), or (XII):

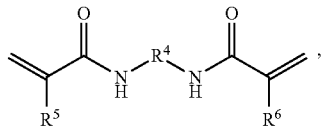

wherein $R^4$ is $(CH_2)_t$, t is 1, 2, or 3, and $R^5$ and $R^6$ are both a hydrogen atom or a methyl group;

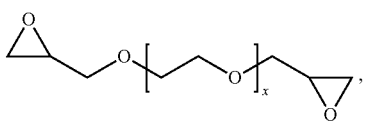

wherein x is a number from 1 to about 100;

(IX)

wherein y is a number from 1 to about 100;

(X)

wherein $x'+y'$ is a number from 1 to about 100;

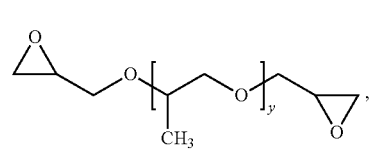

wherein z is a number from 1 to about 100; or (XII)

wherein a q/p ratio is a number from about 10 to about 1000.

68. The creping adhesive of any of paragraphs 57 to 67, wherein the functionally symmetric crosslinker comprises a copolymer of an acrylate monomer, a methacrylate monomer, an alkene monomer, or a diene monomer, with an azetidinium-functionalized monomer selected from

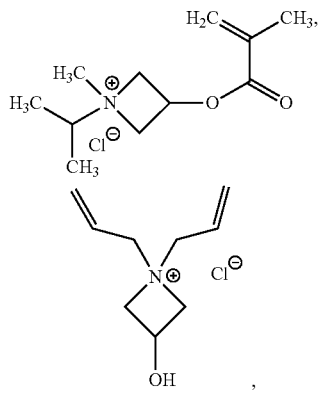

and a mixture thereof, wherein a fraction of the azetidinium-functionalized monomer to the acrylate monomer, the methacrylate monomer, the alkene monomer, or the diene monomer in the copolymer is from about 0.1% to about 12%.

69. The creping adhesive of any of paragraphs 57 to 68, wherein the functionally symmetric crosslinker comprises a di-acrylate, a bis(acrylamide), a di-epoxide, a polyazetidinium compound, an alkylene glycol diglycidyl ether, a poly(alkylene glycol) diglycidyl ether, a diisocyanate, a 1,3-dialkyldiazetidine-2,4-dione, a dianhydride, a diacyl halide, a dienone, a dialkyl halide, or a mixture thereof.

70. The creping adhesive of any of paragraphs 57 to 69, wherein functionally symmetric crosslinker comprises methylene-bis-acrylamide, ethylene glycol diglycidyl ether, propylene glycol diglycidyl ether, poly(ethylene glycol) diglycidyl ether, poly(propylene glycol) diglycidyl ether, poly (ethylene glycol) diacrylate, poly(propylene glycol) diacrylate, or a mixture thereof.

71. The creping adhesive of any of paragraphs 57 to 70, wherein the functionally symmetric crosslinker comprises ethylene glycol diglycidyl ether.

72. The creping adhesive of any of paragraphs 57 to 71, wherein the creping adhesive has a viscosity of about 20 cP to about 1,000 cP at a temperature of about 25° C.

73. The creping adhesive of any of paragraphs 57 to 72, wherein the creping adhesive has an adhesion of about 25 gram-force per inch to about 800 gram-force per inch.

74. The creping adhesive of any of paragraphs 57 to 73, wherein the creping adhesive has a film solubility of about 10% to about 99%.

75. The creping adhesive of any of paragraphs 57 to 74, wherein the creping adhesive has a film solubility of about 20% to about 80%.

76. The creping adhesive of any of paragraphs 57 to 75, wherein the crosslinked resin has a weight average molecular weight of about 25 kDa to about 1,500 kDa.

77. The creping adhesive of any of paragraphs 1 to 76, wherein the polyamidoamine backbones are derived from a polyamidoamine having chemical formula (XIV)

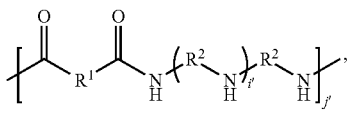

(XIV)

wherein $R^1$ is $(CH_2)_u$ 1, 2, 3, 4, or 5, each $R^2$ is independently $(CH_2)_v$, and v is 2, 3, or 4, i' is 1, 2, or 3, and j' is a number from 1 to about 10,000.

78. The creping adhesive of paragraph 77, wherein the polyamidoamine has a weight average molecular weight of about 3 kDa to about 20 kDa.

79. A process for making a creping adhesive, comprising: reacting a polyamidoamine and a first crosslinker in the presence of a solvent to produce a prepolymer comprising polyamidoamine backbones crosslinked by primary crosslinking moieties, wherein the first crosslinker comprises a first functionally symmetric crosslinker; and reacting the prepolymer and a second crosslinker in the presence of the solvent and a modified polyvinyl alcohol to produce a crosslinked resin comprising polyamidoamine backbones crosslinked by the primary crosslinking moieties and secondary crosslinking moieties, wherein the second crosslinker comprises an epihalohydrin, a second functionally symmetric crosslinker, or a mixture thereof.

80. A process for making a creping adhesive, comprising: reacting a polyamidoamine and a first crosslinker in the presence of a solvent and a modified polyvinyl alcohol to produce a prepolymer comprising polyamidoamine backbones crosslinked by primary crosslinking moieties, wherein the first crosslinker comprises a first functionally symmetric crosslinker; and reacting the prepolymer and a second crosslinker in the presence of the solvent and the modified polyvinyl alcohol to produce a crosslinked resin comprising polyamidoamine backbones crosslinked by the primary crosslinking moieties and secondary crosslinking moieties, wherein the second crosslinker comprises an epihalohydrin, a second functionally symmetric crosslinker, or a mixture thereof.

81. The process of paragraph 79 or 80, wherein the polyamidoamine and the first crosslinker are reacted at a temperature of about 30° C. to about 100° C. for about 30 minutes to about 12 hours to produce the prepolymer.

82. The process of any of paragraphs 79 to 81, wherein the prepolymer and the second crosslinker are reacted at a temperature of about 40° C. to about 90° C. for about 30 minutes to about 10 hours to produce the crosslinked resin.

83. The process of any of paragraphs 79 to 82, wherein the prepolymer and the second crosslinker are reacted at a temperature of about 50° C. to about 80° C. for about 1 hour to about 8 hours to produce the crosslinked resin.

84. A process for making a creping adhesive, comprising: reacting a polyamidoamine, a first crosslinker, and a second crosslinker in the presence of a solvent and a modified polyvinyl alcohol to produce a crosslinked resin comprising polyamidoamine backbones crosslinked by primary crosslinking moieties and secondary crosslinking moieties, wherein: the first crosslinker comprises a first functionally symmetric crosslinker, and the second crosslinker comprises an epihalohydrin, a second functionally symmetric crosslinker, or a mixture thereof.

85. The process of paragraph 84, wherein the polyamidoamine, the first crosslinker, and the second crosslinker are reacted at a temperature of about 30° C. to about 100° C. for about 30 minutes to about 12 hours to produce the crosslinked resin.

86. The process of paragraph 84, wherein the polyamidoamine, the first crosslinker, and the second crosslinker are reacted at a temperature of about 40° C. to about 90° C. for about 30 minutes to about 10 hours to produce the crosslinked resin.

87. The process of any of paragraphs 79 to 86, wherein the creping adhesive has a pH of about 6.5 to about 10.

88. The process of any of paragraphs 79 to 87, wherein the creping adhesive has a viscosity of about 20 cP to about 1,000 cP at a temperature of about 25° C.

89. The process of any of paragraphs 79 to 88, wherein the creping adhesive has an adhesion of about 25 gram-force per inch to about 800 gram-force per inch.

90. The process of any of paragraphs 79 to 89, wherein the creping adhesive has a film solubility of about 10% to about 99%.

91. The process of any of paragraphs 79 to 90 wherein the creping adhesive has a film solubility of about 20% to about 80%.

92. The process of any of paragraphs 79 to 91, wherein the crosslinked resin has a weight average molecular weight of about 25 kDa to about 1,500 kDa.

93. The process of any of paragraphs 79 to 92, wherein the creping adhesive comprises about 1 wt % to about 99 wt % of the crosslinked resin based on a combined weight of the modified polyvinyl alcohol and the crosslinked resin.

94. The process of any of paragraphs 79 to 93, wherein the creping adhesive comprises about 1 wt % to about 98 wt % of the solvent, about 1 wt % to about 70 wt % of the modified polyvinyl alcohol, and about 1 wt % to about 70 wt % of the crosslinked resin, based on a combined weight of the solvent, the modified polyvinyl alcohol, and the crosslinked resin.

95. The process of any of paragraphs 79 to 94, wherein the modified polyvinyl alcohol comprises a carboxylated polyvinyl alcohol, a sulfonated polyvinyl alcohol, a sulfated polyvinyl alcohol, a sulfonated-carboxylated polyvinyl alcohol, or a mixture thereof.

96. The process of paragraph 95, wherein the modified polyvinyl alcohol comprises the carboxylated polyvinyl alcohol, and wherein the carboxylated polyvinyl alcohol has the following chemical formula (I):

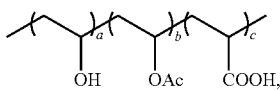

and wherein a is a number from 1 to 99, b is a number from 0 to 30, and c is a number from 1 to 20.

97. The process of paragraph 95 or 96, wherein the modified polyvinyl alcohol comprises the carboxylated polyvinyl alcohol, and wherein the carboxylated polyvinyl alcohol has the following chemical formula (II):

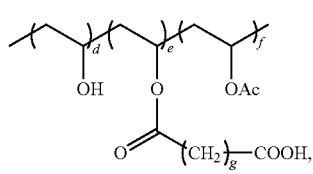

and wherein d is a number from 1 to 98, e is a number from 1 to 20, f is a number from 0 to 30, and g is a number from 0-10.

98. The process of any of paragraphs 95 to 96, wherein modified polyvinyl alcohol comprises the sulfonated polyvinyl alcohol, and wherein the sulfonated polyvinyl alcohol has the following chemical formula (III):

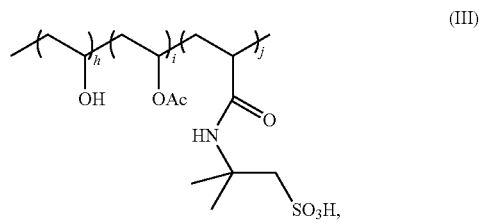

and wherein h is a number from 1 to 98, i is a number from 0 to 30, and j is a number from 1 to 20.

99. The process of any of paragraphs 95 to 98, wherein the modified polyvinyl alcohol comprises the sulfated polyvinyl alcohol, and wherein the sulfated polyvinyl alcohol has the following chemical formula (IV):

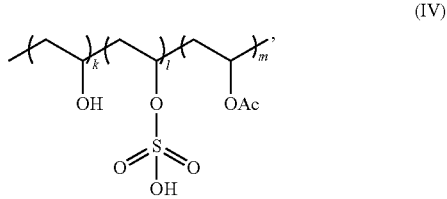

and wherein k is a number from 1 to 98, l is a number from 1 to 20, and m is a number from 0 to 30.

100. The process of any of paragraphs 95 to 99, wherein the modified polyvinyl alcohol comprises the sulfonated-carboxylated polyvinyl alcohol, and wherein the sulfonated-carboxylated polyvinyl alcohol has the following chemical formula (V)

and wherein a' is a number from 1 to 97, b' is a number from 1 to 30, c' is a number from 1 to 20, and d' is a number from 1 to 10.

101. The process of any of paragraphs 95 to 100, wherein the modified polyvinyl alcohol comprises the sulfonated-carboxylated polyvinyl alcohol, and wherein the sulfonated-carboxylated polyvinyl alcohol has the following chemical formula (VI):

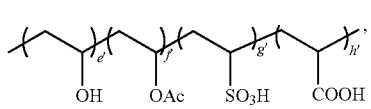
(VI)

and wherein e' is a number from 1 to 97, f' is a number from 1 to 30, g' is a number from 1 to 20, and h' is a number from 1 to 20.

102. The process of any of paragraphs 79 to 101, wherein the solvent comprises water, an alkylene glycol, a polyalkylene glycol, or a mixture thereof.

103. The process of any of paragraphs 79 to 102, wherein the solvent comprises water.

104. The process of any of paragraphs 79 to 103, wherein the first functionally symmetric crosslinker comprises or the first functionally symmetric crosslinker and the second functionally symmetric crosslinker independently has the following chemical formula (VII), (VIII), (IX), (X), (XI), or (XII):

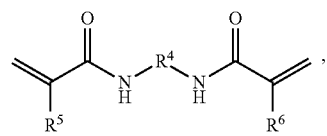
(VII)

wherein $R^4$ is $(CH_2)_t$, t is 1, 2, or 3, and $R^5$ and $R^6$ are both a hydrogen atom or a methyl group;

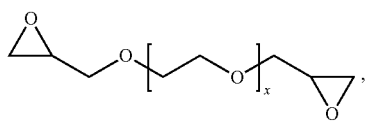
(VIII)

wherein x is a number from 1 to about 100;

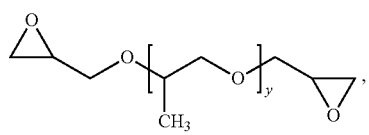
(IX)

wherein y is a number from 1 to about 100;

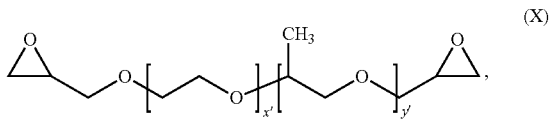
(X)

wherein x'+y' is a number from 1 to about 100:

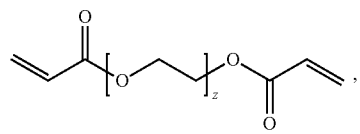
(XI)

wherein z is a number from 1 to about 100; or

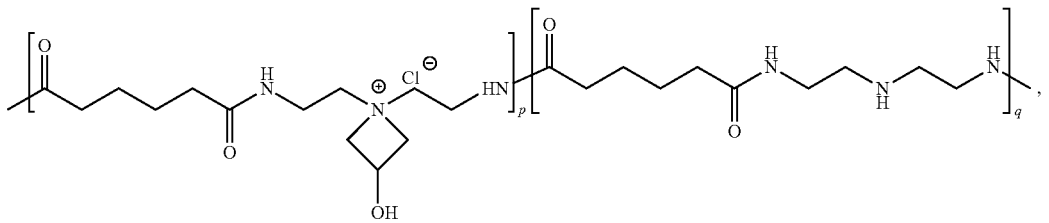
(XII)

wherein a q/p ratio is a number from about 10 to about 1000.

105. The process of any of paragraphs 79 to 104, wherein the first functionally symmetric crosslinker or at least one of the first functionally symmetric crosslinker and the second functionally symmetric crosslinker comprises a copolymer of an acrylate monomer, a methacrylate monomer, an alkene monomer, or a diene monomer, with an azetidinium-functionalized monomer selected from

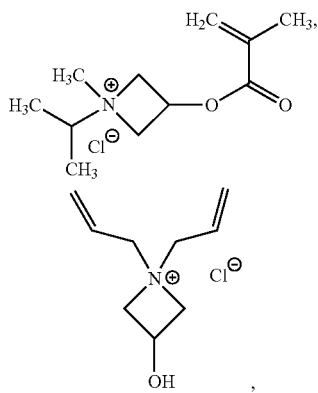

and a mixture thereof, wherein a fraction of the azetidinium-functionalized monomer to the acrylate monomer, the methacrylate monomer, the alkene monomer, or the diene monomer in the copolymer is from about 0.1% to about 12%.

106. The process of any of paragraphs 79 to 105, wherein the first functionally symmetric crosslinker comprises or the first functionally symmetric crosslinker and the second functionally symmetric crosslinker independently comprise a di-acrylate, a bis(acrylamide), a di-epoxide, a polyazetidinium compound, an alkylene glycol diglycidyl ether, a poly(alkylene glycol) diglycidyl ether, a diisocyanate, a 1,3-dialkyldiazetidine-2,4-dione, a dianhydride, a diacyl halide, a dienone, a dialkyl halide, or any mixture thereof.

107. The process of any of paragraphs 79 to 106, wherein the first functionally symmetric crosslinker comprises or the first functionally symmetric crosslinker and the second functionally symmetric crosslinker independently comprise N,N'-methylene-bis-acrylamide, N,N'-methylene-bis-methacrylamide, ethylene glycol diglycidyl ether, propylene glycol diglycidyl ether, poly(ethylene glycol) diglycidyl ether, poly(propylene glycol) diglycidyl ether, poly (ethylene glycol) diacrylate, poly(propylene glycol) diacrylate, or a mixture thereof.

108. The process of any of paragraphs 79 to 107, wherein the second crosslinker comprises the epihalohydrin, and wherein the epihalohydrin comprises epichlorohydrin, epibromohydrin, epiiodohydrin, or a mixture thereof.

109. The process of any of paragraphs 79 to 108, wherein the first crosslinker comprises N,N'-methylene-bis-acrylamide, and wherein the second crosslinker comprises epichlorohydrin.

110. The process of any of paragraphs 79 to 109, wherein the first crosslinker comprises N,N'-methylene-bis-acrylamide, and wherein the second crosslinker comprises ethylene glycol diglycidyl ether.

111. A process for making a creping adhesive, comprising: reacting a polyamidoamine and a functionally symmetric crosslinker in the presence of a solvent to produce a prepolymer comprising polyamidoamine backbones crosslinked by primary crosslinking moieties derived from the functionally symmetric crosslinker; reacting the prepolymer and an epihalohydrin in the presence of the solvent to produce a crosslinked resin comprising polyamidoamine backbones crosslinked by the primary crosslinking moieties and propanediyl moieties; and blending the crosslinked resin with a modified polyvinyl alcohol to produce the creping adhesive.

112. The process of paragraph 111, wherein the polyamidoamine and the functionally symmetric crosslinker are reacted at a temperature of about 30° C. to about 100° C. for about 30 minutes to about 12 hours to produce the prepolymer.

113. The process of paragraph 111 or 112, wherein the prepolymer and the epihalohydrin are reacted at a temperature of about 40° C. to about 90° C. for about 30 minutes to about 10 hours to produce the crosslinked resin.

114. The process of any of paragraphs 111 to 113, wherein the prepolymer and the epihalohydrin are reacted at a temperature of about 50° C. to about 80° C. for about 1 hour to about 8 hours to produce the crosslinked resin.

115. The process of any of paragraphs 111 to 114, wherein the creping adhesive has a pH of about 6.5 to about 10.

116. The process of any of paragraphs 111 to 115 wherein the creping adhesive has a viscosity of about 20 cP to about 1,000 cP at a temperature of about 25° C.

117. The process of any of paragraphs 111 to 116, wherein the creping adhesive has an adhesion of about 25 gram-force per inch to about 800 gram-force per inch.

118. The process of any of paragraphs 111 to 117, wherein the creping adhesive has a film solubility of about 10% to about 99%.

119. The process of any of paragraphs 111 to 118 wherein the creping adhesive has a film solubility of about 20% to about 80%.

120. The process of any of paragraphs 111 to 119, wherein the crosslinked resin has a weight average molecular weight of about 25 kDa to about 1,500 kDa.

121. The process of any of paragraphs 111 to 120, wherein the creping adhesive comprises about 1 wt % to about 99 wt % of the crosslinked resin based on a combined weight of the modified polyvinyl alcohol and the crosslinked resin.

122. The process of any of paragraphs 111 to 121, wherein the creping adhesive comprises about 1 wt % to about 98 wt % of the solvent, about 1 wt % to about 70 wt % of the modified polyvinyl alcohol, and about 1 wt % to about 70 wt % of the crosslinked resin, based on a combined weight of the solvent, the modified polyvinyl alcohol, and the crosslinked resin.

123. The process of any of paragraphs 111 to 122, wherein the modified polyvinyl alcohol comprises a carboxylated polyvinyl alcohol, a sulfonated polyvinyl alcohol, a sulfated polyvinyl alcohol, a sulfonated-carboxylated polyvinyl alcohol, or a mixture thereof.

124. The process of paragraph 123, wherein the modified polyvinyl alcohol comprises the carboxylated polyvinyl alcohol, and wherein the carboxylated polyvinyl alcohol has the following chemical formula (I):

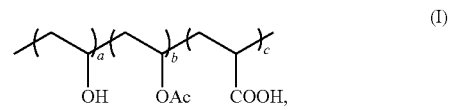

and wherein a is a number from 1 to 99, b is a number from 0 to 30, and c is a number from 1 to 20.

125. The process of paragraph 123 or 124, wherein the modified polyvinyl alcohol comprises the carboxylated polyvinyl alcohol, and wherein the carboxylated polyvinyl alcohol has the following chemical formula (II):

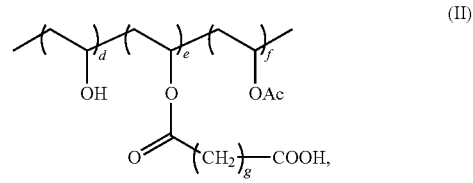

and wherein d is a number from 1 to 98, e is a number from 1 to 20, f is a number from 0 to 30, and g is a number from 0-10.

126. The process of any of paragraphs 123 to 125, wherein modified polyvinyl alcohol comprises the sulfonated polyvinyl alcohol, wherein the sulfonated polyvinyl alcohol has the following chemical formula (III):

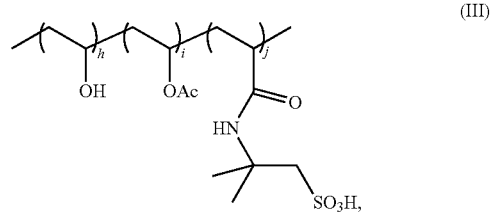

and wherein h is a number from 1 to 98, i is a number from 0 to 30, and j is a number from 1 to 20.

127. The process of any of paragraphs 123 to 126, wherein the modified polyvinyl alcohol comprises the sulfated polyvinyl alcohol, and wherein the sulfated polyvinyl alcohol has the following chemical formula (IV):

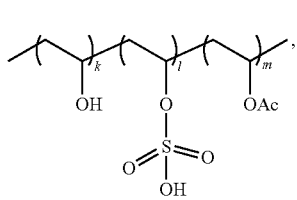
(IV)

and wherein k is a number from 1 to 98, l is a number from 1 to 20, and m is a number from 0 to 30.

128. The process of any of paragraphs 123 to 127, wherein the modified polyvinyl alcohol comprises the sulfonated-carboxylated polyvinyl alcohol, and wherein the sulfonated-carboxylated polyvinyl alcohol has the following chemical formula (V):

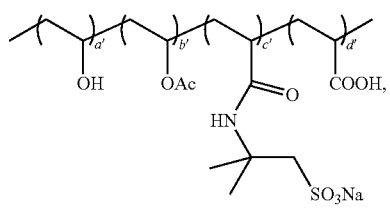
(V)

and wherein a' is a number from 1 to 97, b' is a number from 1 to 30, c' is a number from 1 to 20, and d' is a number from 1 to 10.

129. The process of any of paragraphs 123 to 128, wherein the modified polyvinyl alcohol comprises the sulfonated-carboxylated polyvinyl alcohol, and wherein the sulfonated-carboxylated polyvinyl alcohol has the following chemical formula (VI):

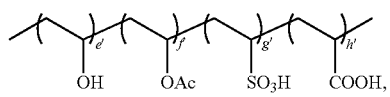
(VI)

and wherein e' is a number from 1 to 97, f' is a number from 1 to 30, g' is a number from 1 to 20, and h' is a number from 1 to 20.

130. The process of any of paragraphs 111 to 129, wherein the solvent comprises water, an alkylene glycol, a polyalkylene glycol, or a mixture thereof.

131. The process of any of paragraphs 111 to 130, wherein the solvent comprises water.

132. The process of any of paragraphs 111 to 131, wherein the functionally symmetric crosslinker has the following chemical formula (VII), (VIII), (IX), (X), (XI), or (XII):

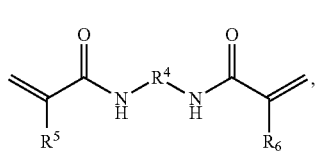
(VII)

wherein $R^4$ is $(CH_2)_t$, t is 1, 2, or 3, and $R^5$ and $R^6$ are both a hydrogen atom or a methyl group;

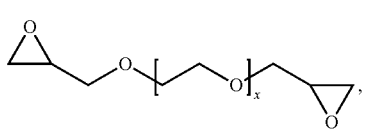
(VIII)

wherein x is a number from 1 to about 100;

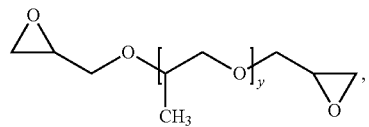
(IX)

wherein y is a number from 1 to about 100;

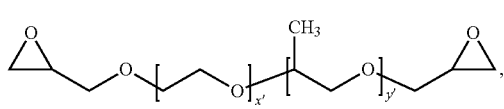
(X)

wherein x'+y' is a number from 1 to about 100;

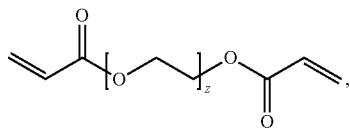
(XI)

wherein z is a number from 1 to about 100; or

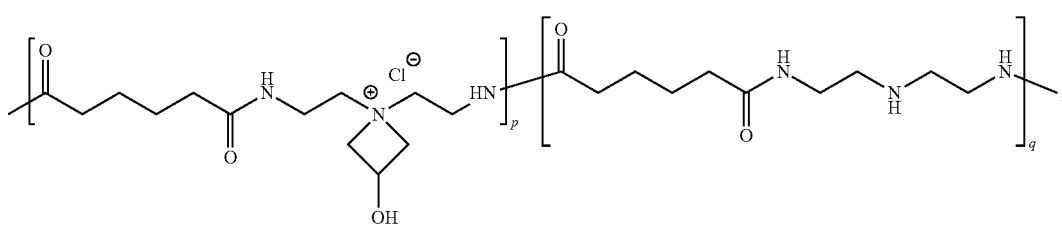
(XII)

wherein a q/p ratio is a number from about 10 to about 1000.

133. The process of any of paragraphs 111 to 132, wherein the functionally symmetric crosslinker comprises a copolymer of an acrylate monomer, a methacrylate monomer, an alkene monomer or a diene monomer with an azetidinium-functionalized monomer selected from

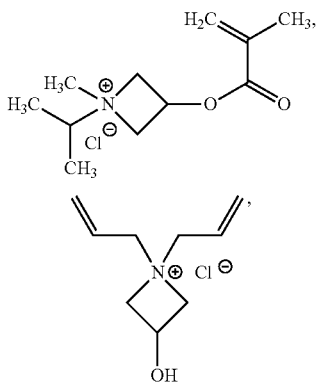

and a mixture thereof, wherein a fraction of the azetidinium-functionalized monomer to the acrylate monomer, the methacrylate monomer, the alkene monomer, or the diene monomer in the copolymer is from about 0.1% to about 12%.

134. The process of any of paragraphs 111 to 133, wherein the functionally symmetric crosslinker comprises a di-acrylate, a bis(acrylamide), a di-epoxide, a polyazetidinium compound, an alkylene glycol diglycidyl ether, a poly(alkylene glycol) diglycidyl ether, a diisocyanate, a 1,3-dialkyldiazetidine-2,4-dione, a dianhydride, a diacyl halide, a dienone, a dialkyl halide, or a mixture thereof.

135. The process of any of paragraphs 111 to 134, wherein the functionally symmetric crosslinker comprises N,N'-methylene-bis-acrylamide, N,N'-methylene-bis-methacrylamide, ethylene glycol diglycidyl ether, propylene glycol diglycidyl ether, poly(ethylene glycol) diglycidyl ether, poly (propylene glycol) diglycidyl ether, poly (ethylene glycol) diacrylate, poly(propylene glycol) diacrylate, or a mixture thereof.

136. The process of any of paragraphs 111 to 135, wherein the epihalohydrin comprises epichlorohydrin, epibromohydrin, epiiodohydrin, or a mixture thereof.

137. A process for making a creping adhesive, comprising: reacting a polyamidoamine with a functionally symmetric crosslinker in the presence of a solvent and a polyvinyl alcohol, a modified polyvinyl alcohol, or a mixture thereof to produce a crosslinked resin comprising polyamidoamine backbones crosslinked by primary crosslinking moieties derived from the functionally symmetric crosslinker.

138. The process of paragraph 137, wherein the polyamidoamine and the functionally symmetric crosslinker are reacted at a temperature of about 40° C. to about 100° C. for about 30 minutes to about 10 hours to produce the prepolymer.

139. The process of paragraph 137 or 138, wherein the creping adhesive has a pH of about 6.5 to about 10.

140. The process of any of paragraphs 137 to 139, wherein the creping adhesive has a pH of about 7 to about 9.

141. The process of any of paragraphs 137 to 140, wherein the creping adhesive has a viscosity of about 20 cP to about 1,000 cP at a temperature of about 25° C.

142. The process of any of paragraphs 137 to 141, wherein the creping adhesive has an adhesion of about 25 gram-force per inch to about 800 gram-force per inch.

143. The process of any of paragraphs 137 to 142, wherein the creping adhesive has a film solubility of about 10% to about 99%.

144. The process of any of paragraphs 137 to 143, wherein the creping adhesive has a film solubility of about 20% to about 80%.

145. The process of any of paragraphs 137 to 144, wherein the crosslinked resin has a weight average molecular weight of about 25 kDa to about 1,500 kDa.

146. The process of any of paragraphs 137 to 145, wherein the creping adhesive comprises about 1 wt % to about 99 wt % of the crosslinked resin based on a combined weight of the crosslinked resin, any polyvinyl alcohol, and any modified polyvinyl alcohol.

147. The process of any of paragraphs 137 to 146, wherein the creping adhesive comprises about 1 wt % to about 98 wt % of the solvent, about 1 wt % to about 70 wt % of the crosslinked resin, up to about 70 wt % of the polyvinyl alcohol, and up to about 70 wt % of the modified alcohol, based on a combined weight of the solvent, the crosslinked resin, any polyvinyl alcohol, and any modified polyvinyl alcohol, and wherein the creping adhesive comprises about 1 wt % to about 70 wt % of a total amount of any polyvinyl alcohol and any modified polyvinyl alcohol, based on the combined weight of the solvent, any polyvinyl alcohol, any modified polyvinyl alcohol, and the crosslinked resin.

148. The process of any of paragraphs 137 to 147, wherein the creping adhesive comprises the modified polyvinyl alcohol, and wherein the modified polyvinyl alcohol comprises a carboxylated polyvinyl alcohol, a sulfonated polyvinyl alcohol, a sulfated polyvinyl alcohol, a sulfonated-carboxylated polyvinyl alcohol, or a mixture thereof.

149. The process of paragraph 148, wherein the modified polyvinyl alcohol comprises the carboxylated polyvinyl alcohol, and wherein the carboxylated polyvinyl alcohol has the following chemical formula (I):

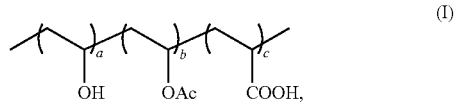

wherein a is a number from 1 to 98, b is a number from 0 to 30, and c is a number from 1 to 20.

150. The process of paragraph 148 or 149, wherein the modified polyvinyl alcohol comprises the carboxylated polyvinyl alcohol, and wherein the carboxylated polyvinyl alcohol has the following chemical formula (II):

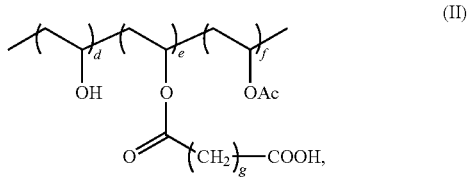

and wherein d is a number from 1 to 98, e is a number from 1 to 20, f is a number from 0 to 30, and g is a number from 0-10.

151. The process of any of paragraphs 148 to 150, wherein the modified polyvinyl alcohol comprises the sulfonated polyvinyl alcohol, and wherein the sulfonated polyvinyl alcohol has the following chemical formula (III):

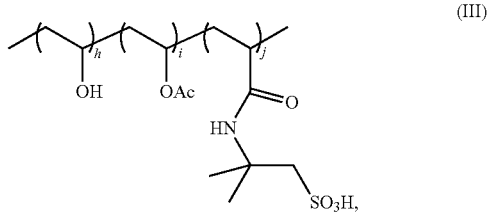
(III)

and wherein h is a number from 1 to 98, i is a number from 0 to 30, and j is a number from 1 to 20.

152. The process of any of paragraphs 148 to 151, wherein the modified polyvinyl alcohol comprises the sulfated polyvinyl alcohol, and wherein the sulfated polyvinyl alcohol has the following chemical formula (IV):

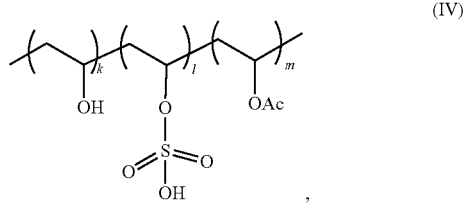
(IV)

and wherein k is a number from 1 to 98, 1 is a number from 1 to 20, and m is a number from 0 to 30.

153. The process of any of paragraphs 148 to 152, wherein the modified polyvinyl alcohol comprises the sulfonated-carboxylated polyvinyl alcohol, and wherein the sulfonated-carboxylated polyvinyl alcohol has the following chemical formula (V):

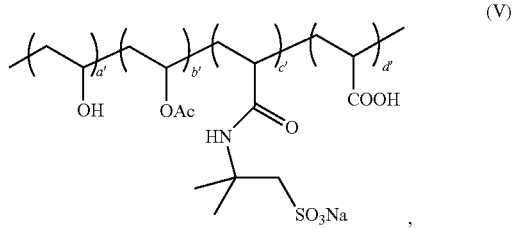
(V)

and wherein a' is a number from 1 to 97, b' is a number from 1 to 30, c' is a number from 1 to 20, and d' is a number from 1 to 10.

154. The process of any of paragraphs 148 to 152, wherein the modified polyvinyl alcohol comprises the sulfonated-carboxylated polyvinyl alcohol, and wherein the sulfonated-carboxylated polyvinyl alcohol has the following chemical formula (VI):

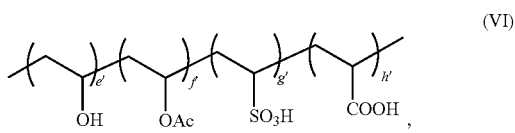
(VI)

and wherein e' is a number from 1 to 97, f' is a number from 1 to 30, g' is a number from 1 to 20, and h' is a number from 1 to 20.

155. The process of any of paragraphs 137 to 154, wherein the creping adhesive comprises the polyvinyl alcohol, wherein the polyvinyl alcohol has the following chemical formula (XIII):

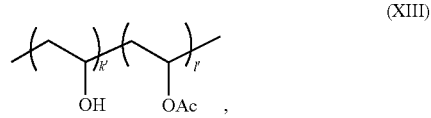
(XIII)

and wherein k' is a number from 1 to 99 and l' is a number from 0 to 30.

156. The process of any of paragraphs 137 to 155, wherein the solvent comprises water, an alkylene glycol, a polyalkylene glycol, or a mixture thereof.

157. The process of any of paragraphs 137 to 156, wherein the solvent comprises water.

158. The process of any of paragraphs 137 to 157, wherein the functionally symmetric crosslinker has the following chemical formula (VII), (VIII), (IX), (X), (XI), or (XII):

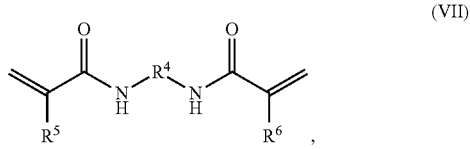
(VII)

wherein $R^4$ is $(CH_2)_t$, t is 1, 2, or 3, and $R^5$ and $R^6$ are both a hydrogen atom or a methyl group;

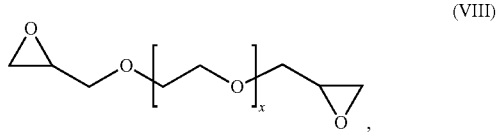
(VIII)

wherein x is a number from 1 to about 100;

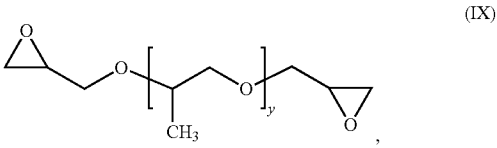
(IX)

wherein y is a number from 1 to about 100;

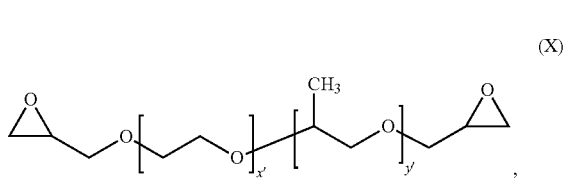

(X)

wherein x'+y' is a number from 1 to about 100;

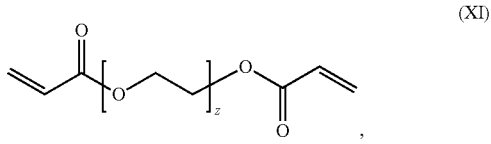

(XI)

wherein z is a number from 1 to about 100; or

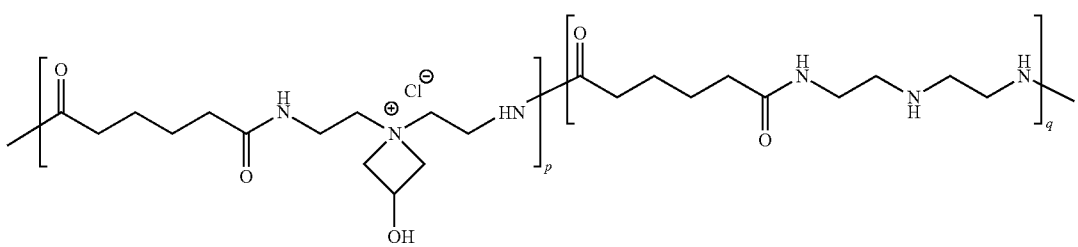

(XII)

wherein a q/p ratio is a number from about 10 to about 1000.

159. The process of any of paragraphs 137 to 158, wherein the functionally symmetric crosslinker comprises a copolymer of an acrylate monomer, a methacrylate monomer, an alkene monomer, or a diene monomer, with an azetidinium-functionalized monomer selected from

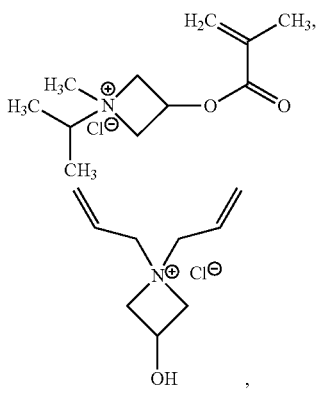

and a mixture thereof, wherein a fraction of the azetidinium-functionalized monomer to the acrylate monomer, the methacrylate monomer, the alkene monomer, or the diene monomer in the copolymer is from about 0.1% to about 12%.

160. The process of any of paragraphs 137 to 159, wherein the functionally symmetric crosslinker a comprises a di-acrylate, a bis(acrylamide), a di-epoxide, a polyazetidinium compound, an alkylene glycol diglycidyl ether, a poly(alkylene glycol) diglycidyl ether, a diisocyanate, a 1,3-dialkyldiazetidine-2,4-dione, a dianhydride, a diacyl halide, a dienone, a dialkyl halide, or a mixture thereof.

161. The process of any of paragraphs 137 to 160, wherein functionally symmetric crosslinker comprises poly(ethylene glycol) diglycidyl ether, poly(propylene glycol) diglycidyl ether, polyethylene glycol diacrylate, or a mixture thereof.

162. The process of any of paragraphs 137 to 161, wherein the functionally symmetric crosslinker comprises ethylene glycol diglycidyl ether.

163. The process of any of paragraphs 79 to 162, wherein the polyamidoamine backbones are derived from a polyamidoamine having chemical formula (XIV):

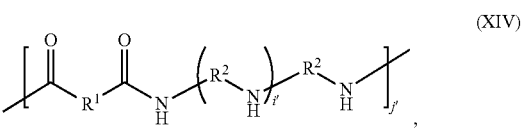

(XIV)

wherein $R^1$ is $(CH_2)^u$ 1, 2, 3, 4, or 5, each $R^2$ is independently $(CH_2)_v$ and v is 2, 3, or 4, i' is 1, 2, or 3, and j' is a number from 1 to about 10,000.

164. The process of paragraph 163, wherein the polyamidoamine has a weight average molecular weight of about 3 kDa to about 20 kDA.

165. A process for making a creping adhesive, comprising: blending a resin mixture with a modified polyvinyl alcohol to produce the creping adhesive, wherein: the resin mixture comprises: a solvent; and a crosslinked resin comprising polyamidoamine backbones crosslinked by primary crosslinking moieties and propanediyl moieties, wherein the primary crosslinking moieties are derived from a functionally symmetric crosslinker, and the modified polyvinyl alcohol comprises a carboxylated polyvinyl alcohol, a sulfonated polyvinyl alcohol, a sulfated polyvinyl alcohol, a sulfonated-carboxylated polyvinyl alcohol, or a mixture thereof.

166. The process of paragraph 165, wherein the crosslinked resin and the modified polyvinyl alcohol are blended at a temperature of about 20° C. to about 60° C. for about 15 minutes to about 2 hours to produce the creping adhesive.

167. The process of paragraph 165 or 166, wherein the creping adhesive has a pH of about 6.5 to about 10.

168. The process of any of paragraphs 165 to 167 wherein the creping adhesive has a viscosity of about 20 cP to about 1,000 cP at a temperature of about 25° C.

169. The process of any of paragraphs 165 to 168, wherein the creping adhesive has an adhesion of about 25 gram-force per inch to about 800 gram-force per inch.

170. The process of any of paragraphs 165 to 169, wherein the creping adhesive has a film solubility of about 10% to about 99%.

171. The process of any of paragraphs 165 to 170 wherein the creping adhesive has a film solubility of about 20% to about 80%.

172. The process of any of paragraphs 165 to 171, wherein the crosslinked resin has a weight average molecular weight of about 25 kDa to about 1,500 kDa.

173. The process of any of paragraphs 165 to 172, wherein the creping adhesive comprises about 1 wt % to about 99 wt % of the crosslinked resin based on a combined weight of the modified polyvinyl alcohol and the crosslinked resin.

174. The process of any of paragraphs 165 to 173, wherein the creping adhesive comprises about 1 wt % to about 98 wt % of the solvent, about 1 wt % to about 70 wt % of the modified polyvinyl alcohol, and about 1 wt % to about 70 wt % of the crosslinked resin, based on a combined weight of the solvent, the modified polyvinyl alcohol, and the crosslinked resin.

175. The process of any of paragraphs 165 to 174, wherein the modified polyvinyl alcohol comprises a carboxylated polyvinyl alcohol, a sulfonated polyvinyl alcohol, a sulfated polyvinyl alcohol, a sulfonated-carboxylated polyvinyl alcohol, or a mixture thereof.

176. The process of paragraph 175, wherein the modified polyvinyl alcohol comprises the carboxylated polyvinyl alcohol, wherein the carboxylated polyvinyl alcohol has the following chemical formula (I):

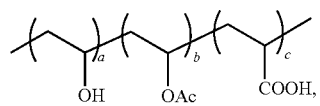

(I)

and wherein a is a number from 1 to 99, b is a number from 0 to 30, and c is a number from 1 to 20.

177. The process of paragraph 175 or 176, wherein the modified polyvinyl alcohol comprises the carboxylated polyvinyl alcohol, and wherein the carboxylated polyvinyl alcohol has the following chemical formula (II):

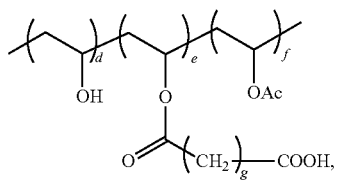

(II)

and wherein d is a number from 1 to 98, e is a number from 1 to 20, f is a number from 0 to 30, and g is a number from 0-10.

178. The process of any of paragraphs 175 to 177, wherein modified polyvinyl alcohol comprises the sulfonated polyvinyl alcohol, wherein the sulfonated polyvinyl alcohol has the following chemical formula (III):

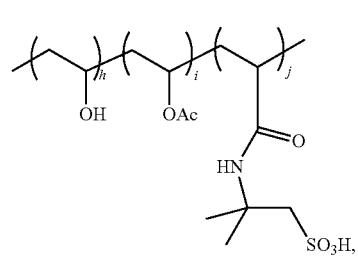

(III)

and wherein h is a number from 1 to 98, i is a number from 0 to 30, and j is a number from 1 to 20.

179. The process of any of paragraphs 175 to 178, wherein the modified polyvinyl alcohol comprises the sulfated polyvinyl alcohol, and wherein the sulfated polyvinyl alcohol has the following chemical formula (IV):

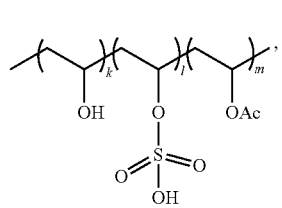

(IV)

and wherein k is a number from 1 to 98, l is a number from 1 to 20, and m is a number from 0 to 30.

180. The process of any of paragraphs 175 to 179, wherein the modified polyvinyl alcohol comprises the sulfonated-carboxylated polyvinyl alcohol, and wherein the sulfonated-carboxylated polyvinyl alcohol has the following chemical formula (V):

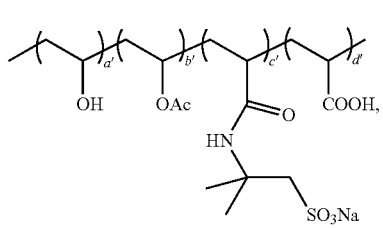

(V)

and wherein a' is a number from 1 to 97, b' is a number from 1 to 30, c' is a number from 1 to 20, and d' is a number from 1 to 10.

181. The process of any of paragraphs 175 to 180, wherein the modified polyvinyl alcohol comprises the sulfonated-carboxylated polyvinyl alcohol, and wherein the sulfonated-carboxylated polyvinyl alcohol has the following chemical formula (VI):

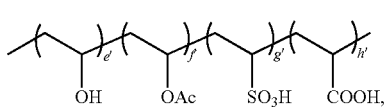

(VI)

and wherein e' is a number from 1 to 97, f' is a number from 1 to 30, g' is a number from 1 to 20, and h' is a number from 1 to 20.

182. The process of any of paragraphs 165 to 181, wherein the solvent comprises water, an alkylene glycol, a polyalkylene glycol, or a mixture thereof.

183. The process of any of paragraphs 165 to 182, wherein the solvent comprises water.

184. The process of any of paragraphs 165 to 183, wherein the functionally symmetric crosslinker has the following chemical formula (VII), (VIII), (IX), (X), (XI), or (XII)

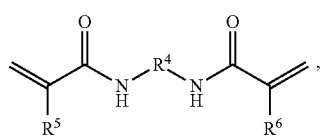
(VII)

wherein $R^4$ is $(CH_2)_t$, t is 1, 2, or 3, and $R^5$ and $R^6$ are both a hydrogen atom or a methyl group;

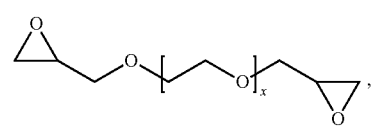
(VIII)

wherein x is a number from 1 to about 100;

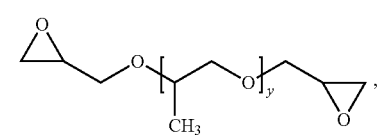
(IX)

wherein y is a number from 1 to about 100;

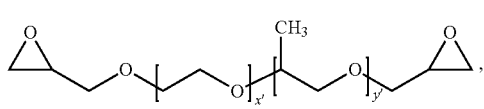
(X)

wherein x'+y' is a number from 1 to about 100;

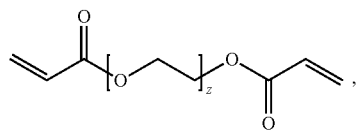
(XI)

wherein z is a number from 1 to about 100; or

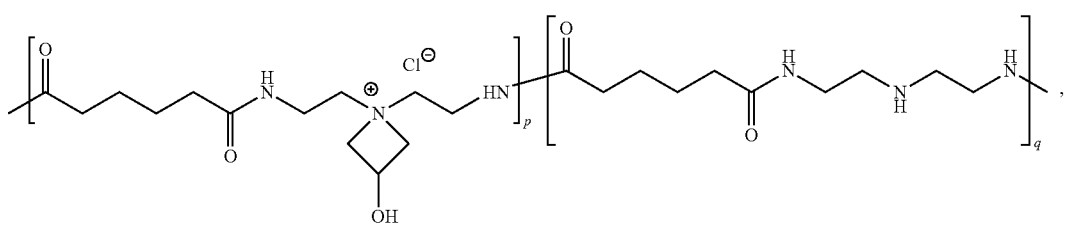
(XII)

wherein a q/p ratio is a number from about 10 to about 1000.

185. The process of any of paragraphs 165 to 184, wherein the functionally symmetric crosslinker comprises a copolymer of an acrylate monomer, a methacrylate monomer, an alkene monomer, or a diene monomer, with an azetidinium-functionalized monomer selected from

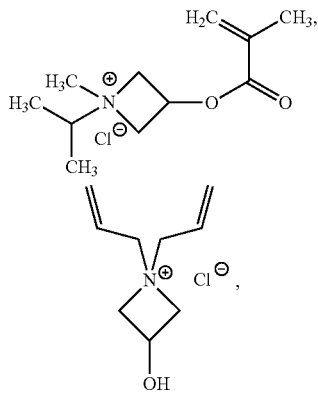

and a mixture thereof, wherein a fraction of the azetidinium-functionalized monomer to the acrylate monomer, the methacrylate monomer, the alkene monomer, or the diene monomer in the copolymer is from about 0.1% to about 12%.

186. The process of any of paragraphs 165 to 185, wherein the functionally symmetric crosslinker comprises a di-acrylate, a bis(acrylamide), a di-epoxide, a polyazetidinium compound, an alkylene glycol diglycidyl ether, a poly(alkylene glycol) diglycidyl ether, a diisocyanate, a 1,3-dialkyldiazetidine-2,4-dione, a dianhydride, a diacyl halide, a dienone, a dialkyl halide, or a mixture thereof.

187. The process of any of paragraphs 165 to 186, wherein the functionally symmetric crosslinker comprises N,N'-methylene-bis-acrylamide, N,N'-methylene-bis-methacrylamide, ethylene glycol diglycidyl ether, propylene glycol diglycidyl ether, poly(ethylene glycol) diglycidyl ether, poly(propylene glycol) diglycidyl ether, poly(ethylene glycol) diacrylate, poly(propylene glycol) diacrylate, or a mixture thereof.

188. The process of any of paragraphs 165 to 187, wherein the propanediyl moieties are derived from an epihalohydrin.

189. The process of paragraph 188, wherein the epihalohydrin comprises epichlorohydrin, epibromohydrin, epiiodohydrin, or a mixture thereof.

190. A process for creping a paper web, comprising: applying to a rotating creping cylinder a creping adhesive; pressing the paper web against the creping cylinder to adhere the paper web to the creping cylinder; and dislodging the paper web from the creping cylinder with a doctor blade, wherein the creping adhesive comprises a solvent, a modified polyvinyl alcohol, and a crosslinked resin, and wherein: the crosslinked resin comprises polyamidoamine backbones crosslinked by primary crosslinking moieties and propanediyl moieties, wherein the primary crosslinking moieties are derived from a functionally symmetric crosslinker, or the crosslinked resin comprises polyamidoamine backbones crosslinked by primary crosslinking moieties and secondary crosslinking moieties, wherein the primary crosslinking moieties are derived from a first functionally symmetric crosslinker, and wherein the secondary crosslinking moieties are derived from a second functionally symmetric crosslinker.

191. The process of paragraph 190, wherein the rotating creping cylinder is at a temperature of about 100° C. to about 120° C., and wherein the creping adhesive is at a temperature of about 20° C. to about 70° C. when applied to the rotating cylinder.

192. The process of paragraph 190 or 191, wherein the creping adhesive is applied to the surface of the rotating creping cylinder at a rate of about 10 mg/m² to about 70 mg/m².

193. The process of any of paragraphs 190 to 192, wherein the crosslinked resin has a weight average molecular weight of about 25 kDa to about 1,500 kDa.

194. The process of paragraph 190 to 193, wherein the creping adhesive has a pH of about 6.5 to about 10.

195. The process of any of paragraphs 190 to 194 wherein the creping adhesive has a viscosity of about 20 cP to about 1,000 cP at a temperature of about 25° C.

196. The process of any of paragraphs 190 to 195, wherein the creping adhesive comprises about 1 wt % to about 99 wt % of the crosslinked resin based on a combined weight of the modified polyvinyl alcohol and the crosslinked resin.

197. The process of any of paragraphs 190 to 196, wherein the creping adhesive comprises about 1 wt % to about 98 wt % of the solvent, about 1 wt % to about 70 wt % of the modified polyvinyl alcohol, and about 1 wt % to about 70 wt % of the crosslinked resin, based on a combined weight of the solvent, the modified polyvinyl alcohol, and the crosslinked resin.

198. The process of any of paragraphs 190 to 197, wherein the creping adhesive has an adhesion of about 25 gram-force per inch to about 800 gram-force per inch.

199. The process of any of paragraphs 190 to 198, wherein the creping adhesive has a film solubility of about 10% to about 99%.

200. The process of any of paragraphs 190 to 199 wherein the creping adhesive has a film solubility of about 20% to about 80%.

201. The process of any of paragraphs 190 to 200, wherein the modified polyvinyl alcohol comprises a carboxylated polyvinyl alcohol, wherein the carboxylated polyvinyl alcohol has the following chemical formula (I):

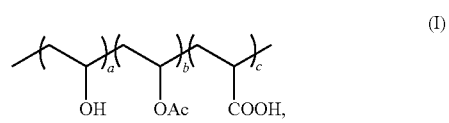

and wherein a is a number from 1 to 99, b is a number from 0 to 30, and c is a number from 1 to 20.

202. The process of any of paragraphs 190 to 201, wherein the modified polyvinyl alcohol comprises a carboxylated polyvinyl alcohol, and wherein the carboxylated polyvinyl alcohol has the following chemical formula (II):

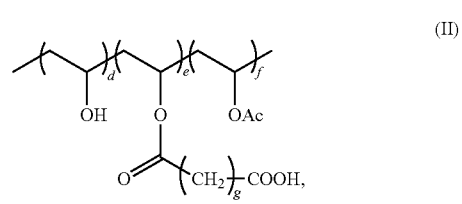

and wherein d is a number from 1 to 98, e is a number from 1 to 20, f is a number from 0 to 30, and g is a number from 0-10.

203. The process of any of paragraphs 190 to 202, wherein the modified polyvinyl alcohol comprises a sulfonated polyvinyl alcohol, wherein the sulfonated polyvinyl alcohol has the following chemical formula (III):

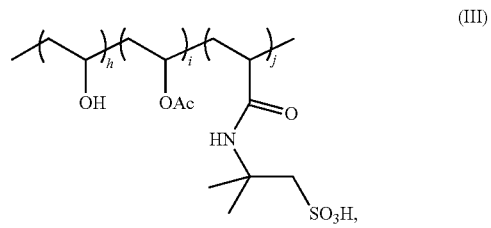

and wherein h is a number from 1 to 98, i is a number from 0 to 30, and j is a number from 1 to 20.

204. The process of any of paragraphs 190 to 203, wherein the modified polyvinyl alcohol comprises a sulfated polyvinyl alcohol, and wherein the sulfated polyvinyl alcohol has the following chemical formula (IV):

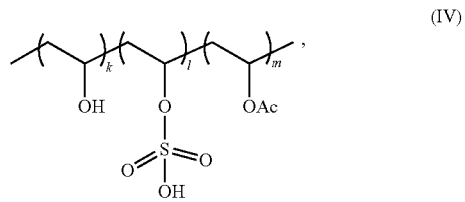

and wherein k is a number from 1 to 98, l is a number from 1 to 20, and m is a number from 0 to 30.

205. The process of any of paragraphs 190 to 204, wherein the modified polyvinyl alcohol comprises a sulfonated-carboxylated polyvinyl alcohol, and wherein the sulfonated-carboxylated polyvinyl alcohol has the following chemical formula (V):

(V)

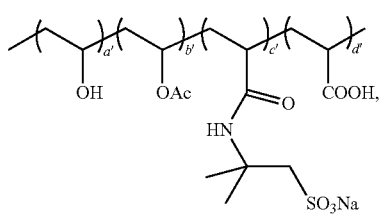

and wherein a' is a number from 1 to 97, b' is a number from 1 to 30, c' is a number from 1 to 20, and d' is a number from 1 to 10.

206. The process of any of paragraphs 190 to 205, wherein the modified polyvinyl alcohol comprises a sulfonated-carboxylated polyvinyl alcohol, and wherein the sulfonated-carboxylated polyvinyl alcohol has the following chemical formula (VI):

(VI)

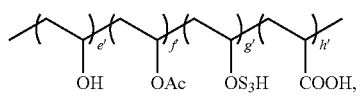

and wherein e' is a number from 1 to 97, f' is a number from 1 to 30, g' is a number from 1 to 20, and h' is a number from 1 to 20.

207. The process of any of paragraphs 190 to 206, wherein the solvent comprises water, an alkylene glycol, a polyalkylene glycol, or a mixture thereof.

208. The process of any of paragraphs 190 to 207, wherein the solvent comprises water.

209. The process of any of paragraphs 190 to 208, wherein the crosslinked resin comprises the polyamidoamine backbones crosslinked by the primary crosslinking moieties and the propanediyl moieties, and wherein the functionally symmetric crosslinker has the following chemical formula (VII), (VIII), (IX), (X), (XI), or (XII):

(VII)

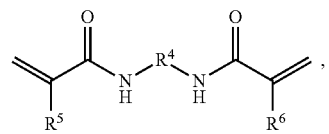

wherein $R^4$ is $(CH_2)_t$, t is 1, 2, or 3, and $R^5$ and $R^6$ are both a hydrogen atom or a methyl group;

(VIII)

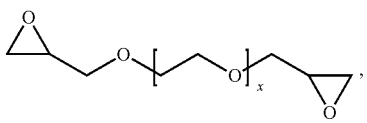

wherein x is a number from 1 to about 100;

(IX)

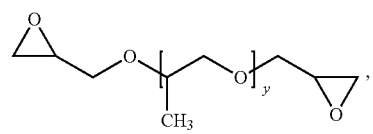

wherein y is a number from 1 to about 100;

(X)

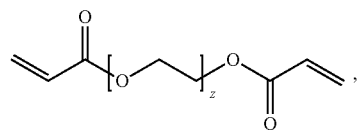

wherein x'+y' is a number from 1 to about 100;

(XI)

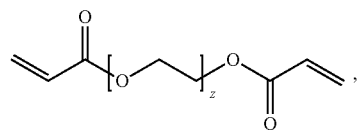

wherein z is a number from 1 to about 100; or (XII)

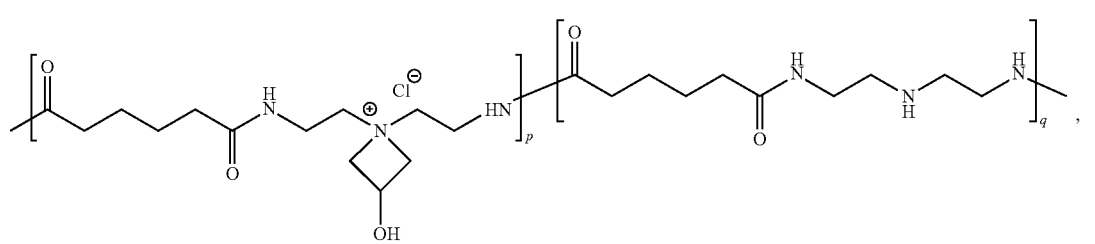

wherein a q/p ratio is a number from about 10 to about 1000.

210. The process of any of paragraphs 190 to 209, wherein the crosslinked resin comprises the polyamidoamine backbones crosslinked by the primary crosslinking moieties and the propanediyl moieties, and wherein the functionally symmetric crosslinker comprises a copolymer of an acrylate monomer, a methacrylate monomer, an alkene monomer, or a diene monomer, with an azetidinium-functionalized monomer selected from

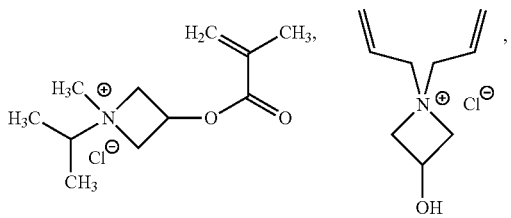

and a mixture thereof, wherein a fraction of the azetidinium-functionalized monomer to the acrylate monomer, the methacrylate monomer, the alkene monomer, or the diene monomer in the copolymer is from about 0.1% to about 12%.

211. The process of any of paragraphs 190 to 210, wherein the crosslinked resin comprises the polyamidoamine backbones crosslinked by the primary crosslinking moieties and the propanediyl moieties, and wherein the functionally symmetric crosslinker comprises a di-acrylate, a bis(acrylamide), a di-epoxide, a polyazetidinium compound, an alkylene glycol diglycidyl ether, a poly(alkylene glycol) diglycidyl ether, a diisocyanate, a 1,3-dialkyldiazetidine-2,4-dione, a dianhydride, a diacyl halide, a dienone, a dialkyl halide, or a mixture thereof.

212. The process of any of paragraphs 190 to 211, wherein the crosslinked resin comprises the polyamidoamine backbones crosslinked by the primary crosslinking moieties and the propanediyl moieties, and wherein the functionally symmetric crosslinker comprises N,N'-methylene-bis-acrylamide, N,N'-methylene-bis-methacrylamide, ethylene glycol diglycidyl ether, propylene glycol diglycidyl ether, poly (ethylene glycol) diglycidyl ether, poly(propylene glycol) diglycidyl ether, poly (ethylene glycol) diacrylate, poly (propylene glycol) diacrylate, or a mixture thereof.

213. The process of any of paragraphs 190 to 212, wherein the crosslinked resin comprises the polyamidoamine backbones crosslinked by the primary crosslinking moieties and the propanediyl moieties, and wherein the propanediyl moieties are derived from an epihalohydrin.

214. The process of paragraph 213, wherein the epihalohydrin comprises epichlorohydrin, epibromohydrin, epiiodohydrin, or a mixture thereof.

215. The process of any of paragraphs 190 to 214, wherein the crosslinked resin comprises the polyamidoamine backbones crosslinked by the primary crosslinking moieties and the propanediyl moieties, and wherein the functionally symmetric crosslinker comprises N,N'-methylene-bis-acrylamide, and wherein the propanediyl moieties are derived from epichlorohydrin.

216. The process of any of paragraphs 190 to 208, wherein the crosslinked resin comprises the polyamidoamine backbones crosslinked by the primary crosslinking moieties and the secondary crosslinking moieties, and wherein the first functionally symmetric crosslinker and the second functionally symmetric crosslinker independently have the following chemical formula (VII), (VIII), (IX), (X), (XI), or (XII):

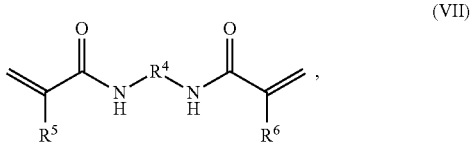

wherein $R^4$ is $(CH_2)_t$, t is 1, 2, or 3, and $R^5$ and $R^6$ are both a hydrogen atom or a methyl group;

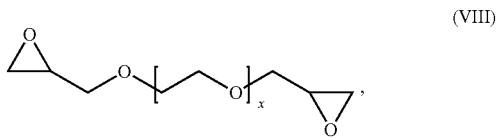

wherein x is a number from 1 to about 100;

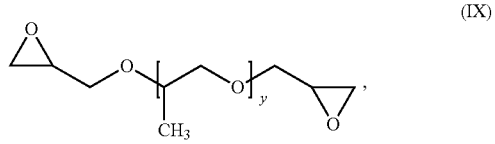

wherein y is a number from 1 to about 100;

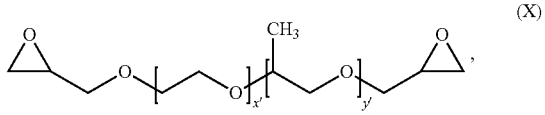

wherein x'+y' is a number from 1 to about 100;

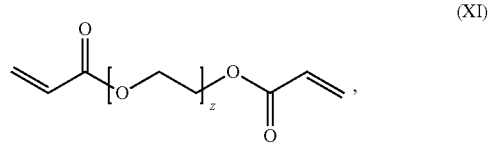

wherein z is a number from 1 to about 100; or

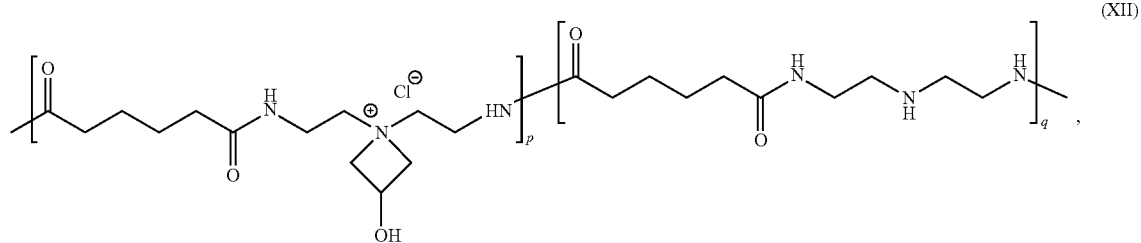

(XII)

wherein a q/p ratio is a number from about 10 to about 1000.

217. The process of any of paragraphs 190 to 208 or 216, wherein the crosslinked resin comprises the polyamidoamine backbones crosslinked by the primary crosslinking moieties and the secondary crosslinking moieties, and wherein at least one of the first functionally symmetric crosslinker and the second functionally symmetric crosslinker comprises a copolymer of an acrylate monomer, a methacrylate monomer, an alkene monomer or a diene monomer with an azetidinium-functionalized monomer selected from

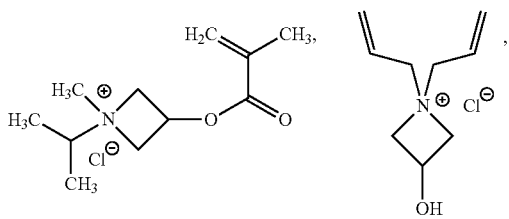

and a mixture thereof, wherein a fraction of the azetidinium-functionalized monomer to the acrylate monomer, the methacrylate monomer, the alkene monomer, or the diene monomer in the copolymer is from about 0.1% to about 12%.

218. The process of any of paragraphs 190 to 208, wherein the crosslinked resin comprises the polyamidoamine backbones crosslinked by the primary crosslinking moieties and the secondary crosslinking moieties, and wherein the first functionally symmetric crosslinker and the second functionally symmetric crosslinker independently comprise a di-acrylate, a bis(acrylamide), a di-epoxide, a polyazetidinium compound, an alkylene glycol diglycidyl ether, a poly(alkylene glycol) diglycidyl ether, a diisocyanate, a 1,3-dialkyldiazetidine-2,4-dione, a dianhydride, a diacyl halide, a dienone, a dialkyl halide, or a mixture thereof.

219. The process of any of paragraphs 190 to 208, wherein the crosslinked resin comprises the polyamidoamine backbones crosslinked by the primary crosslinking moieties and the secondary crosslinking moieties, and wherein first functionally symmetric crosslinker and the second functionally symmetric crosslinker independently comprise N,N'-methylene-bis-acrylamide, N,N'-methylene-bis-methacrylamide, ethylene glycol diglycidyl ether, propylene glycol diglycidyl ether, poly(ethylene glycol) diglycidyl ether, poly(propylene glycol) diglycidyl ether, poly (ethylene glycol) diacrylate, poly(propylene glycol) diacrylate, or a mixture thereof.

220. The process of any of paragraphs 190 to 208, wherein the crosslinked resin comprises the polyamidoamine backbones crosslinked by the primary crosslinking moieties and the secondary crosslinking moieties, and wherein the first functionally symmetric crosslinker comprises N,N'-methylene-bis-acrylamide, and wherein the second functionally symmetric crosslinker comprises ethylene glycol diglycidyl ether.

221. The process of any of paragraphs 190 to 208, wherein the crosslinked resin comprises the polyamidoamine backbones crosslinked by the primary crosslinking moieties and the secondary crosslinking moieties, and wherein the first functionally symmetric crosslinker and the second functionally symmetric crosslinker are different from one another.

222. The process of any of paragraphs 190 to 208 or 216 to 221, wherein the crosslinked resin comprises the polyamidoamine backbones crosslinked by the primary crosslinking moieties and the secondary crosslinking moieties, wherein the first functionally symmetric crosslinker and the second functionally symmetric crosslinker are the same functionally symmetric crosslinker, wherein the primary crosslinking moieties are formed by reacting a polyamidoamine and a first portion of the functionally symmetric crosslinker in the presence of the solvent to produce a prepolymer, and wherein the secondary crosslinking moieties are formed by reacting the prepolymer and a second portion of the functionally symmetric crosslinker in the presence of the solvent and the modified polyvinyl alcohol.

223. A process for creping a paper web, comprising: applying to a surface of a rotating creping cylinder a creping adhesive; pressing the paper web against the creping cylinder to adhere the paper web to the creping cylinder; and dislodging the paper web from the creping cylinder with a doctor blade, wherein the creping adhesive comprises a solvent, a crosslinked resin, and a polyvinyl alcohol, a modified polyvinyl alcohol, or a mixture thereof, and wherein the crosslinked resin comprises polyamidoamine backbones crosslinked by primary crosslinking moieties, wherein the primary crosslinking moieties are derived from a functionally symmetric crosslinker.

224. The process of paragraph 223, wherein the rotating creping cylinder is at a temperature of about 100° C. to about 120° C., and wherein the creping adhesive is at a temperature of about 20° C. to about 70° C. when applied to the rotating cylinder.

225. The process of paragraph 223 or 224, wherein the creping adhesive is applied to the surface of the rotating creping cylinder at a rate of about 10 mg/m$^2$ to about 70 mg/m$^2$.

226. The process of any of paragraphs 223 to 225, wherein the crosslinked resin has a weight average molecular weight of about 25 kDa to about 1,500 kDa.

227. The process of any of paragraphs 223 to 226, wherein the creping adhesive has a pH of about 6.5 to about 10.

228. The process of any of paragraphs 223 to 227 wherein the creping adhesive has a viscosity of about 20 cP to about 1,000 cP at a temperature of about 25° C.

229. The process of any of paragraphs 223 to 228, wherein the creping adhesive comprises about 1 wt % to about 99 wt % of the crosslinked resin based on a combined weight of the crosslinked resin, any polyvinyl alcohol and any modified polyvinyl alcohol.

230. The process of any of paragraphs 223 to 229, wherein the creping adhesive comprises about 1 wt % to about 98 wt % of the solvent, up to about 25 wt % of the polyvinyl alcohol, up to about 70 wt % of the modified polyvinyl alcohol, and about 1 wt % to about 70 wt % of the crosslinked resin, based on a combined weight of the solvent, any polyvinyl alcohol, any modified polyvinyl alcohol, and the crosslinked resin, and wherein the creping adhesive comprises about 1 wt % to about 70 wt % of a total amount of any polyvinyl alcohol and any modified polyvinyl alcohol, based on the combined weight of the solvent, any polyvinyl alcohol, any modified polyvinyl alcohol, and the crosslinked resin.

231. The process of any of paragraphs 223 to 230, wherein the creping adhesive has an adhesion of about 25 gram-force per inch to about 800 gram-force per inch when applied to the surface of the rotating creping cylinder.

232. The process of any of paragraphs 223 to 231, wherein the creping adhesive has a film solubility of about 10% to about 99%.

233. The process of any of paragraphs 223 to 232 wherein the creping adhesive has a film solubility of about 20% to about 80%.

234. The process of any of paragraphs 223 to 233, wherein the creping adhesive comprises the modified polyvinyl alcohol, and wherein the modified polyvinyl alcohol comprises a carboxylated polyvinyl alcohol, a sulfonated polyvinyl alcohol, a sulfated polyvinyl alcohol, a sulfonated-carboxylated polyvinyl alcohol, or a mixture thereof.

235. The process of paragraph 234, wherein the carboxylated polyvinyl alcohol has the following chemical formula (I):

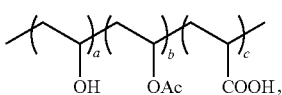

(I)

wherein a is a number from 1 to 99, b is a number from 0 to 30, and c is a number from 1 to 20.

236. The process of paragraph 234 or 235, wherein the modified polyvinyl alcohol comprises the carboxylated polyvinyl alcohol, and wherein the carboxylated polyvinyl alcohol has the following chemical formula (II):

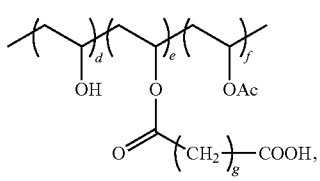

(II)

and wherein d is a number from 1 to 98, e is a number 1 to 20, f is a number from 0 to 30, and g is a number from 0-10.

237. The process of any of paragraphs 234 to 236, wherein the sulfonated polyvinyl alcohol has the following chemical formula (III):

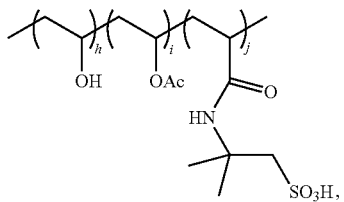

(III)

and wherein h is a number from 1 to 98, i is a number from 0 to 30, and j is a number from 1 to 20.

238. The process of any of paragraphs 234 to 237, wherein the modified polyvinyl alcohol comprises the sulfated polyvinyl alcohol, and wherein the sulfated polyvinyl alcohol has the following chemical formula (IV):

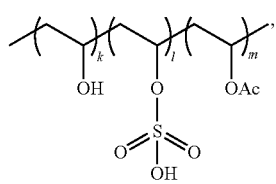

(IV)

and wherein k is a number from 1 to 98, l is a number from 1 to 20, and m is a number from 0 to 30.

239. The process of any of paragraphs 234 to 238, wherein the modified polyvinyl alcohol comprises the sulfonated-carboxylated polyvinyl alcohol, and wherein the sulfonated-carboxylated polyvinyl alcohol has the following chemical formula (V):

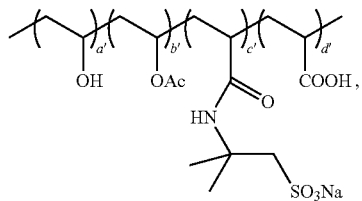

(V)

and wherein a' is a number from 1 to 97, b' is a number from 1 to 30, c' is a number from 1 to 20, and d' is a number from 1 to 10.

240. The process of any of paragraphs 234 to 239, wherein the modified polyvinyl alcohol comprises the sulfonated-carboxylated polyvinyl alcohol, and wherein the sulfonated-carboxylated polyvinyl alcohol has the following chemical formula (VI):

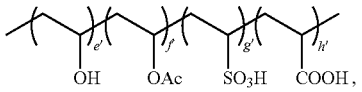

(VI)

and wherein e' is a number from 1 to 97, f' is a number from 1 to 30, g' is a number from 1 to 20, and h' is a number from 1 to 20.

241. The process of any of paragraphs 223 to 240, wherein the creping adhesive comprises the polyvinyl alcohol, and wherein the polyvinyl alcohol has the following chemical formula (XIII):

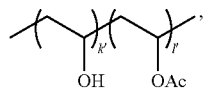

(XIII)

and wherein k' is a number from 1 to 99 and l' is a number from 0 to 30.

242. The process of any of paragraphs 223 to 241, wherein the solvent comprises water, an alkylene glycol, a polyalkylene glycol, or a mixture thereof.

243. The process of any of paragraphs 223 to 242, wherein the solvent comprises water.

244. The process of any of paragraphs 223 to 243, wherein the functionally symmetric crosslinker has the following chemical formula (VII), (VIII), (IX), (X), (XI), or (XII):

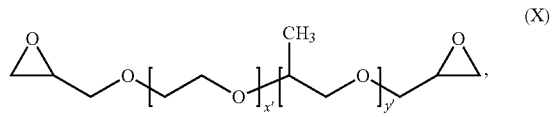

(X)

wherein x'+y' is a number from 1 to about 100;

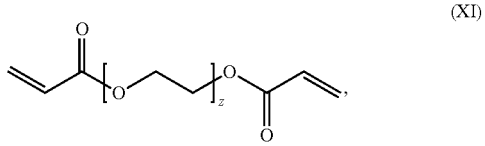

(XI)

wherein z is a number from 1 to about 100; or

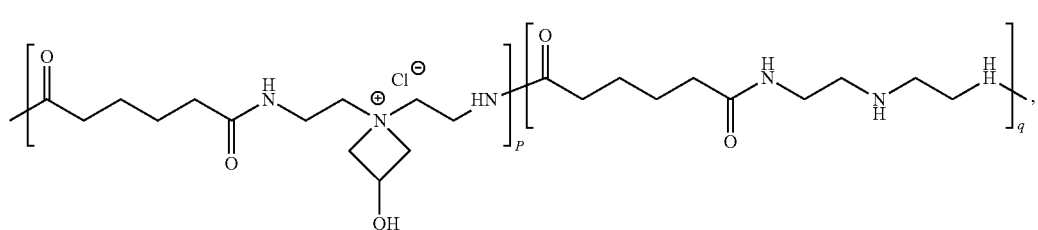

(XII)

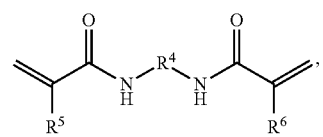

(VII)

wherein $R^4$ is $(CH_2)_t$, t is 1, 2, or 3, and $R^5$ and $R^6$ are both a hydrogen atom or a methyl group;

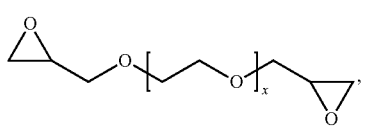

(VIII)

wherein x is a number from 1 to about 100;

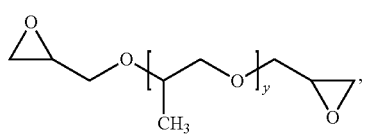

(IX)

wherein y is a number from 1 to about 100;

wherein a q/p ratio is a number from about 10 to about 1000.

245. The process of any of paragraphs 223 to 244, wherein the functionally symmetric crosslinker comprises a copolymer of an acrylate monomer, a methacrylate monomer, an alkene monomer, or a diene monomer, with an azetidinium-functionalized monomer selected from

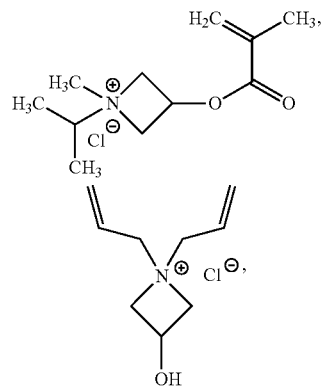

and a mixture thereof, wherein a fraction of the azetidinium-functionalized monomer to the acrylate monomer, the methacrylate monomer, the alkene monomer, or the diene monomer in the copolymer is from about 0.1% to about 12%.

246. The process of any of paragraphs 223 to 245, wherein the functionally symmetric crosslinker comprises a di-acrylate, a bis(acrylamide), a di-epoxide, a polyazetidinium compound, an alkylene glycol diglycidyl ether, a poly(alkylene glycol) diglycidyl ether, a diisocyanate, a 1,3-dialkyldiazetidine-2,4-dione, a dianhydride, a diacyl halide, a dienone, a dialkyl halide, or a mixture thereof.

247. The process of any of paragraphs 223 to 246, wherein functionally symmetric crosslinker comprises ethylene glycol diglycidyl ether, propylene glycol diglycidyl ether, poly(ethylene glycol) diglycidyl ether, poly(propylene glycol) diglycidyl ether, poly (ethylene glycol) diacrylate, poly(propylene glycol) diacrylate, or a mixture thereof.

248. The process of any of paragraphs 223 to 247, wherein the functionally symmetric crosslinker comprises ethylene glycol diglycidyl ether.

249. The process of any of paragraphs 165 to 248, wherein the polyamidoamine backbones are derived from a polyamidoamine having chemical formula (XIV):

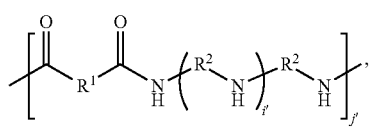

(XIV)

wherein $R^1$ is $(CH_2)_u$ 1, 2, 3, 4, or 5, each $R^2$ is independently $(CH_2)_v$ and v is 2, 3, or 4, i' is 1, 2, or 3, and j' is a number from 1 to about 10,000.

250. The process of paragraph 249, wherein the polyamidoamine has a weight average molecular weight of about 3 kDa to about 20 kDA.

251. The creping adhesive or process according to any one of paragraph 1 to 250, wherein a pH of the creping adhesive is adjusted by combining one or more multi-functional acids with the creping adhesive.

252. The creping adhesive or process according to any one of paragraphs 1 to 250, wherein a pH of the creping adhesive is adjusted by combining one or more multi-functional acids with the creping adhesive, and wherein the multi-functional acid comprises oxalic acid, malonic acid, succinic acid, glutaric acid, adipic acid, pimelic acid, suberic acid, azelaic acid, sebacic acid, phthalic acid, isophthalic acid, terephthalic acid, citric acid, isocitric acid, aconitic acid, carballylic acid, glycolic acid, lactic acid, malic acid, tartaric acid, gluconic acid, maleic acid, fumaric acid, ascorbic acid, aspartic acid, glutamic acid, 4-hydroxy-benzoic acid, 2,4-dihydroxy benzoic acid, sulfamic acid, methanesulfonic acid, 4-toluene sulfonic acid, xylene sulfonic acid, phenol sulfonic acid, or any mixture thereof.

253. The creping adhesive or process according to any one of paragraphs 1 to 250, wherein a pH of the creping adhesive is adjusted by combining one or more acids with the creping adhesive, and wherein the acid comprises one or more mineral acids.

254. The creping adhesive or process according to paragraph 253, wherein the mineral acid comprises sulfuric acid, hydrochloric acid, nitric acid, phosphoric acid, boric acid, hydrofluoric acid, or a mixture thereof.

255. A creping adhesive, comprising: a solvent; a modified polyvinyl alcohol; and a crosslinked resin comprising polyamidoamine backbones crosslinked by primary crosslinking moieties and propanediyl moieties, wherein the primary crosslinking moieties are derived from a functionally symmetric crosslinker.

256. A creping adhesive, comprising: a solvent; a modified polyvinyl alcohol; and a crosslinked resin comprising polyamidoamine backbones crosslinked by primary crosslinking moieties and secondary crosslinking moieties, wherein the primary crosslinking moieties are derived from a first functionally symmetric crosslinker, and wherein the secondary crosslinking moieties are derived from a second functionally symmetric crosslinker.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A creping adhesive, comprising:

a solvent;

a modified polyvinyl alcohol comprising a carboxylated polyvinyl alcohol, a sulfated polyvinyl alcohol, a sulfonated-carboxylated polyvinyl alcohol, or a mixture thereof; and a crosslinked resin comprising polyamidoamine backbones crosslinked by primary crosslinking moieties and propanediyl moieties, wherein the primary crosslinking moieties are derived from a functionally symmetric crosslinker, wherein:

the carboxylated polyvinyl alcohol, if present, has the following chemical formula:

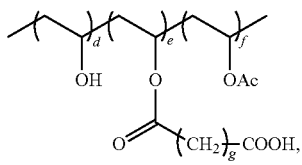

wherein d is a number from 1 to 98, e is a number from 1 to 20, f is a number from 0 to 30, and g is a number from 0-10, the sulfated polyvinyl alcohol, if present, has the following chemical formula:

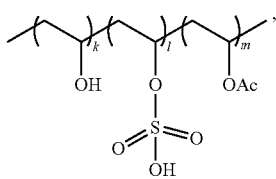

wherein k is a number from 1 to 98, l is a number from 1 to 20, and m is a number from 0 to 30, and the sulfonated-carboxylated polyvinyl alcohol, if present, has the following chemical formula:

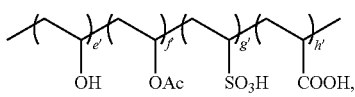

wherein e' is a number from 1 to 97, f' is a number from 1 to 30, g' is a number from 1 to 20, and h' is a number from 1 to 20.

2. The creping adhesive of claim 1, wherein the creping adhesive comprises about 1 wt % to about 98 wt % of the solvent, about 1 wt % to about 70 wt % of the modified polyvinyl alcohol, and about 1 wt % to about 70 wt % of the crosslinked resin, based on a combined weight of the solvent, the modified polyvinyl alcohol, and the crosslinked resin.

3. The creping adhesive of claim 1, wherein the modified polyvinyl alcohol further comprises a carboxylated polyvinyl alcohol having the following chemical formula:

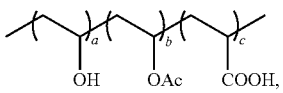

and wherein a is a number from 1 to 99, b is a number from 0 to 30, and c is a number from 1 to 20.

4. The creping adhesive of claim 1, wherein the modified polyvinyl alcohol comprises the carboxylated polyvinyl alcohol.

5. The creping adhesive of claim 1, wherein the modified polyvinyl alcohol further comprises a sulfonated polyvinyl alcohol, and wherein the sulfonated polyvinyl alcohol has the following chemical formula:

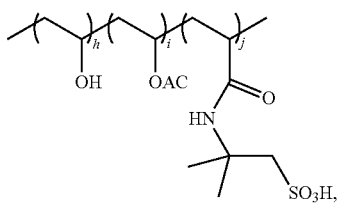

and wherein h is a number from 1 to 98, i is a number from 0 to 30, and j is a number from 1 to 20.

6. The creping adhesive of claim 1, wherein the modified polyvinyl alcohol comprises the sulfated polyvinyl alcohol.

7. The creping adhesive of claim 1, wherein the modified polyvinyl alcohol further comprises a sulfonated-carboxylated polyvinyl alcohol having the following chemical formula:

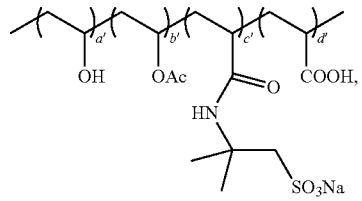

and wherein a' is a number from 1 to 97, b' is a number from 1 to 30, c' is a number from 1 to 20, and d' is a number from 1 to 10.

8. The creping adhesive of claim 1, wherein the modified polyvinyl alcohol comprises the sulfonated-carboxylated polyvinyl alcohol.

9. The creping adhesive of claim 1, wherein the solvent comprises water, an alkylene glycol, a polyalkylene glycol, or a mixture thereof.

10. The creping adhesive of claim 1, wherein the functionally symmetric crosslinker has the following chemical formula (VII), (VIII), (IX), (X), (XI), or (XII):

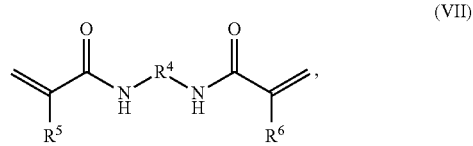

wherein $R^4$ is $(CH_2)_t$, t is 1, 2, or 3, and $R^5$ and $R^6$ are both a hydrogen atom or a methyl group;

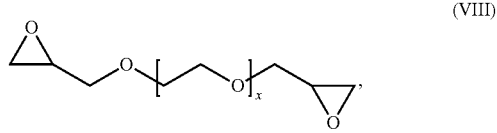

wherein x is a number from 1 to about 100;

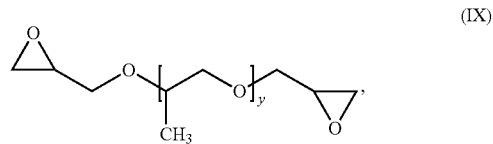

wherein y is a number from 1 to about 100;

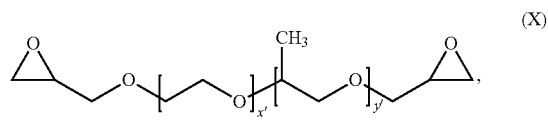

wherein x'+y' is a number from 1 to about 100;

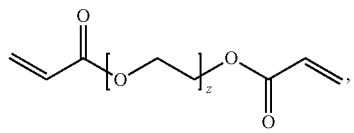

wherein z is a number from 1 to about 100; or

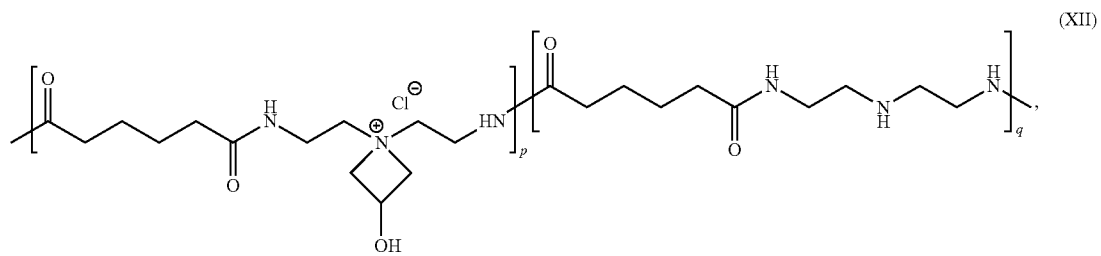

wherein a q/p ratio is a number from about 10 to about 1000.

11. The creping adhesive of claim 1, wherein the functionally symmetric crosslinker comprises a copolymer of an acrylate monomer, a methacrylate monomer, an alkene monomer, or a diene monomer, with an azetidinium-functionalized monomer selected from

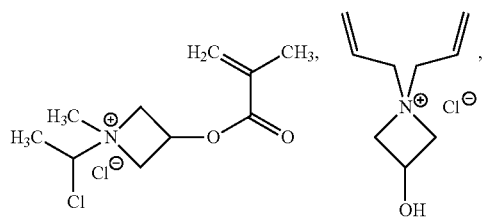

and a mixture thereof, wherein a fraction of the azetidinium-functionalized monomer to the acrylate monomer, the methacrylate monomer, the alkene monomer, or the diene monomer in the copolymer is from about 0.1% to about 12%.

12. The creping adhesive of claim 1, wherein the functionally symmetric crosslinker comprises a di-acrylate, a bis(acrylamide), a di-epoxide, a polyazetidinium compound, an alkylene glycol diglycidyl ether, a poly(alkylene glycol) diglycidyl ether, a diisocyanate, a 1,3-dialkyldiazetidine-2,4-dione, a dianhydride, a diacyl halide, a dienone, a dialkyl halide, or a mixture thereof.

13. The creping adhesive of claim 1, wherein the propanediyl moieties are derived from an epihalohydrin.

14. The creping adhesive of claim 13, wherein the crosslinked resin is made by reacting the epihalohydrin with a polyamidoamine crosslinked by the primary crosslinking moieties in the presence of the solvent, and wherein a mixture of the solvent and the crosslinked resin is blended with the modified polyvinyl alcohol to produce the creping adhesive.

15. The creping adhesive of claim 13, wherein the crosslinked resin is made by reacting the epihalohydrin with a polyamidoamine crosslinked by the primary crosslinking moieties in the presence of the solvent and the modified polyvinyl alcohol.

16. The creping adhesive of claim 1, wherein the crosslinked resin has a weight average molecular weight of about 25 kDa to about 1,500 kDa, and wherein the creping adhesive has a viscosity of about 20 cP to about 1,000 cP at a temperature of about 25° C.

17. The creping adhesive of claim 1, wherein:
the solvent comprises water,
the functionally symmetric crosslinker comprises a bis(acrylamide),
the propanediyl moieties are derived from an epihalohydrin,
the creping adhesive comprises about 1 wt % to about 98 wt % of the solvent, about 1 wt % to about 70 wt % of the modified polyvinyl alcohol, and about 1 wt % to about 70 wt % of the crosslinked resin, based on a combined weight of the solvent, the modified polyvinyl alcohol, and the crosslinked resin, and
the crosslinked resin is made by reacting the epihalohydrin with a polyamidoamine crosslinked by the primary crosslinking moieties in the presence of the solvent, and wherein a mixture of the solvent and the crosslinked resin is blended with the modified polyvinyl alcohol to produce the creping adhesive.

18. The creping adhesive of claim 1, wherein the polyamidoamine backbones are derived from a polyamidoamine having the following chemical formula (XIV):

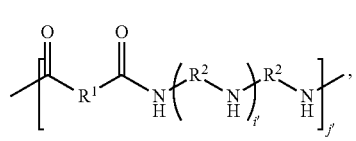

wherein $R^1$ is $(CH_2)_u$ and u is 1, 2, 3, 4, or 5, each $R^2$ is independently $(CH_2)_v$ and v is 2, 3, or 4, i' is 1, 2, or 3, and j' is a number from 1 to about 10,000.

19. A process for making a creping adhesive, comprising:
blending a resin mixture with a modified polyvinyl alcohol to produce the creping adhesive, wherein:
the resin mixture comprises:
a solvent; and
a crosslinked resin comprising polyamidoamine backbones crosslinked by primary crosslinking moieties and propanediyl moieties, wherein:
the primary crosslinking moieties are derived from a functionally symmetric crosslinker,
the modified polyvinyl alcohol comprises a carboxylated polyvinyl alcohol, a sulfated polyvinyl alcohol, a sulfonated-carboxylated polyvinyl alcohol, or a mixture thereof,
the carboxylated polyvinyl alcohol, if present, has the following chemical formula:

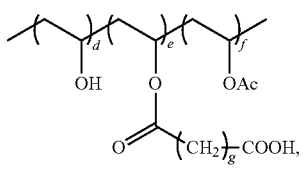

wherein d is a number from 1 to 98, e is a number from 1 to 20, f is a number from 0 to 30, and g is a number from 0-10, the sulfated polyvinyl alcohol, if present, has the following chemical formula:

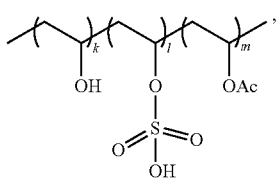

wherein k is a number from 1 to 98, l is a number from 1 to 20, and m is a number from 0 to 30, and the sulfonated-carboxylated polyvinyl alcohol, if present, has the following chemical formula:

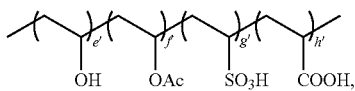

wherein e' is a number from 1 to 97, f' is a number from 1 to 30, g' is a number from 1 to 20, and h' is a number from 1 to 20.

20. A process for creping a paper web, comprising:
applying to a rotating creping cylinder a creping adhesive;
pressing the paper web against the creping cylinder to adhere the paper web to the creping cylinder; and
dislodging the paper web from the creping cylinder with a doctor blade, wherein the creping adhesive comprises a solvent, a modified polyvinyl alcohol, and a crosslinked resin, wherein the crosslinked resin comprises polyamidoamine backbones crosslinked by primary crosslinking moieties and propanediyl moieties, wherein the primary crosslinking moieties are derived from a functionally symmetric crosslinker, wherein the modified polyvinyl alcohol comprises a carboxylated polyvinyl alcohol, a sulfated polyvinyl alcohol, a sulfonated-carboxylated polyvinyl alcohol, or a mixture thereof, and wherein:

the carboxylated polyvinyl alcohol, if present, has the following chemical formula:

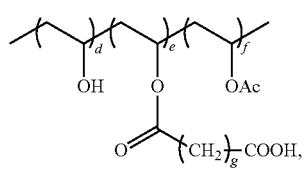

wherein d is a number from 1 to 98, e is a number from 1 to 20, f is a number from 0 to 30, and g is a number from 0-10, the sulfated polyvinyl alcohol, if present, has the following chemical formula:

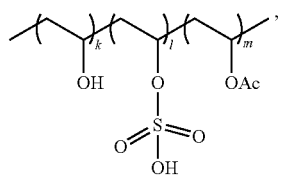

wherein k is a number from 1 to 98, l is a number from 1 to 20, and m is a number from 0 to 30, and the sulfonated-carboxylated polyvinyl alcohol, if present, has the following chemical formula:

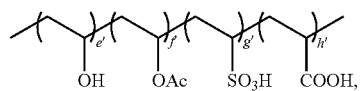

wherein e' is a number from 1 to 97, f' is a number from 1 to 30, g' is a number from 1 to 20, and h' is a number from 1 to 20.

* * * * *

UNITED STATES PATENT AND TRADEMARK OFFICE
CERTIFICATE OF CORRECTION

PATENT NO. : 11,982,055 B2
APPLICATION NO. : 17/091413
DATED : May 14, 2024
INVENTOR(S) : Ashish Dhawan et al.

Page 1 of 1

It is certified that error appears in the above-identified patent and that said Letters Patent is hereby corrected as shown below:

On the Title Page

Left Column, (73) (Assignee): delete "ECOLABS" and insert -- ECOLAB --.

In the Claims

Column 81, Line 10: In Claim 1, delete "1 is" and insert -- l is --.

Column 81, Lines 51 to 58 (approx.): In Claim 5, delete " 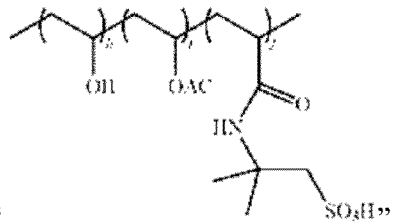 and insert -- 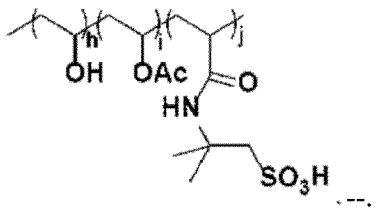 --.

Column 85, Line 25 (approx.): In Claim 19, delete "1 is" and insert -- l is --.

Column 86, Line 34 (approx.): In Claim 20, delete "1 is" and insert -- l is --.

Signed and Sealed this
First Day of October, 2024

Katherine Kelly Vidal
*Director of the United States Patent and Trademark Office*